US012174615B2

(12) United States Patent
Kaliski et al.

(10) Patent No.: US 12,174,615 B2
(45) Date of Patent: Dec. 24, 2024

(54) METHODS, SYSTEMS AND NON-TRANSITORY COMPUTER-READABLE MEDIA FOR PROCESSING CHANGED APPLICATION DATA BASED ON CORRESPONDING REQUIREMENTS

(71) Applicants: Spicter AG, Zug (CH); SOE Consulting GmbH, Königstein (DE)

(72) Inventors: Erwin Kaliski, Zug (CH); Andreas Oberhack, Zug (CH)

(73) Assignee: SOE Consulting GmbH, Königstein (DE)

( * ) Notice: Subject to any disclaimer, the term of this patent is extended or adjusted under 35 U.S.C. 154(b) by 0 days.

(21) Appl. No.: 18/263,400

(22) PCT Filed: Feb. 4, 2022

(86) PCT No.: PCT/EP2022/052706
§ 371 (c)(1),
(2) Date: Jul. 28, 2023

(87) PCT Pub. No.: WO2022/167581
PCT Pub. Date: Aug. 11, 2022

(65) Prior Publication Data
US 2024/0126238 A1 Apr. 18, 2024

(30) Foreign Application Priority Data
Feb. 5, 2021 (EP) .................................... 21155463

(51) Int. Cl.
*G05B 19/4155* (2006.01)
*G06F 9/46* (2006.01)
(52) U.S. Cl.
CPC .................. *G05B 19/4155* (2013.01); *G05B 2219/31368* (2013.01)

(58) Field of Classification Search
CPC ...... G05B 19/4155; G05B 2219/31368; G06F 9/46; G06F 11/1469; G06F 11/1474; G06F 2201/865; G06F 16/2358; G06F 16/219
See application file for complete search history.

(56) References Cited

U.S. PATENT DOCUMENTS 9,547,659 B1 * 1/2017 Barber ................. G06F 16/215
11,256,702 B2 * 2/2022 Colcord ............... G06F 16/211
(Continued)

FOREIGN PATENT DOCUMENTS

CN 112825069 A * 5/2021

OTHER PUBLICATIONS

International Report on Patentability for PCT/EP2022/052706 dated Aug. 3, 2023.
(Continued)

*Primary Examiner* — Daxin Wu
(74) *Attorney, Agent, or Firm* — Harness, Dickey & Pierce, P.L.C.

(57) ABSTRACT

The invention relates to a computer-implemented method for data processing control. The method comprises: —providing (102) at least one append-only store (224, 322); —providing (103) a framework (210); —using (104) an application program (226) for performing change operations (206, 208) on application-born external objects (202, 204, 304); —creating (106), by the framework, delta objects (216, 218, 310) being indicative of attribute changes of the application-born external objects caused by the change operations; —sequentially storing (108), by the framework, a sequence of data objects in the at least one append-only store, the sequence of data objects comprising a mixture of delta objects (211, 212, 214, 310, 312, 404, 406) and RS objects (216, 218, 314, 316, 318, 320), each RS object being (Continued)

a data object specifying a requirement in respect to how attribute information of one or more of the application-born external objects comprised in the delta objects must be processed and output by the framework; —executing (110) one or more of the framework-functions for returning an output (230) computed as a function of the attribute information in the delta objects which complies to the requirements specified in the RS objects.

18 Claims, 12 Drawing Sheets

(56) References Cited

U.S. PATENT DOCUMENTS

| | | | |
|---|---|---|---|
| 11,755,555 B2* | 9/2023 | Paduroiu | G06F 16/2282 |
| | | | 707/696 |
| 2014/0089265 A1* | 3/2014 | Talagala | G06F 16/22 |
| | | | 707/674 |
| 2020/0201292 A1* | 6/2020 | Cella | G05B 23/0259 |
| 2020/0218617 A1* | 7/2020 | Knestele | G06F 9/5027 |
| 2020/0242103 A1* | 7/2020 | Paduroiu | G06F 16/2282 |
| 2020/0310884 A1* | 10/2020 | Villalobos | G06F 16/909 |
| 2021/0081396 A1* | 3/2021 | Tian | G06F 3/061 |
| 2021/0097061 A1* | 4/2021 | Amihod | G06F 16/20 |

OTHER PUBLICATIONS

European Search Report for European Patent Application No. 21155463.9 dated Jun. 28, 2021.
International Search Report and Written Opinoin for International application No. PCT/EP2022/052706 dated Apr. 29, 2022.
Rand Urbano et al. "Oracle Streams Concepts and Administration 10g Release 2 (10.2)—Chapters 2 4", Oracle, Oracle Documentation, Jan. 31, 2008 (Jan. 31, 2008).
Anonymous: "Exchanging XML Data with Oracle Streams AQ", Dec. 3, 2011 (Dec. 3, 2011), pp. 1-7.

* cited by examiner

1002
„CreateObjectDeltaObject" Type

| | |
|---|---|
| Delta Obj. Type: | createObject |
| Timestamp: | 02.11.2019 23:26:00 |
| Transaction-ID: | TR2934729323 |
| ObjectType: | Customer |
| Object-ID | BO239472934829 |

1004
„DeleteObjectDeltaObject" Type

| | |
|---|---|
| Delta Obj. Type: | deleteObject |
| Timestamp: | 02.11.2019 21:05:03 |
| Transaction-ID: | TR1374729323 |
| ObjectType: | Customer |
| Object-ID: | BO57646563 |
| List of P&A: | 1st Name=XXX, 2nd Name =XXX, Street=XXX, Zip Code=XXX, |

1006
„ChangePropertyDeltaObject" Type

| | |
|---|---|
| Delta Obj. Type: | changeProperty |
| Timestamp: | 12.11.2019 01:07:23 |
| Transaction-ID: | TR2342934729 |
| ObjectType: | Customer |
| Object-ID: | BO57646563 |
| PropertyID: | 2nd Name |
| NewValue: | Smith |

1008
„addObj2AssociationDeltaObject" Type

| | |
|---|---|
| Delta Obj. Type: | addObj2Association |
| Timestamp: | 14.12.2019 12:25:07 |
| Transaction-ID: | TR1668923 |
| ObjectType: | Customer |
| Object-ID: | BO576666563 |
| AssociationName: | hasOrdered |
| addedObjectID: | BO9323788 |
| addedObjectID-Position: | 5 |

1010
„removeObjFromAssocDeltaObject" Type

| | |
|---|---|
| Delta Obj. Type: | removeObjectFromAssoc. |
| Timestamp: | 15.12.2019 11:12:12 |
| Transaction-ID: | TR1625668925 |
| ObjectType: | Customer |
| Object-ID: | BO5293823617 |
| AssociationName: | hasOrdered |
| removedObjectID: | BO236482329384 |

Fig. 10

METHODS, SYSTEMS AND NON-TRANSITORY COMPUTER-READABLE MEDIA FOR PROCESSING CHANGED APPLICATION DATA BASED ON CORRESPONDING REQUIREMENTS

CROSS-REFERENCE TO RELATED APPLICATIONS

This application is a national phase under 35 U.S.C. § 371 of PCT International Application No. PCT/EP2022/052706 which has an International filing date of Feb. 4, 2022, which claims priority to European Patent Application No. 21155463.9, filed Feb. 5, 2021, the entire contents of each of which are hereby incorporated by reference.

FIELD OF THE INVENTION

The invention relates to methods and systems for data processing and/or data access control in various application scenarios such as internet of things, smart home, automated industrial workflows and heterogeneous software environments and in particular in application contexts where data integrity, data consistency, and data security is of high importance.

Background and Related Art

Software-based systems are becoming increasingly important in almost all areas of life. Industrial production processes are highly automated. Special programs continuously monitor the quality of the products, check whether the required starting materials and substances are available in sufficient quantity and quality and, if necessary, automatically ensure that replenishments are ordered or produced. Other programs are responsible for ensuring that the machines used in the production process meet safety standards to prevent robots or automatic transport systems from injuring people, to prevent limits on pollutant emissions or noise pollution from being exceeded, etc.

Especially when production is based on the "Internet of things" approach, a large number of autonomous or semi-autonomous units work together in a complex, dynamic yet coordinated manner. Starting materials, intermediate products and machines, sometimes also machine components and/or human users, exchange data and control commands with each other in a complex and dynamic way, for example to orchestrate a manufacturing process in such a way that a multitude of requirements with regard to quality, data integrity, data consistency, data or product safety and/or process efficiency are taken into account.

A further problem is that the data generated in a heterogeneous IT infrastructure often comprises sensitive information. Measures to increase data security and data integrity typically are in conflict with the flexibility and scalability of the IT infrastructure.

Also, in the private sector, heterogeneous hardware and/or software-based systems are increasingly being used, for example in the field of smart home, smart wearables, semi-autonomous driving, use of various services such as medical services, banking and insurance services etc. Here too, a large number of requirements must be met, for example with regard to the authenticity of the subscribers and/or the protection of the transmitted and/or stored data. In addition, the data may comprise sensitive data which needs to be protected from unauthorized access and/or manipulation.

In all the above-mentioned scenarios, hardware- and/or software-based systems are whose components are provided by different organizations. It is possible that the requirements with regard to security for the employees, with regard to the authenticity of the participants and/or the security and confidentiality of the transmitted, processed and stored data are defined by other organizations, which are not always identical with those organizations which provide the corresponding system components. Especially in the area of safety control or data security control, it is actually necessary for the control function to be performed by an organization other than the one that is responsible for executing the action to be controlled.

The large number of organizations involved and the associated heterogeneity of the software and/or hardware components of the system components involved poses a major problem with regard to the reliability, consistency, integrity and security of the complex and heterogeneous data processing workflows implemented in these systems. The objective of making a large number of system components interoperable with each other while taking into account various safety-related and other requirements at the same time means that, in the state of the art, the corresponding heterogeneous, complex systems can hardly be maintained or even extended after a relatively short period of operation. Due to the large number of interfaces and functional dependencies between the individual system components, it will at some point no longer be possible to carry out minor adaptations with regard to functionality and/or with regard to one or more requirements without also having to adapt a large number of dependent system components. As from a certain level of complexity, even the mutual dependencies between the operators of the system are no longer known, changes to the requirements and/or changes to the functionality of individual components quickly lead to the system's mode of operation ultimately no longer meeting the respective requirements without this being even noticed. Errors occur sporadically and their assignment to a specific system component becomes more and more impossible with increasing system complexity. Often, after a few years at the latest, a state is reached in which a constant adaptation of the system to new requirements is technically impossible or at least no longer economically justifiable. The problem is aggravated in application scenarios where requirements frequently change as any formulation of a new requirement and any modification of an existing requirement bears the risk that one or more system modules which have at least occasionally an impact on whether or not a requirement is met may be overseen.

Today, the logical consistency and requirements conformity of software programs are often implemented by means of various test procedures before delivery. However, it was often not possible to anticipate all possible user input in order to completely exclude errors.

In the context of heterogeneous software systems with a combination of different components and requirements that often cannot be foreseen in advance and that can change unpredictably over time, it is not possible to guarantee, solely on the basis of preliminary tests for the intended lifetime of a system component, that it will meet all requirements that may only become known and have to be met in the future. For example, maximum permissible limits for pollution and/or regulations regarding the transmission and storage of sensitive data that is considered safe change over time, often with different rules in different countries or for different application scenarios.

Thus, there is a need for technical solutions that allow flexibly controlling and adapting complex computer-implemented data processing tasks which in addition ensure data integrity and data security.

SUMMARY

It is an objective of the present invention to provide for an improved computer-implemented method and system for providing data processing control as specified in the independent claims. Embodiments of the invention are given in the dependent claims. Embodiments of the present invention can be freely combined with each other if they are not mutually exclusive.

In one aspect, the invention relates to a computer-implemented method for data processing control. The method comprises:

providing at least one append-only store;
providing a framework; in particular, the framework can be software, e.g., a software program or software module;
using an application program for performing change operations on application-born external objects at runtime of the application program, each application-born external object being a data object instantiated within the application program, the change operations comprising creating, modifying and/or deleting one or more of the application-born external objects in the application program, the application program being configured to notify the framework of any one of the change operations;
in response to any one of the change operations, automatically creating a delta object being indicative of a change of an attribute of at least one of the application-born external objects caused by the change operation, wherein the delta object is created by the framework;
sequentially storing, by the framework, a sequence of data objects in the at least one append-only store, the sequence of data objects comprising a mixture of delta objects and RS objects, each RS object being a data object specifying a requirement in respect to how attribute information of one or more of the application-born external objects comprised in the delta objects must be processed and output by the framework, wherein the framework comprises a set of framework-functions, wherein one or more of the framework functions are a functional extension of the application program and are configured to process, upon being called, attribute information comprised in one or more of the delta objects in accordance with the requirements stored in the RS objects;
executing one or more of the framework-functions for returning an output computed as a function of the attribute information in the delta objects which complies to the requirements specified in the RS objects.

Embodiments of the invention may have the advantage that a generic, flexible and highly scalable approach for processing and storing application data such that the stored and/or processed data conforms with flexibly changing requirements can be provided: the framework is a software program comprising one or more framework functions being functional extensions of the application program or of a plurality of application programs configured to solve the same or different computational tasks. This means that some of the functionalities of the application program (or the application program(s) are implemented within the application program(s), other functionalities which are functional extensions to the application program functions are implemented in the framework. The framework is instantiated independently of the one or more application programs. The framework does not only act as a functional extension of the one or more application programs. The framework in addition is configured to store the data changes induced by data change operations performed within the runtime environment of the application program(s) as well as change operations performed by the framework functions within the runtime environment of the framework in the same data format (delta objects) in the same data store. Hence, the framework acts as functional extension of one or more application programs and in addition as a persistence layer used for storing of data changes which are functionally related irrespective of whether they have been performed within the framework or within the application program. The delta objects stored in the append-only store may provide a history of all data changes performed within a given time period on external objects related to a particular functionality or entity (e.g., a natural or legal person, a machine, a vehicle or the like). This history of change operations may be used as basis for many different downstream data processing operations, e.g., reconstructing the state of the application program and the framework at a particular time, generating reports, performing statistical analysis, exporting selected parts of the external objects etc.

According to embodiments, the method for data processing control is a method for providing a tamper-proof archive of the dynamic state changes of the application program and the application-born external objects. The at least one append-only store is used as the tamper-proof archive.

According to embodiments, the tamper-proof archive is used as data basis by the framework for generating a report.

Hence, according to embodiments, the delta objects in the append-only store may provide a common data basis that may be accessible (preferably only via the framework) by other application programs being components of a heterogeneous, complex, multi-modular hard- and/or software-based system. In case an application program should lack some functions considered as necessary in order to comply with a particular requirement, the required function can easily be implemented as part of the framework. This may have the advantage that the framework function can be used as functional extension of their own functionality by other application programs having the same deficiency in respect to the requirement as well.

Embodiments of the invention may further have the advantage that the append-only store comprises a mixture of delta objects and RS objects specifying requirements on how the delta objects stored in the at least one append-only-store have to be accessed and processed. Hence, the framework may comprise framework functions which are functional extensions to the functionality of the application program (or of a plurality of different application programs) which may be used for processing payload data at runtime of the application program and/or framework functions that are used for accessing and processing delta object having been already stored in the append-only store. For example, a framework function may be used for exporting patient-related medical data such that the identity of the patient is not revealed. The framework function may act as a functional extension to a patient management software application by providing a "data export" functionality to the application program, e.g. a medical patient management software application, whereby the data export functionality complies with one or more requirements specified in respective RS objects, e.g. a data privacy requirement. This framework function, e.g., a data export function such as a "privacy compliant data export" functionality may be re-used by one or more further application programs. For example, a hospital using the framework as a functional extension for a patient management program may use this framework and this "data export functionality" in addition as a functional extension of a further application program used for the control of incoming and outgoing payments of the patients. For example, the framework "data export" function may allow exporting a history of all payments received from all patients in a certain time interval without revealing the identity of the patients to the receiver or the report, e.g., a tax authority or a tax inspector.

Embodiments of the invention may further have the advantage that an append-only store is a store that is adapted for reading and writing data sequentially very fast. As an append-only store does not allow modifications to existing data records, time and storage consuming processes and measures to ensure a later modification of an individual, already stored data record is not necessary. As the data changes performed within the application program and the data changes performed on respective external objects within the framework are stored in the same type of data objects, i.e., the delta objects, embodiments of the invention may allow providing the append-only store as a kind of functionally extended "overlay interface" for other applications (preferably only via the framework) which allows any other application program to make use of delta objects being the result of the combined action of functions of the application program and functional extensions to the application program provided by the framework.

Embodiments of the invention may further have the advantage that the append-only store does not only comprise the "payload data" in the form of the delta objects, the append-only store in addition comprise RS objects which define how the data contained in the delta objects must be processed. Preferably, only the framework or one or more specific application programs considered to be highly trustworthy are allowed to access, process and output the data stored in the append-only store.

According to embodiments, the RS object are created by the framework in response to a request of a client application to create an RS object, whereby the framework is configured to receive one or more requirement specification request from one or more clients, e.g. during the runtime of the application program. The RS objects are created independently of and/or asynchronous to the creation of the delta objects by the framework. According to embodiments, the RS objects are stored together with one or more of the delta objects within the context of integrated transactions.

According to embodiments, the sequence of data objects comprises a mixture of the delta objects and of access control objects—AC objects instead of the RS objects. According to other embodiments, the sequence of data objects comprises a mixture of the delta objects, the RS objects and of access control objects—AC objects. Each AC object is a data object specifying which user is to be allowed or denied by the framework to access delta objects comprising change information of a particular one of the application-born external objects. The method further comprises:

receiving, by the framework, a request of a user to access attribute information of at least one of the application-born external objects; and in response to receiving the request, traversing, by the framework, the at least one append-only store for processing AC objects comprising access control data in respect to the at least one application-born external object; and granting or denying, by the framework, the user access to attribute information comprised in the delta objects of the at least one application-born external object in dependence on the access control data in the processed AC objects; or outputting, by the framework, a report selectively comprising attribute information comprised in the delta objects of the at least one application-born external object which can be disclosed, according to the access control data in the processed AC objects, to the user.

Embodiments of the invention wherein the mixture of data objects comprises AC-objects can be used for data access control, e.g., for controlling which user or user group should be allowed to access attribute change information of selected attributes and of selected external objects. By integrating the AC-objects into the at least one append only store, a data archive is provided which intrinsically specifies which parts of the data in the archive should be disclosed when under which conditions to which user or user group. For example, the framework may selectively transform those parts (change information of selected attributes of selected external objects) of the archive which are allowed to be disclosed to a particular user according to the AC-objects in the at least one append-only store into a report or data output format which complies to data output requirements specified in the RS-objects in the append-only store.

For example, the steps of granting or denying the access and/or the outputting of the report may comprise traversing the at least one append-only store a second time, whereby attribute information comprised in the delta objects is processed and made accessible to the user in accordance with information specified in the RS and/or AC objects obtained during the first traversal of the at least append only store.

This may have the advantage that the delta objects as well as data objects which control access of one or more users to the delta objects and data objects which control how the data is to be processed are all stored in the same append-only store. This means that by transferring the content of the append-only store to a new location, e.g., a new, faster server computer, not only the payload data (delta objects) but also the complete access and process control is provided. This tremendously eases maintenance and increases security, because the payload data and processing and/or access control data form a monolithic unit of data which cannot be separated from each other and which can quickly be accessed by performing one or two sequential scans. Preferably, the append-only store is based on a sequence of adjacent data storage block, so the read-write-head of a storage device can acquire, in a first sequential scan, all the RS objects and/or AC objects which specify how to process the delta objects and who is allowed to process the delta objects, and can then acquire and process all the delta objects sequentially in a second scan of the at least one append-only store. The speed can be increased by storing all delta objects, RS objects and AC objects concerning attribute information of different application-born external objects in separate append-only stores.

This means that embodiments of the invention provide for a particular fast way of processing attribute data related to a particular application-born data object, e.g. a business object representing a machine, a vehicle, a legal or natural person or the like: all delta objects, RS objects and/or AS objects related to attribute information of a first vehicle instance V1 are stored in a first append-only store, all delta objects, RS objects and/or AS objects related to attribute information of a second vehicle instance V2 are stored in a separate append-only store. So, in order to determine if a particular user should be allowed to access attribute information of vehicle 2 and in order to determine if some of the attribute information of vehicle 2 needs to be anonymized, pseudonymized or otherwise hidden from the user requesting access, the framework does not have to scan or access the first append-only store. All the attribute information as well as access control data and/or the requirement information on how the attribute data is to be processed is comprised in the second append only store. In response to receiving a request for some data related to the vehicle 2, the framework will selectively scan the data content of the second append-only store which represents this vehicle 2 and not any one of the other append-only stores representing other application-born or framework-born external objects. Hence, basically all the information which is derived from one or more linear scans of the second append-only score will be relevant for processing the request in respect to vehicle 2, and the time for computing the response will be very short, even in case the application program should have instantiated millions of different application-born external objects.

It should further be noticed that contrary to state-of-the art approaches for storing payload data of application programs in relational databases, it is not necessary according to embodiments of the invention to perform table joins or other complex data operation where large amounts of memory or CPU capacity is consumed during the joins. Rather, as the framework is configured to create and manage multiple append-only stores which respectively represent one of the application-born or framework-born external objects, the framework will find all relevant attribute information as well as access control and/or data processing requirement information within a single, coherent data store which does not comprise data unrelated to the object of interest.

According to embodiments, the RS objects comprise an indication of how attribute values of one or more attributes of a particular external object is to be processed, whereby the indication is specified on a per-attribute level.

According to embodiments, the RS objects comprise an indication of which user or user group shall be allowed or denied access to attribute values of one or more attributes of a particular external object, whereby the indication is specified on a per-attribute level and a per-user or user-group level.

This may be beneficial as a highly flexible, fine-grained control of how data generated by an application program is processed, e.g., for report generation, and of which data is to be provide to which user.

According to embodiments, the storing of the data objects by the framework comprises:
  identifying, by the framework, for each of the delta objects to be stored, the one of the application-born external objects whose attribute change information is comprised in the delta object; and/or
  identifying, by the framework, for each of the RS objects to be stored, the one of the application-born external objects whose attribute information processing is controlled by this RS object; and/or
  identifying, by the framework, for each of the AC objects to be stored, the one of the application-born external objects whose attribute information access is controlled by this AC object;

For example, when the framework creates a delta object in response to a notification of an attribute change event or external object change event in the application program, or when the framework creates a new RS object and/or of a new AC object in response to receiving a specification of the RS object or AC object from a user via a GUI, the framework will identify an object-ID of the application-born external object or the framework-born external object which was changed or whose access control and/or processing will be affected by the AC object or RS object.

The method further comprises:
  identifying, by the framework, selectively for the identified application-born external object, a cryptographic encryption key which is specifically assigned to this application-born external object; and
  using the identified encryption key to encrypt the identified delta object, RS object and/or AC object, wherein the delta object, RS object and/or AC object are stored in the at least one append-only store in encrypted form.

For example, in case in the application program a new application-born external object representing a patient P2 is created, the framework will not only crate a delta object indicating the instantiation/creation of this new application-born external object P2, the framework will in addition create a cryptographic key pair, e.g., a symmetric cryptographic key or key pair. The framework stores these cryptographic keys in a secure space. For example, the framework may encrypt all keys created for the external objects with a framework-internal master key. Then, various attributes of patient P2 may be set in the application program such as address, current symptoms, diagnoses and/or medication, etc. The framework will automatically create delta objects reflecting these changes. All delta objects reflecting the creation, change and/or deletion of this patient data object P2 comprise an object-ID of this patient P2. The framework may automatically create some default RS objects which specify some default data processing routines, e.g. that diagnoses and symptoms should be output based on an accounting code of a particular insurance company or should be clustered based on a particular medical clustering algorithm and/or may create some default AS objects specifying that a doctor may have access to all the patient's information while the administrative staff has only access to the payment-related data of the patient. Before the delta objects, RS objects and/or AC objects related to patient P2 are stored in the (preferably P2-specific) append-only store, these objects are encrypted with the P2-specific encryption key (the private key in case of asymmetrical encryption).

This may have the advantage that in case any key should be lost or stolen, only the data of a single entity, e.g., patient P2, can be accessed. The data of other entities represented by application-born or framework-born external objects is not affected. Hence, a particularly fine-granular and secure way of storing data, of controlling the way this data is reported and/or of controlling who shall be allowed to access this data is provided.

According to embodiments, the framework is a software program intraoperatively coupled with the application program. Upon the instantiation of a new one of the application-born external objects in the application program, the application program sends a notification of the new application-born external object to the framework. The notification comprises an object-ID of the application-born external object which was instantiated. In response to receiving the notification, the framework automatically creates a symmetric or asymmetric cryptographic key pair. The key pair is specific to the application-born external object whose object-ID is indicated in the notification. The framework stores the cryptographic key pair in association with the object-ID of the application-born external object.

Preferably, the storing is performed such that the framework but no other software program or user can access the keys for decrypting the data objects in the at least one append-only store. For example, the framework can be configured to create and manage cryptographic keys for a plurality of different application-born external objects of one or more application programs. The cryptographic keys of the different application-born external objects can optionally be encrypted with a master key of the framework.

According to some embodiments, the framework comprises a registry of a plurality of users, whereby a user can be a natural or legal person or a software program or any other entity which can be implemented as a digital identity.

The framework can optionally comprise a configuration where some default access rights for some of the registered users or user groups may be specified.

The framework is configured to evaluate, upon receiving a data access request of a particular user in respect to an application-born external object of interest, to identify the cryptographic key stored in association with an object-ID of the application born external object of interest, and decrypt all delta objects, RS-objects and/or AC objects, if any, comprising the same object-ID (and preferably being stored in the same one of a plurality of different append-only stores). The framework analyzes the AC objects in order to determine if the user shall be granted access to information related to the external objects of interest. For example, an AC object may specify which user shall be allowed access to the attribute information of the external object of interest. The AC objects may also specify additional conditions regarding the time when a user shall be granted access, regarding the attributes which shall be accessible to this user and which should be hidden, and regarding the time during the "lifespan" of the external object of interest which shall be disclosed to the user having submitted the request. The framework will only decrypt those delta objects and disclose their content to the user which can be disclosed in accordance with the AC objects.

According to embodiments, in addition to or instead of the receiving of a request, the framework can comprise a scheduler for automatically generating one or more reports for one or more different users. The scheduler will trigger the above-described identification of one or more external objects relevant for the report to be generated, the identification of the cryptographic keys associated with the one or more identified external objects, the decryption of delta objects, AC objects and/or RS objects having the same object-IDs as the one or more identified external objects, and the generation of a report by the framework. For generating the report, the framework will analyze the AC objects to determine which users are allowed to receive the report, to determine which attributes of the external objects of interest shall be reported and/or to determine the time period to be covered by the report. When generating the report, the framework uses control information stored in the RS objects for processing the information comprises in the decrypted delta object such that some requirements are fulfilled. For example, the RS object may indicate a specific clustering algorithm to be used when generating the report.

According to embodiments, the framework is configured to store the sequence of data objects as at least one block chain. Each of the delta objects and each of the RS objects and/or AC objects represents one block. The method further comprises:

checking, by the framework, upon accessing any one of the blocks in the append-only store, whether a cryptographic hash of this block is comprised in the subsequent block in the blockchain;

if the cryptographic hash is comprised in the subsequent block, processing the accessed block; and otherwise outputting an alert and/or terminating the processing of the accessed block.

Embodiments of the invention using the above-mentioned blockchain technology may be highly advantageous for multiple reasons: the integrity of the data stored in the at least one append-only store is guaranteed. The blockchain technology ensures that in case any unauthorized person should manipulate one of the blocks, the cryptographic hash of this manipulated block will no longer be identical to the cryptographic hash of the original version of the block which is comprised in the subsequent block.

In a further beneficial aspect, embodiments of the invention allow using blockchain technology in the context of application programs comprising a large number of dynamically changing data objects, e.g., business object class instances which are instantiated dynamically in an unpredictable manner and whose attributes change over time. Existing block-chain applications require that each block represents a complete semantic unit or a complete transaction and are therefore often not able to cope with the dynamic and complex nature of data object instantiations and amendments occurring during the lifetime of an application-born data object. To the contrary, embodiments of the invention allow using blockchain technology not only for a limited set of predefined (database) transaction, but rather for providing a tamper-proof archive of the dynamic state changes of an application program and the application-born external objects.

In a further beneficial aspect, the use of the blockchain technology as specified above does not only ensure integrity of the payload data, but also of access control and data processing control instructions associate with the payload data: as the AC objects and RS objects, if any, which have the same object-ID of the same external object belong to the same blockchain, it is impossible to separate the payload data from RS objects or AC objects which specify how the payload data is processed and/or made available to various users. Hence, embodiments of the invention allow an operator of an application program to provide payload data generated by this particular application program to a receiving entity in a way that guarantees that payload data and the complete access control and data processing/reporting routines cannot be manipulated without this being noticed. For example, if one out of a plurality of append-only stores which comprises delta objects, RS-objects and/or AC objects related to a particular application-born external object is stored in the form of a blockchain wherein each of the delta objects, RS-objects and/or AC objects is a block interconnected to its subsequent block via a cryptographic hash, and wherein optionally each block is encrypted with the same external-object-specific cryptographic key, the receiving entity is not able to manipulate the AC objects and/or the RS objects in order to obtain more information than the receiving entity is entitled to see: the framework is configured to check, after the decryption of the blocks of the blockchain (if the blocks are provided in encrypted form) and before allowing a user to access information comprised in the append-only store and/or before generating a report, whether any one of the blocks was manipulated. If the check reveals a manipulation of one of the blocks of the blockchain, the framework will not allow the receiving entity to access the data stored in the delta objects in the append-only store and/or will not generate the report.

Hence, a data structure (here: the at least one block chain) is provided which comprises payload data as well as access control and/or data processing/reporting control in a tamper-proof monolithic block which inherently ensures data integrity both for the payload data and for the control data and which inherently ensures that any copy of this data structure, if imported into a framework instance, will only reveal attribute information to one or more users which shall be revealed in accordance with the AC/RS objects comprised therein.

As the block in each of the append-only stores is preferably encrypted, only a framework having the corresponding decryption key can access the content of the append-only store. Hence, only the same framework having created the append only store or a framework having been entrusted with the required decryption keys is able to decrypt the append-only data store. Any manipulation of a block and hence any manipulation to the payload data as well as to the access permissions and/or RS objects will be identified by the framework immediately.

According to embodiments, the at least one append-only store is a plurality of append-only stores. Each of the plurality of the append-only stores represents a respective one of the application-born and/or framework-born external objects. The framework is configured to store the delta objects, RS-objects and/or AC-objects comprising attribute change information, attribute processing information and/or attribute access information in respect to one of the external objects selectively in the one of the plurality of append-only-stores representing the one application-borne external object. Hence, each of the multiple append-only stores may comprise the totality of attribute change information, attribute process control information and access control data which is needed to ensure that any report or other output generated by the framework complies to data security and confidentiality requirements.

According to embodiments, the framework is configured to store the sequence of data objects comprised in each of the multiple append-only stores as a respective block chain. This means that each of the multiple append-only stores corresponds to a respective blockchain and that the sequence of delta objects, AC objects and/or RS objects stored consecutively on the one or more data storage media underlying the append-only store represents the sequence of blocks of the respective blockchain. Hence, each of the multiple append-only stores may comprise the totality of attribute change information, attribute process control information and access control data which is needed to ensure that any report or other output generated by the framework complies to data security and confidentiality requirements, and any manipulation of any element of the block will be identified by the framework and will enable the framework to prevent outputting a manipulated report, wherein both the attribute change information as well as the data processing control data and access control data are protected from manipulation.

According to embodiments, framework is interoperable with a plurality of different application programs and is configured to create, for each of the application programs, a plurality of block-chains, whereby the totality of block chains created for the same one of the multiple application programs are interconnected via cryptographic hashes and form a tree structure of interconnected blocks. Hence, for n application programs whose data object changes and respective RS-objects and/or AC-objects are persisted by the framework, a respective block-chain tree is created, whereby the creation of a new application-born external objects induces a new branch in the block-chain tree.

In the following, various embodiments will be described which specify how RS objects can be created, processed, used and/or stored. If not explicitly indicated otherwise, the AC objects can be created, processed, used and/or stored in the same way as the RS objects, the main difference between RS objects and AC objects being that the RC objects have the function of specifying one or more requirements in respect to how one or more delta objects should be processed by the framework before their content is reported or otherwise disclosed while the AC objects have the function of specifying to whom and under which conditions the framework should grant access to the information of these one or more delta objects.

According to embodiments, the framework and/or any other application program allowed to access and process the data in the append-only store must be programmed such that it is forced to analyze the requirements specified in the RS objects and to take into account these requirements when processing the delta objects. Hence, in case a requirement changes, it is sufficient to store a new RS object which specifies this new requirement in the append-only store. The framework and/or the other highly trustworthy program having access to the append-only store will ensure that the data in the delta objects will be processed and the result of the processing will be output to one or more client systems such that the requirements in the RS object are fulfilled.

Hence, embodiments of the invention may have the advantage that the append-only store can be used as a kind of highly flexible, functionally extended "overlay interface" for other applications, whereby this interface does not only provide access to data being the result of executing the application program but rather in addition includes one or more requirements in respect to how the data contained in the append-only store must be processed before it is output to any client. As a consequence, the data content and the respective requirements form an integrated data access layer which is flexibly adaptable to new requirements and which is in addition particularly robust against any later data manipulation.

According to embodiments, the framework is configured to evaluate all RS objects stored in the at least one append-only store which are assigned to one or more external data objects of interest for determining which ones of the attributes of the external data objects of interest and/or how these attributes are to be reported. Then, the at least one append-only store is traversed a further time to generate a report in accordance with the result of the evaluation of the RS objects during the first traversal.

For example, a first RS object RS1 may be created and stored in the append-only store on Jan. 3, 2020. RS1 specifies that the attributes "first name", "last name" and "day of birth" of all patient-related delta objects in the append-only store need to be pseudonymized before being exported to a client system. A second RS object RS2 is created and stored in the append-only store by the framework on Jan. 17, 2020. RS2 specifies that only the attributes "first name", and "last name" (but not the "day of birth") of all patient-related delta objects in the append-only store need to be pseudonymized before being exported to a client system. The framework acting as access interface in respect to the delta objects for one or more clients may receive a request of a client for medical data of one or more patients. In response to the request, the framework analyses all RS objects in order to determine which one(s) of the requirements stored in the RS objects are valid for the time period of interest for the client. For example, the framework may determine that RS1 can be ignored because its requirements are overruled by the requirements in the more recent RS2. The framework will then process the delta objects in accordance with the currently valid requirements specified in RS2 and return a requirement-compliant output. The system formed by a combination of the application program, the framework and the append-only store is robust against data manipulation attacks, because the append-only store does not allow modifications of already stored data objects such as delta objects or RS objects. At the same time, the system is highly flexible, because existing requirements can easily be overwritten simply by causing the framework to store one or more new RS objects whose requirements partially or completely overrule the requirements specified in other, already stored RS objects.

According to embodiments, the framework is instantiated on a computer system comprising a main memory. The executing of the one or more of the framework-functions comprises sequentially scanning the at least one append-only store at least a first time for processing the RS objects and/or AC objects comprised therein, and sequentially scanning the at least one append-only store at least a second time for processing the delta objects, thereby taking into account the requirements specified in RS objects (if any) and/or the access control constraints and/or permissions specified in the AC objects (if any) which have been processed in the first sequential scan. The size of the totality of the delta objects and RS objects and/or AC objects in the at least one append-only stores exceeds the size of the main memory. According to some examples, the at least one append-only store comprise a plurality of append-only stores and the size of the totality of the append-only stores exceeds the size of the main memory.

For example, the total size of the at least one append-only store may be more than 10%, or more than 100%, or more than 1000% larger than the size of the main memory of the computer system hosting the framework. Often, the main memory of a computer system may have less than 10 GByte while the data of the at least one append-only store may comprise more than a TByte of data.

Embodiments of the invention may have the advantage that both the application program data and also the requirement specifications are stored in a way that both can be processed without consuming large amounts of memory. In state-of-the-art systems using databases for processing data, the system may start swapping in case the amount of data to be processed and loaded into memory exceeds the size of the available memory. This may tremendously reduce performance of all software programs instantiated on the computer. Storing the delta objects and RS objects and/or AC objects in a store that supports sequential scanning and processing physically adjacent data objects may ensure that large amounts of data can be processed quickly also in case of very limited memory resources.

According to embodiments, the framework and the application program share an object model that defines types of external objects and attributes of the external object types. The object model defines how the external objects relate to one another. Each external object is a data object instantiated outside of the at least one append-only store. The external objects comprise the application-born external objects and framework-born external objects. Each framework-born external object being a data object instantiated in the framework. The executing of the one or more of the framework-functions comprises using the object model by one or more of the framework functions for creating, modifying and/or deleting framework—born external objects in the framework.

Embodiments of the invention may have the advantage that the business logic of the application program and the framework functions acting as functional extension of the application program are be seamlessly integratable, because the external objects created in the application program and in the framework are based on the same data model and hence also the delta objects specifying changes to these data objects are based on the same object model.

For example, the programmer of the framework may define a set of objects, object attributes, object methods and object relations to be used as an object model for a specific task. For example, the objects may represent sensors or other components of a vehicle and the task can be the generation and storage of a report of the sensor data and/or of internal states of the vehicle components. The object model may be defined by a system architect at design time of the framework and may be instantiated at runtime of the framework as an integral part of the framework. In addition, the object model can be stored in the form of a library, e.g., a Java class library, and used by a developer of the application program at design time of the application program for programming the business logic of the application program in accordance with the object model. For example, the application program can be a program for autonomous or semi-autonomous driving that takes into account sensor data and vehicle component state data provided by sensors and other components of the vehicle. For example, the object model may comprise classes, abstract classes and/or abstract interfaces which can be used by the programmer of the application program at design time of the application program to implement the business logic of the application program. For example, the programmer of the application program may define classes and methods in an object-oriented programming language such as Java which re-use, override and/or implement elements defined in the object model of the framework. Thereby, the use of a shared object model already at design time of the application program may have the advantage that it is ensured that the business logic of the application program and the framework functions provided as functional extension of the application program by the framework can be seamlessly integrated as both are based on the same object model. Hence, the delta objects defining external object changes are based on the same object model irrespective of whether they are created by the framework in response to an external object change event in the application program (e.g. upon measuring a new data value by a sensor) or whether they are created by the framework in response to an external object change event in the framework (e.g. upon determining that the new measurement data exceeds a safety threshold and should trigger an alarm message or an entry in an error report.

According to embodiments, the executing of the one or more of the framework-functions comprises performing change operations on framework-born external objects at runtime of the framework. The change operations comprise creating, modifying and/or deleting one or more of the framework-born external objects in the framework. The executing of the one or more of the framework-functions further comprises, in response to any one of the change operations performed on the framework-born external objects, automatically creating a delta object being indicative of a change of an attribute of at least one of the framework-born external objects caused by the change operation. The delta object is created by the framework. The sequence of data objects that is sequentially stored in the at least one append-only store comprises a mixture of a) the delta objects indicating changes to application-born external objects, b) the RS objects and c) delta objects indicating changes to framework-born external objects. The RS objects specify requirements in respect to how attribute information of one or more of the application-born external objects and/or framework-born external objects comprised in the delta objects must be processed by the framework.

According to embodiments, the format of the delta objects specifying changes to the application-borne external objects is identical to the format of the delta objects specifying changes to the framework-borne external objects.

Embodiments of the invention may have the advantage that any change event to an external object is persisted in the append-only store in the form of a delta object irrespective of whether the change occurred in the application program or in the framework. Hence, the framework provides a functional extension to the application program (and preferably also to one or more further application programs) that can be easily adapted by modifying the framework functions without modifying the source code of the application program. This advantage may be particularly relevant in use case scenarios where a framework function is used as a functional extension for a large number of application programs. For example, a framework function for normalizing technical measurement data according to a particular normalization or calibration schema before the data is further processed and/or persisted, a framework function for identifying, reporting and optionally blocking a financial transaction to a person listed on a "black list" of suspected terrorists etc. can be implemented not as part of the application program(s) but rather as part of the framework. In case the normalization or calibration schema used by a plurality of application programs (e.g., in the context of an internet-of-things industrial manufacturing process), the normalization or calibration schema can easily be amended by modifying the respective framework function. It is not necessary to amend the source code of the application program. Likewise, in case the content of the "black list" of suspected terrorists changes or in case the policy of reporting and blocking financial transactions to persons mentioned in this list changes, it is sufficient to modify the respective framework function only once for the change taking effect for one or more application programs using this framework as functional extension.

According to embodiments, the method comprises providing the application program, wherein the application program is configured to solve at least one computational task. The at least one computational task comprises a plurality of requirement-independent sub-tasks and requirement-dependent sub-tasks. At design time of the application program, the application program is implemented such that the source code of the application program implements software instructions for solving the requirement-independent sub-tasks. The framework receives (e.g., is automatically, semi-automatically or manually supplemented with) at least one of the framework functions specified by the user, wherein the at least one framework function implements software instructions for solving the requirement-dependent sub-tasks.

For example, the computational task can be the control of an industrial manufacturing process. Some sub-tasks may be requirement-independent, meaning that the sub-tasks are of such nature that any change in respect to how this sub-task is to be performed is unlikely or impossible. For example, some chemical processes require a given number of educts which are processed in a very narrow range of process parameters such as temperature or pressure. Any deviation from educt composition and from these process parameter values would result in dysfunctional or low-quality products. Hence, the sub-tasks of controlling the type of amounts of educts as well as the sub-tasks of setting the required process parameters can be considered as requirement-independent sub-tasks. To the contrary, the example computational task may comprise requirement-dependent tasks such as modifying the size of a product in dependence on a customer's request, generating reports which comply to data privacy requirements, data authenticity requirements or other requirements, or the like. Those sub-tasks are preferably not hard-coded in the application program at design time. Rather, the framework is supplemented (at design time of the application program or at an earlier or later moment in time) with one or more framework functions which implement the requirement-dependent sub-tasks. For example, but not necessarily, these one or more framework functions may completely or partially be implemented in the form of user-editable rules or scripting programs. This may have the advantage that the requirement-dependent sub-tasks can be modified easily and flexibly without having to recompile and/or redeploy the application program. According to some embodiments, the requirement-dependent sub-tasks implemented in the framework make use of the shared object model for instantiating framework-born external objects during their execution.

According to embodiments, the application program is provided together with a plurality of further application programs respectively configured to create framework-born external objects in accordance with the object model of the framework and configured to notify the framework of any change performed on one of their application-born external objects. Each one of the further application programs is configured to solve at least one computational task that differs from or is identical to the computational task of the above-mentioned application program. The at least one computational task of each of the further application programs comprises a plurality of requirement-independent sub-tasks and requirement-dependent sub-tasks. At design time of each further application program, the further application program is implemented such that the source code of the further application program implements software instructions for solving the requirement-independent sub-tasks. The framework receives (e.g., is automatically, semi-automatically or manually supplemented with) at least one of the framework functions specified by the user, wherein the at least one framework function implements software instructions for solving the requirement-dependent sub-tasks of the one or more further application programs.

According to embodiments, the application program implements the core of a workflow of a particular computational task (i.e., the business logic of a technical or medical task, or of an organizational, financial or other kind of task) in the application program (e.g., in the form of one or more requirement-independent sub-task) and implements additional functions which are more frequently affected by a change of requirement than the core in the framework (requirement-dependent sub-tasks). The requirement change may have technical, organizational, legal and/or other reasons. For example, additional functions and corresponding requirement-dependent sub-tasks which have a high likelihood of being affected by a change of requirement relate to the normalization, calibration, reporting, export, and/or archiving of the data processed and/or generated by the application program. Tasks like generating an error report for a technical system, normalizing sensor data of a technical system, pseudonymizing or anonymizing person-related sensitive data that shall be exported are typical examples for additional functions which are more frequently affected by a change in requirements than standard business workflow core functions. Of course, the question which functional aspect of a software program will be subject to a frequent requirement change depends on the individual use case scenario of the software system. The situation may be different for different use case scenarios like industrial production control using internet of things techniques, the management of sensitive patient data by a joint venture of multiple hospitals, a smart home application or a complex, heterogeneous software environment used by a financial institution or insurance company.

According to embodiments, the RS objects specify requirements in accordance with the shared object model.

For example, the object model may specify a set of object types such as "patient", "blood analysis device", "DNA sequence analysis device", "disease" and "symptom". Each object type may comprise one or more attributes. For example, the object type "patient" may have attributes such as "name", "address", "diseases", "current symptoms", "treatments", "medications", "blood analysis results" and "sequencing results". The RS object may be specified such that each RS object created and stored by the framework solely refers to object types, attributes and object relations defined in the object model. This ensures that the requirements match the syntactical and semantical structure of the object types defined in the object model.

Embodiments of the invention may have the advantage that the requirements are specified based on the object model in an object-source-agnostic but object model dependent manner. The RS-objects which specify how the already stored delta objects need to be processed by the framework for generating an output for a client. As the RS-objects comply with the shared object model, it is ensured that the semantic and syntactic structure of the requirements match the semantic and syntactic structure of the shared model.

According to embodiments, one or more of the framework-functions are rule-based or scripting-based functions. The method comprises providing an interface by the framework, whereby the interface enables a user to edit the rule-based or scripting-based functions. For example, the interface can be a GUI that enables a user to create and/or modify one or more of the framework functions without requiring programming skills. For example, the rules can have the form of regular expressions and/or can be represented and modified via graphic symbols and editable text fields of a GUI. This may have the advantage that the rules can be adapted to changed requirements easily also by users who do not have programming skills.

According to some embodiments, the scripting-based functions are specified using scripting languages such as Python, JavaScript, or Groovy.

According to embodiments, the framework functions comprise framework functions implementing requirement-dependent sub-tasks of a computational task to be solved by the application program.

In addition, or alternatively, the framework functions can comprise functions providing reporting and/or data analysis functions configured for processing data generated by the application program and stored in the form of delta objects in the at least one append-only store.

In addition, or alternatively, the framework functions comprise functions which automatically and/or in response to receiving input from a user create, modify or delete requirements to be used by one or more other framework functions for generating an output. For example, the creation, modification and/or deletion of requirements may involve the creation and storing of a new RS object which specifies one or more requirements which overrule existing requirements specified in already stored RS objects, if any. These requirement specification functions can be configured to receive a requirement specification from a user via a GUI of the framework, or from a local or remote client via a local or remote requirement interface.

According to some embodiments, one or more of the framework functions may combine two or more of the above-mentioned functionalities. According to embodiments, one or more of the above-mentioned framework functions make use of an object model (which is shared with one or more application programs which are interoperable with the framework and notify the framework of any changes to application-born external objects) for creating framework-born external objects when being executed. In response to a change of one of these framework-born external objects, a delta object is created and stored by the framework.

According to embodiments, the application program is free of program functions for storing application-born external objects or data returned by functions of the application-born external objects in a non-volatile storage medium.

In addition, or alternatively, the framework acts as the only interface of the application program for storing application-born external object data in a non-volatile storage medium. The framework solely uses the at least one append-only store for storing application-born external object data in the form of delta objects.

In addition, or alternatively, the framework acts as the only interface of the application program for returning an output to a client.

In addition, or alternatively, the at least one append-only store is configured to exclusively allow the framework to read data from and/or to write data to the at least one append-only store.

Embodiments comprising one or more of the above-mentioned features may have the advantage that it is ensured that the application program does not output "non-compliant" results to any other application program or user. The above-mentioned/features and/or system components ensure that the framework is the only available interface for accessing the data generated by the application program and stored in the append-only store: the application program itself may not comprise any data output interface and may not allow a client to request data processing results directly. The task of storing data generated by the application program is delegated completely to the framework. This may also ensure that the software routines used for generating and storing the delta objects and the software routines for reading and processing the delta objects and RS objects for creating and returning an output complies to the requirements specified in the RS objects. As the application program is not used for persisting, reading and returning data to a client, the programmer of the application program does not have to care about requirements relating to the question how and which type of data is to be stored and how and which type of data can be output to a client in a way that a set of requirements are met. This task is performed centrally by the framework.

According to embodiments, the computer-implemented method further comprises: receiving, by the framework, a requirement specification from a client; and in response to the receiving of the requirement specification, creating, by the framework, one of the RS objects. The created RS object specifies the received requirement. The created RS object is then stored in the append-only store.

For example, the framework functions can comprise one or more framework functions which are responsible for creating RS objects in response to and in accordance with a requirement request of a client.

According to embodiments, the requirement specification (which can be provided e.g., within a request from a client and/or which can be stored in one or more of the RS objects in the append-only store) is indicative of one or more elements selected from a group comprising:

- a specification of a requirement in respect to the output; for example, the requirement may specify one or more attributes of one or more external object types whose change or current state needs to be persisted; in addition, or alternatively, the requirement may specify the format of the output to be generated; in addition, or alternatively, the requirement may specify how data comprised in delta objects related to external objects of one or more different object types is to be checked, normalized and/or aggregated in order to generate the output;
- an ID of a predefined requirement in respect to the delta objects stored in the framework; for example, the framework may comprise a set of predefined requirements and rules which specify how the delta objects shall be processed for generating output and the RS object may merely comprise an ID to one of these predefined requirements rather than a fully specified requirement;
- an ID of an application-born and/or framework-born external object whose data is to be included or excluded from the output; preferably, each delta object comprises an object-ID of the external object whose change triggered the creation of the delta object; for example, the object-ID may identify a particular person, e.g. a particular patient or customer, or a particular machine, product, sensor or the like; the object-ID in a requirement may be used for selectively ignoring or hiding (e.g. encrypting, anonymizing, pseudonymizing or excluding) data related to attributes of this particular object when processing the delta objects for generating the output;
- an ID of an attribute of an application-born and/or framework-born external object whose data is to be included or excluded from the output;
- an ID of a framework function or framework function sub-routine that is to be used for computing the output from attribute information comprised in the delta objects, wherein this framework or sub-routine ensures that the output complies to a particular requirement;
- a specification of a criterion that is to be compared with the attribute information during output computation, wherein a match of the criterion has an impact on output computation, wherein the criterion is in particular a numerical threshold, a blacklist of attribute values, a whitelist of attribute values, a mathematical expression, or a regular expression; for example, the requirement can comprise an attribute-specific threshold and one or more external object type-IDs and the framework function can be configured to automatically generate an output in the form of a message or an alert in case a newly created delta object indicates that one of the said attributes of an instance of one of the said external object types is above or below the threshold;
- an indication of one or more time intervals during which the output must comply to a particular requirement; for example, a new data protection law may be represented in the form of some requirements indicating that all data in delta objects having been created and stored after this new law came into force have to be hidden when generating an output; it is possible that the append-only stores comprises many different RS objects having different requirements with different or overlapping time intervals during which the respective requirement is valid and/or having effect on different external object types.

According to embodiments, the executing of the one or more framework functions comprises:

- receiving, by the framework, a request for obtaining a particular type of output from a client; for example, the request may be a request for a report, a request for analyzing all or a subset of the delta objects for solving a computational problem, e.g. for computing a medical diagnosis, for performing a computer simulation of a technical system, for reporting all financial transactions which were performed within a particular time interval and/or by a particular group of people, etc.; this step is optional; instead of receiving a request from a client, the framework may receive a trigger signal created internally by the framework or by a software program different from the client to receive the output;
- in response to the receiving of the request (or the receiving of the trigger signal), traversing, by the framework, the at least one append-only store a first time, thereby selectively processing the RS objects stored in the traversed at least one append-only store for extracting requirement specifications associated with the requested type of output;
- traversing, by the framework, the at least one append-only store a second time, thereby extracting attribute information from one or more of the delta objects stored in the traversed at least one append-only store and processing the extracted attribute information in accordance with the extracted requirement specifications for computing the output compliant to the extracted requirement specifications; and
- returning the output to the client.

This two-step approach for generating output data based on the data stored in the delta objects may have the advantage that the framework may ensure that during the evaluation and processing of the delta objects for generating the output, the requirements specified in the RS objects are taken into account. As all RS objects in the append-only store are analyzed first, the framework is able to determine if there is a conflict between the requirements specified in different RS objects and to resolve these conflicts, if any. For example, an RS object RS1 may specify that the attribute A1 of a particular object type "patient" must be pseudonymized for all patients living in a particular state S1 while the same attribute of patients in another state S2 do not have to be pseudonymized. As a consequence of a new law on data protection in state S2, also the attribute A1 of patients living in S2 need to be pseudonymized and a new RS object RS2 comprising this requirement in respect to patients of states S1 and S2 is stored in the append-only store. As RS2 has a younger storing time than RS1, the framework according to some embodiments may resolve the conflict by ignoring all requirements specified in RS objects which are overridden by other RS objects having a younger storing date. However, other approaches of resolving requirement conflicts are also possible. For example, different RS objects may have assigned different levels of priority and in case of a conflict, the RS object with the higher priority level overrides the requirements specified in RS objects with a lower priority level.

Embodiments using the two-step approach may have the advantage that a highly flexible and at the same time highly complex way of specifying and taking into account requirements is provided: adding new requirements or modifying existing requirements is very simple and requires merely the storing of a new RS object in the append-only store. The framework may use complex schemes for resolving requirement conflicts, e.g., based on the time of storing the RS object and/or based on priority scores of the RS objects and/or based on other criteria. Contrary to state-of-the-art approaches in which requirements are hard coded in the source code of each application program individually, embodiments of the invention may be much more flexible in terms of adding or modifying requirements which should take effect on one or more application programs.

According to embodiments, the at least one append-only store is a plurality of append-only stores. The method further comprises:
creating, by the framework, for each of the application-born external objects and/or for each of the framework-born external objects, a respective data stream; and
assigning, by the framework, to each of the data streams a respective one of the append-only stores.

According to embodiments, the sequentially storing of the sequence of data objects in the multiple append-only stores comprises:
adding every delta object created in response to a change operation performed on one of the external objects selectively to the data stream created for this external object; and
perform the storing of the delta objects such that all delta objects being indicative of a change of a particular one of the external objects are stored selectively in the one of the append-only stores assigned to the data stream assigned to this particular external object.

Embodiments of the invention may have the advantage for each external object a respective data stream and append-only store is created. This may accelerate the processing of delta objects in application scenarios where object-specific reports and analysis are to be performed. For example, if the external object is a patient and if the output to be computed based on the delta object of the patient-specific append-only store is a prediction of a diagnosis or a suggested treatment, then the sequential scanning of the delta objects for creating the output can be performed much faster compared to an implementation using a single append-only store for the delta objects of all patients or all types and instances of the external objects.

According to embodiments, the method further comprises creating, by the framework, one of the RS objects; identifying, by the framework, one or more of the external objects to which the requirement specified in the created RS object applies; and instantiating, by the framework, as many copies of the created RS objects as external objects have been identified. The storing of the RS objects is performed such that in each of the append-only stores to which one of the identified external objects is assigned via a data stream, a respective one of the RS object copies is stored.

According to preferred embodiments, the framework is configured to evaluate, upon creating or storing a new RS object, the one or more external objects which are or can be affected by the requirement specified in the RS object. The new RS object is then stored—potentially after creating several RS object copies—in each of the external object specific append-only stores used for storing delta objects of an external object identified to be affected by the requirement in the new RS object. This may ensure that each of the append-only stores does not only comprise the delta objects of a particular external object but also all RS objects which specify requirements which are of relevance for this particular delta object. For example, the append-only store used for selectively storing delta objects of the patient object "Tim Smith" may comprise many different RS objects comprising requirements in respect to patient data safety, but will typically not comprise any RS object comprising a requirement which merely applies to the external object "blood analysis device RS23973".

According to embodiments, the method is performed on a computer system comprising multiple processing units. The method comprises automatically assigning the data streams to different ones of the processing units for processing the data streams in parallel.

In addition, or alternatively, each of the multiple append-only stores is comprised in a respective physical storage device and the storing of the data streams in the multiple append-only stores is performed in parallel.

Embodiments of the invention may have the advantage that the storing and also the sequential reading and processing of the delta objects may be tremendously accelerated.

According to embodiments, the at least one append-only store comprises delta objects indicating external object changes of application-born external objects of two or more different applications and/or of framework-born external objects having been created or modified while a framework function was executed (sequentially or in parallel) as a functional extension of the two or more application programs. Preferably the delta objects are stored such that they can be assigned to the one of the two or more application programs whose execution resulted in the creation of the said delta object. Accordingly, the framework comprises framework functions configured to act as functional extension of the two or more application programs and is configured to manage the storing of delta objects indicating external object changes performed within the two application programs or performed in the framework as a result of performing a framework function as a functional extension of the two or more application programs.

According to embodiments, the method further comprises:
using a further application program for performing further change operations on further application-born external objects at runtime of the further application program, each further application-born external object being a data object instantiated within the further application, the further change operations comprising creating, modifying and/or deleting one or more of the further application-born external objects in the further application program, the further application program being configured to notify the framework of any one of the further change operations;
in response to any one of the further change operations, automatically creating a further delta object being indicative of a change of an attribute of at least one of the further application-born external objects caused by the further change operation, wherein the further delta object is created by the framework;
sequentially storing, by the framework, a sequence of further data objects in the at least one append-only store, the sequence of further data objects comprising a mixture of further delta objects and further RS objects and/or further AC objects, each further RS object being a data object specifying a requirement in respect to how attribute information of one or more of the further application-born external objects comprised in the delta objects must be processed and output by the framework, each further AC object being a data object specifying access control constraints or privileges in respect to attribute information of one or more of the further application-born external objects comprised in the delta objects, wherein the set of framework-functions comprises at least one framework function being a functional extension of the further application program and being configured to process, upon being called, attribute information comprised in one or more of the further delta objects in accordance with the requirements stored in the further RS objects; and executing the at least one framework-function being a functional extension of the further application program for returning a further output, the further output being computed as a function of the attribute information in the delta objects, the output complying to the requirements specified in the further RS objects and/or the output being returned to one or more users in accordance with the access control constraints and/or privileges of the AC objects.

Embodiments may have the advantage that functions of a plurality of application programs which may be particularly affected by frequent requirement changes are implemented centrally within the framework which in addition is adapted to act as central persistence layer that is responsible for persisting, processing and/or outputting data generated by the two or more application programs such that a plurality of requirements which may change frequently are fulfilled.

According to embodiments, the application program, the framework and the further application program share the same object model that defines types of external objects, further external objects, attributes of the external object types and attributes of the further external object types.

In addition, or alternatively, one or more of the framework functions are functional extensions of the application program and of the further application program.

In addition, or alternatively, one or more of the RS objects and the further RS objects are identical. For example, some RS objects may comprise requirements which are relevant for all application programs configured to use the framework as functional extension. Some further ones of the RS objects may comprise requirements which are relevant only for a subset of the application programs.

In addition, or alternatively, one or more of the AC objects and the further AC objects are identical. For example, some AC objects may comprise a constraint that an attribute change information of a particular attribute and/or of a particular application-born or framework-born external object should only be output to/be accessible for users having authenticated with biometric credentials or should only be output if the change happened during a particular time period or affected a particular external object. Hence, it is possible to provide a flexible, fine-granular access control in respect to external objects shared by multiple different application programs without having to modify the application programs and without having to modify user permissions multiple times for each of the application programs.

Hence, embodiments of the invention may provide for a system and method able to support compliance of a plurality of heterogeneous application programs to a plurality of heterogeneous requirements and/or access rights in a fine-granular and flexibly adaptable manner.

According to embodiments, the plurality of change operations and the creation and storing of the delta objects are performed within integrated transactions. Each integrated transaction covers one or more of the change operations performed within the application program and at least the creation and storing of the delta objects triggered by the said one or more change operations.

Embodiments may have the advantage that the content of the append-only store is ensured to be in sync and is consistent with the application program.

According to embodiments, one or more of the integrated transactions respectively cover at least the creation and storing of one or more of the delta objects, the creation and storing of one or more of the RS objects and/or the creation and storing of one or more of the AC objects.

Embodiments may have the advantage that the content of the append-only store not only comprises the delta objects created within a given integrated transaction and the time interval covered by this transaction, but also all RS objects and/or AC objects created within this time interval. This may ensure that the data and the requirements specifying how this data is to be processed and/or access control data related to the information comprised in the delta objects is in sync. In case the creation and/or storage of a new RS object and/or a new AC object in the framework fails, also the creation and storage of delta objects within the integrated transaction covering the failed RS object or AC object creation will be stopped or revoked.

According to preferred embodiments, the framework and/or the append-only store comprises a cache for temporarily storing the delta objects and/RS objects before they are written into the append-only store. Each integrated transaction defines an integrated transactional context in which any one of the following events:

a failure to store within the integrated transaction a delta object in the at least one append-only store; and/or a failure to store within the integrated transaction a RS object in the at least one append-only store; and/or a failure to perform within the integrated transaction the creation of an RS-object by the framework; and/or a failure to perform within the integrated transaction the creation of an AC-object by the framework; and/or a failure to perform within the integrated transaction a change operation on an application-born external object in the application program;

induces the following actions:

a reversal of all application-born external object changes in the application program having already been performed in the said integrated transaction; and a deletion of all RS objects created by the framework in the said integrated transaction; and a deletion of all delta objects and RS objects having already been written in the cache in the said integrated transaction.

Embodiments of the invention may have the advantage that the content of the append-only store is logically consistent with the state of the external objects in the one or more application programs being interoperable with the framework and comprises all RS objects having been created within the context of a particular transaction.

According to embodiments, the delta objects (and RS objects and/or AC objects, if any) which are stored in the cache are deleted from the cache after a successful commit event of the transaction and upon a rollback of the transaction.

According to embodiments, the application program is configured to define a desired end of each of the integrated transactions in the form of a commit-ready signal. For example, the commit-ready signal can be a closing curly bracket indicating the end of a method whose begin and end of execution is programmed to correspond to the begin and end of an integrated transaction.

The method further comprises:
  sorting, by the framework, the ones of the delta objects and RS objects and/or AC objects created within different ones of the integrated transactions in accordance with the chronological order of the commit ready signals of the integrated transactions comprising the respective delta objects and RS objects; and
  performing the storing of the sorted delta objects and RS objects and/or AC objects in the at least one append-only store such that:
    delta objects and RS objects and/or AC objects belonging to the same integrated transaction are stored in accordance with the chronological order of their creation within the said integrated transaction; and such that
    delta objects and RS objects and/or AC objects belonging to different ones of the integrated transactions are stored in accordance with the chronological order of the commit ready signals of the different integrated transactions comprising.

For example, the application program may begin executing a function, thereby triggering the begin of a new integrated transaction. The opening of the function is communicated to the framework to enable the framework and the application program to create an integrated transaction context spanning both the application program, the framework and the append-only-store. During the execution of this function, the attribute A1 of an application-born external object EO1 "Customer Will Smith" is changed at a time t1. Then, the same attribute A1 is changed a second time into a new attribute value at time t2. Then, another attribute A2 of EO1 is changed into a new attribute value at time t3. Each external object change is communicated to the framework and causes the framework to create a delta object being indicative of the change. Each delta object may comprise an identifier of the attribute that was changed, the new attribute value, the time of change, an ID of the extended object comprising the changed attribute, and an ID of the integrated transaction within which the change occurred. The framework is configured to create and store within the integrated transactions delta objects being indicative of the changes performed within the application program at times t1, t2 and t3. Preferably, the chronological order of creating the delta objects is identical to the chronological order of external object changes occurring within an integrated transaction and the chronological order of storing the delta objects to the append-only store is identical to the chronological order of creating the delta objects. Then, the function of the application program closes, whereby the closing of the function is communicated as a commit-ready signal to the framework. The framework upon receiving a commit ready signal commits the integrated transaction. This implies that in case an error occurs during the modification of an external object in the application program, during the modification of an external object in the framework, during the creation or the storing of a delta object, all other actions performed within the same integrated transactions are revoked.

Storing the delta objects created in an integrated transaction in the same chronological order as the external object changes occurred in the application program may have the advantage that the state of a particular external object and/or the state of the whole application program can be easily and very quickly be reconstructed by sequentially traversing the sequentially stored delta objects in the append-only store. For example, the framework can be configured to create UNDO operations upon sequentially traversing the append-only store beginning with the most recently stored delta object, whereby each UNDO operation is derived from one or more of the delta objects and is adapted to undo the change of the external object specified by the delta object. According to another example, the framework can be configured to create REDO operations upon sequentially traversing the append-only store beginning with the oldest delta object stored, whereby each REDO operation is derived from one or more of the delta objects and is adapted to re-apply the change of the external object specified by the delta object on an external object not yet reflecting this change.

According to embodiments, the application-born external objects are digital representations of physical objects and the application program is an internet-of-things application. For example, the application-born objects can represent physical objects such as machines, machine parts, sensors, vehicles, computers, network devices, natural or legal persons like patients, customers or companies or the like. In addition, or alternatively, the application-born external objects are business objects of the application program. A business object may represent a physical object or may represent a virtual object, e.g., an intermediate result useful for performing data processing tasks.

In a further aspect, invention relates to a computer-implemented method for data access control. The method comprises:
  providing at least one append-only store;
  providing a framework; in particular, the framework can be software, e.g., a software program or software module;
  using an application program for performing change operations on application-born external objects at run-time of the application program, each application-born external object being a data object instantiated within the application program, the change operations comprising creating, modifying and/or deleting one or more of the application-born external objects in the application program, the application program being configured to notify the framework of any one of the change operations;
  in response to any one of the change operations, automatically creating a delta object being indicative of a change of an attribute of at least one of the application-born external objects caused by the change operation, wherein the delta object is created by the framework;
  sequentially storing, by the framework, a sequence of data objects in the at least one append-only store, the sequence of data objects comprising a mixture of delta objects and AC objects, each AC object being a data object specifying access control data, in particular access constraints and/or access privileges, in respect to attribute information of one or more of the application-born external objects comprised in the delta objects, wherein the framework comprises a set of framework-functions (220), wherein one or more of the framework functions are access control functions configured to control access of one or more user to the attribute information comprised in the delta objects in accordance with the access control data stored in the AC objects;
  executing one or more of the access-control framework-functions for controlling access of one or more users in respect to attribute information in the delta objects in accordance with the AC objects.

In a further aspect, the invention relates to a computer program product comprising computer-executable instructions which, when executed by a processor, cause the processor to execute the method steps performed by the framework. According to some embodiments, the computer program product further comprises the at least one append-only store and/or comprises computer-executable instructions which, when execute by the processor, cause the processor to execute the method steps performed by the one or more application programs being interoperable with the framework for propagating external object changes to the framework as described herein for embodiments of the invention.

In a further aspect, the invention relates to a computer program and/or a computer program product comprising computer executable instructions for performing a method for data processing control and/or data access control according to any one of the embodiments described herein.

In a further aspect, the invention relates to a computer-system comprising the framework. According to some embodiments, the computer system further comprises the at least one append-only store and/or one or more application programs being interoperable with the framework for propagating external object changes to the framework as described herein for embodiments of the invention.

In a further aspect, the invention relates to a computer-system comprising at least one append-only store and a framework operatively couple to at least one application program.

The application program is configured for performing change operations on application-born external objects at runtime of the application program. Each application-born external object is a data object instantiated within the application program. The change operations comprise creating, modifying and/or deleting one or more of the application-born external objects in the application program. The application program is configured to notify the framework of any one of the change operations.

The framework is configured for:
in response to any one of the change operations, automatically creating a delta object being indicative of a change of an attribute of at least one of the application-born external objects caused by the change operation;
sequentially storing a sequence of data objects in the at least one append-only store, the sequence of data objects comprising a mixture of delta objects and RS objects; each RS object is a data object specifying a requirement in respect to how attribute information of one or more of the application-born external objects comprised in the delta objects must be processed and output by the framework; the framework comprises a set of framework-functions, each framework function is a functional extension of the application program and is configured to process, upon being called, attribute information comprised in one or more of the delta objects in accordance with the requirements stored in the RS objects; and
executing one or more of the framework-functions for returning an output computed as a function of the attribute information in the delta objects which complies to the requirements specified in the RS objects.

According to embodiments, the computer system further comprises the at least one application program.

In a further aspect, the invention relates to a computer-system comprising:
at least one append-only store;
a framework operatively coupled to at least one application program;
wherein the application program is configured for performing change operations on application-born external objects at runtime of the application program, each application-born external object being a data object instantiated within the application program, the change operations comprising creating, modifying and/or deleting one or more of the application-born external objects in the application program, the application program being configured to notify the framework of any one of the change operations;
wherein the framework is configured for:
in response to any one of the change operations, automatically creating a delta object being indicative of a change of an attribute of at least one of the application-born external objects caused by the change operation;
sequentially storing a sequence of data objects in the at least one append-only store, the sequence of data objects comprising a mixture of delta objects and AC objects, each AC object being a data object specifying access control data, in particular access constraints and/or access privileges, in respect to attribute information of one or more of the application-born external objects comprised in the delta objects, wherein the framework comprises a set of framework-functions (220), wherein one or more of the framework functions are access control functions configured to control access of one or more user to the attribute information comprised in the delta objects in accordance with the access control data stored in the AC objects;
executing one or more of the access-control framework-functions for controlling access of one or more users in respect to attribute information in the delta objects in accordance with the AC objects.

In a further aspect, the invention relates to a data structure comprising a sequence of data objects. The sequence of data objects comprises a mixture of delta objects and RS objects and/or AC objects. Each delta object is indicative of a change of an attribute of at least one application-internal data object (e.g., an "application-born external object" described herein) of an application program. Each RS object is a data object specifying a requirement in respect to how attribute information of one or more of the application-internal data objects comprised in the delta objects must be processed and output by a framework. Each AC object is a data object specifying which user is to be allowed or denied by the framework to access delta objects comprising change information of a particular one of the application-internal data objects. The sequence of data objects is stored as at least one block chain, wherein each of the delta objects and each of the RS objects and/or AC objects represents one block.

Hence, this data structure provides for a tamper-proof monolithic unit of payload data, data processing control data and/or access control data, whereby any manipulation of the payload data as well as the control data and the chronologic order of the data objects in the data structure can be detected immediately.

In a further aspect, the invention relates to a transitory or non-transitory storage medium comprising the data structure.

According to embodiments, the data structure is an append-only store or a set of append-only stores.

According to embodiments, the framework is a software program which provides the only access layer via which one or more users can retrieve information on attribute values and value changes of the application-internal data objects of the application program, whereby the framework is configured to process the information output to the users in accordance with requirements in the RS-objects and/or is configured to provide the information in accordance with access control data specified in the AC-objects.

According to embodiments, the data structure comprises at least one further block-chain comprising a mixture of further delta objects, further AC-objects and/or further RS-objects, wherein each further delta object is indicative of a change of an attribute of at least one application-internal data object of a further application program.

For example, the data structure can be used as a tamper-proof archive and/or as tamper-proof data basis for report generation, whereby the report complies to requirements stored as an integral part of the data basis and/or discloses information only to selected users or user-groups in accordance with access control data being an integral part of the data basis.

A "computer system" as used herein is a machine or a set of machines that can be instructed to carry out sequences of arithmetic or logical operations automatically via computer programming. Modern computers have the ability to follow generalized sets of operations, called "programs", "software programs" or "software applications". These programs enable computers to perform a wide range of tasks. According some embodiments, a computer system includes hardware (in particularly, one or more CPUs and memory), an operating system (main software), and additional software programs and/or peripheral equipment. The computer system can also be a group of computers that are connected and work together, in particular a computer network or computer cluster, e.g., a cloud computer system. Hence, a "computer system" as used herein can refer to a monolithic, standard computer system, e.g., a single server computer, or a network of computers, e.g., a cloud computer system. In other words, one or more computerized devices, computer systems, controllers or processors can be programmed and/or configured to operate as explained herein to carry out different embodiments of the invention.

A "blockchain" as used herein is a list of records, called blocks, that are linked using cryptography. Each block contains a cryptographic hash of the previous block, and additional data, e.g., attribute change information in case the block is a delta object, requirement specifications in case the block is a RS object, or access control data in case the block is an AC object.

A "cryptographic hash" as used herein is a mathematical algorithm that maps data of arbitrary size (often called the "message") to a bit array of a fixed size (the "hash value", "hash", or "message digest"). It is a one-way function, that is, a function which is practically infeasible to invert. According to embodiments, the only way to find a message that produces a given hash is to attempt a brute-force search of possible inputs to see if they produce a match.

A "requirement" as used herein is a specification of a need or one or more criteria which must be satisfied by a software function and/or by a data set. For example, a requirement can represent a technical, organizational and/or legal requirement or a mixture thereof. A requirement can specify, for example, one or more criteria that must be fulfilled by a data analysis result before it is output to a client. A requirement can specify a technical threshold and can be used by a software program, e.g., the framework, for continuously comparing dynamically modified attribute values with the threshold for triggering a reaction in case a new attribute value exceeds or falls below a threshold.

A "data object" as used herein is a data object within a software application. A data object can be, for example, an external object or an RS object or a delta object or any other type of data structure comprising data.

According to preferred embodiments, an external object is an instance of a class written in an object-oriented programming language such as, for example, Java. For example, an external object can be a Java bean. An external object can comprise one or more variables, also referred to as "properties" or "attributes", and respective data values. In some embodiments, at least some of the external objects of the application program and/or the framework are text-based data objects such as XML objects or JSON objects.

Some external objects may merely comprise one or more attributes and may be used for holding a set of instance variables and/or associations with other external objects, thereby weaving a network of objects representing the object relationships. Other external objects may in addition or exclusively comprise one or more methods, also referred to as "functions", for manipulating the attribute values of other external objects and/or for performing any other kind of data processing task, e.g. for monitoring or controlling an industrial production workflow, for aggregating the data contained in a plurality of other external objects, for selecting one or more external objects fulfilling a particular criterion, for creating new external objects and/or for deleting external objects. Typically, the creation of a new external object is implemented as the creation of a new instance of a class and the deletion of an existing external object is implemented as the deletion of an instance of a class.

For example, an external object "car_237428348" would be an instance of the class "Car" comprising variables such as "Color", "Date of registration", "manufacturer", "type", "fuel consumption" and it could hold a 1-n association with its owners (a collection of "Person" instances). In addition, it can comprise getter and setter methods enabling other external objects to read and manipulate the variable values currently assigned to the variables of the external object "car_237428348".

According to some embodiments, only external objects and class templates representing objects of an object model shared with the framework are considered to be external objects. The data objects used for purely application program-internal data processing steps which do not correspond to objects in the shared object model are not considered to represent an external object whose change triggers the creation of a delta object in the framework. In other words, according to some embodiments, only application-born and framework-born external objects which are specified in the shared object model trigger the creation of a delta object upon being changed.

A "class" as used herein is an extensible program-code-template for creating data objects, providing initial values for state (member variables) and implementations of behavior (member functions or methods). In many programming languages, the class name is used as the name for the class (the template itself), the name for the default constructor of the class (a subroutine that creates objects), and as the type of objects generated by instantiating the class; these distinct concepts are easily conflated. When an object is created by a constructor of the class, the resulting object is called an instance of the class, and the member variables specific to the object are called instance variables, to contrast with the class variables shared across the class. In some programming languages, classes can only be declared at compile-time, not at runtime of the application program. In other languages, classes can be declared and their structure modified at runtime of the application program.

An "application program" or "application software" as used herein is software designed to perform a group of coordinated functions, tasks, or activities for the benefit of one or more users and/or for the benefit of an organization, e.g., a company. Examples of an application include a word processor, a spreadsheet, an accounting application, a web browser, an email client, a media player, a file viewer, an aeronautical flight simulator, or a maintenance or control program for a manufacturing process. According to embodiments, the application program is not a database management program (DBMS), in particularly not a relational DBMS or any SQL based DBMS which make use of a table-based rather than data object-based data organization principle.

According to preferred embodiments, the application program is a complex application program, e.g., an application program written in an object-oriented programming language such as Java and comprising thousands or even millions of data objects referred to as application-born external objects. The external objects dynamically interact with each other, are instantiated, modified and deleted at runtime of the software application and thereby represent and control important workflows and services implemented in the application software. For example, the application program can be an enterprise application software (EAS). The term EAS refers to a collection of computer programs with complex applications, tools for modeling how the entire organization works, and development tools for building applications unique to the organization. An EAS is intended to solve an enterprise-wide problem and aims to improve the enterprise's productivity and efficiency by providing technical control logic support functionality. EAS is computer software used to satisfy the needs of an organization rather than individual users. Such organizations include businesses, e.g., the mining, manufacturing, agricultural, energy, and service industries, and governments. For example, the application program can be an EAS configured to monitor or control one or more industrial production processes, e.g., in the context of the internet of things.

According to embodiments, the application program is a software program configured to display, manipulate, and store large amounts of often complex data and to support and/or automate industrial production processes or other processes with that data. The application program can perform manufacturing functions and/or many other functions such as order processing, procurement, production scheduling, customer information management, energy management, and accounting. It is typically hosted on servers and may provide simultaneous services to a large number of users, typically over a computer network. For example, the application program can be an enterprise resources planning (ERP) system, an EAS, or a customer relationship management (CRM) software. The "business logic" or "domain logic" as used herein is the part of the program that encodes the real-world domain rules that determine how data can be created, stored, and changed. It is contrasted with the remainder of the software that might be concerned with lower-level details of managing a database or displaying the user interface, system infrastructure, or generally connecting various parts of the program.

A "data store" as used herein is a repository for storing and managing collections of data. A data store can be an in-memory data repository or, more preferably, a non-volatile, persistent data repository. A data store can be a database, i.e., a collection of data managed by a database management system (DBMS), but also simpler store types such as files, directories, directory services, etc. A DBMS can be, for example, a DBMS configured for managing relational databases, object-oriented databases, NoSQL databases, key-value databases, wide column stores, etc. According to preferred embodiments, the data store used for storing the delta objects is an append-only store, e.g., a streaming database managed by a streaming management application such as Apache Kafka, or another type of store which does not allow changing an already stored data value.

An "object model" as used herein is a data structure that defines a collection of objects, object attributes and object-relations through the use of object-oriented techniques. It enables the creation of an architectural software or system model prior to development or programming. Typically, the object model is part of the object-oriented programming (OOP) lifecycle. An "object-oriented domain model" can be a specification of static structures of classes and objects as well as their associations and optionally also their behavior.

An "append-only store" as used herein is a database which is immutable and only allows the storing of new entries but not the modification or deletion of existing entries. Editing or deleting entries which have already been stored in this database are prohibited by the append-only-store. According to embodiments, an "append only store" stores data sequentially in adjacent blocks of one or more storage media, thereby enabling rapid data retrieval via sequential reads.

Append-only stores can be implemented based on many different kinds of database. For example, some conventional relational databases support an append-only operation mode. According to preferred embodiments, the append-only data store is a streaming database. A streaming database is a database to which data is continually stored and which allows defining permanent queries (also referred to as "continuous queries") which notify a client registered for this query whenever data that is stored in the streaming database matches the query. If such continuous queries examine only single records, this can be implemented by examining each record as it arrives. This is very efficient because only the incoming record needs to be scanned. For example, Apache Kafka can be used as streaming database.

According to some embodiments, the append-only store is a streaming database, wherein a streaming database is a database wherein write and/or read access is controlled by a software referred to as "streaming application", i.e., a software which stores data in the append-only store in the form of data streams and which allows defining continuous queries. According to preferred embodiments, the append-only store fulfills some or all of the following criteria: sequence consistency and reliability, guaranteed delivery and transactional consistency, an "exactly once" semantics, security, scalability and fault tolerance.

An "RS object" (or "requirement specification object") as used herein is a data object comprising a specification of one or more requirements. The requirements are specified in a format that is interpretable by the framework and enables the framework to extract the one or more requirements. For example, the extraction of the requirements can enable the framework to process framework-born and/or application-born external objects in accordance with the requirements for generating and storing a sequence of requirement-compliant delta objects and/or can enable the framework to process delta objects read from the at least one append-only store such that a requirement-compliant output is returned to a client. An RS object may comprise, for example, a specification of a time period during which the requirement must be enforced, a specification of one or more clients to which a respective requirement-compliant output needs to be generated, a threshold for an external object attribute value whose transgression triggers the execution of a particular framework function or the like. According to embodiments, the framework is configured to output information comprised in the delta objects in accordance with the requirements specified in the RS objects and to prohibit outputting of this information in any other manner or format.

An "AC object" (or "access control object") as used herein is a data object comprising a specification of access control-related constraints and/or permissions. The constraints and/or permissions are specified in a format that is interpretable by the framework. The framework is preferably configured to control access to the delta objects in the at least one append-only store in accordance with the permissions and constraints in the AC objects stored in the at least one append-only store.

For example, an AC object can specify which one in a plurality of registered users shall be granted access to the delta objects related to a particular external object, can specify the changes of which one of a plurality of attributes this user shall be allowed to access, can specify a time period in the lifetime of the external object during which these changes should be made accessible and/or can specify other requirements a user must met in order to be allowed to access information stored in the delta objects.

A "framework function" as used herein is a software-implemented function that is provided by the framework. According to preferred embodiments, the framework comprises a plurality of framework functions of one or more different types. For example, first ones of the framework functions can be functional extensions of the program logic of one or more application programs. According to some embodiments, the said and/or other ones of the framework functions are implemented as output-framework functions being configured to process delta objects and RS objects for creating and returning an output that is based on the data contained in the delta objects and that complies to the requirements specified in the RS objects. In addition, or alternatively, the framework functions can comprise RS definition framework functions which enable a user (e.g., via a GUI of the framework) and/or which enable one or more remote clients (e.g., via a RS definition request) to trigger the creation and storing of a new RS object which specifies a new requirement.

An "external object" as used herein is a data object instantiated outside of ("external to") the at least one append-only store. This means that an external object is not created by the append-only-store, but rather by another software program such as the framework or the application program. An "external object" may also be referred to as "business object" or "data store external object". An "external object" can represent any kind of entity, e.g., a natural or legal person, a machine, a product, a consumable, a vehicle, or the like.

A "framework-born external object" as used herein is a data object instantiated in the framework, i.e., a data object instantiated at runtime of the framework within the runtime object context created by the framework.

An "application-born external object" as used herein is a data object instantiated in the application program, i.e., a data object instantiated at runtime of the application program within the runtime object context created by the application program.

A "client" as used herein can be a software program, a hardware unit or a user. For example, the client can be a client program or a client device. The client can be a local client hosted on the same computer system as the framework or can be a remote client configured to send requests to the framework via a network connection, e.g., the Internet.

A "change operation" as used herein is any operation performed by and/or within a software program that creates a new data object (e.g., instantiating a class acting as a template for a new data object instance), and/or that modifies an existing data object (e.g., changes the value of a data object attribute) and/or that deletes an existing data object and/or that creates, modifies or deletes a class to be used as a template for a data object. The change operation can be performed within an application program and can create or change or delete an application-born external object or a class used as template for creating an application-born external object. In some embodiments, the change operation can in addition be performed on framework-born external objects within the framework.

According to embodiments, one of the change operations which triggers the creation of one or more delta objects is a modification of a class structure of a class comprised in the application program and/or of a class provided via a library, whereby the library comprises class files that can be used as template for instantiating external objects corresponding to data objects of the shared object model. The change of the class structure automatically triggers the propagation of these structural changes to all instances of this class in the application program, whereby each external object structure update performed during the propagation can also be a change operation that triggers the creation of a respective delta object.

A "transaction" as used herein is an atomic change of state of data. A transaction is a set of one or more data processing operations performed as an individual, indivisible unit of work. Each transaction must succeed or fail as a complete unit. It can never be only partially complete. According to embodiments, the framework can comprise a hardware- or software-based transaction-oriented controller that manages and orchestrates the begin and commit events of a plurality of transactions whose transactional context spans at least the application program, the framework and the append-only store.

A "commit ready signal" of an integrated transaction as used herein is a signal that indicates the event that all change operations to be performed by the application program within this integrated transaction have been performed but the integrated transaction has not yet committed. This means that at the commit ready event, the delta objects reflecting the said data changes need to be stored to the append-only store and optionally in order to commit this integrated transaction. The framework is configured to ensure that the integrated transaction commits only after a successful storing of all delta objects created during this integrated transaction in the append-only store. Accordingly, a "commit ready signal" is a signal notifying the framework that the delta objects created within a particular integrated transaction can and should be stored to the append-only store in order to allow the integrated transaction to commit.

An "integrated transaction" as used herein is a transaction that guarantees atomicity in "global transactions" that are executed across two or more software components. The two components can comprise, for example, the application program having executed the change operations and the framework. An "integrated transaction" could also be referred to as "cross-application transaction", whereby any software used for storing data in a data store may also be considered an "application". For example, an integrated transaction can be implemented in accordance with the X/Open XA standard (short for "eXtended Architecture"), a specification that was released in 1991 by X/Open for distributed transaction processing (DTP). To guarantee integrity, XA uses a two-phase commit (2PC) to ensure that all of a transaction's changes either take effect (commit) or do not (roll back), i.e., atomically. XA describes the interface between a global transaction manager and a specific application.

According to embodiments, the software that creates the delta objects uses XA to create integrated transactional contexts by instantiating an XA transaction manager using a library or a separate service. The transaction manager tracks the participants in the transaction (i.e., the various data stores to which the framework writes, i.e., the append-only store), and works with them to carry out the two-phase commit. In other words, the XA transaction manager is separate from an application's interactions with servers. XA maintains a log of its decisions to commit or roll back, which it can use to recover in case of a system outage.

An "integrated transaction" is a transaction in accordance with the ACID criteria. An integrated transaction can cover, for example, the change operations performed within the application program and storing operations performed within the framework which stores the delta objects in the append-only store. According to some embodiments, the integrated transactions are implemented based on the two-phase-commit protocol. According to other embodiments, other protocols can be used ensuring that all operations performed in the application program, in the framework and optionally also in the append-only store, which are performed within the same integrated transaction, are performed according to the "all or nothing principle": either they are all performed successfully (commit event), or they are all not performed or rolled back (failure/roll back event).

The "ACID" criteria (Atomicity, Consistency, Isolation, Durability) as used herein is a set of properties of transactions intended to guarantee validity even in the event of errors, power failures, etc. A sequence of operations performed in one or more different applications (e.g., data object changes within an application program and storing operations performed by one or more software programs maintaining a data store) that satisfies the ACID properties is called a transaction. Hence, all operations contained within a transaction represents a single logical operation on the data. For example, the creation of a new data object, the assignment of new attribute values to various attributes of the new data object and the storing of each delta object representing one of the said data object changes can be performed within a single transaction referred herein as "integrated transaction" as the transaction comprises operations performed in two or more different software programs.

A "delta object" as used herein is a piece of data that is used for storing a change in one or more external objects. A delta object can be a data object created as instance of a class specified in an object-oriented programming language, but can also have any other data format, e.g., an XML or JSON file. Preferably, a delta object comprises metadata being indicative of aspects of a change event (e.g., an ID of the external object that was created, deleted or modified, a timestamp indicating the time when the change operation that induced the delta object creation was applied to the external object in the application program, an ID of the application program having performed the change operation on the external object, and the values of any changed variable after the change. Optionally, the delta object can in addition comprise the values of any changed variable before the change. Preferably, the delta object is free of any external object variable values which were not modified by the change operation.

A "timestamp" as used herein is a sequence of characters or encoded information identifying when a certain event is recorded by a computer, usually giving date and time of day, sometimes accurate to a small fraction of a second. The time at which the event is recorded by the computer can be used as an indication of the time of the event itself, in particular when the event happens within the computer itself, e.g., the event indicates a state change of an external object instantiated on the computer. For example, the timestamp can be specified in accordance with the ISO 8601 standard.

A "selected time" as used herein is a time, usually a combination of a date and optionally also an indication of a particular hour, minute and/or second, that can freely be selected. For example, the selection can be performed by a user, by a software program, by a hardware device, or the like. The selected time is not bound to any particularities of the application program, the framework, or the delta objects described herein for embodiments of the invention.

A "framework" as used herein is a piece of software, e.g., a software program or part thereof. In particular, a framework can be a universal, reusable software program or a part thereof that provides particular functionality to facilitate development of software applications. Software frameworks may include support programs, compilers, code libraries, one or more object models, functions, tool sets, and/or application programming interfaces (APIs) that bring together all the different components to enable development and maintenance of a project or system. According to embodiments, the framework comprises at least some program logic (e.g., a software program or module) that is interoperable with any application program developed with this framework (or with the help of a library comprising class templates according to the object model) at runtime of the application program. The framework is configured for creating delta objects, for storing delta objects in the append-only store, and preferably also for creating and maintaining an integrated transactional context that covers external object changes in the application programs as well as the write operations performed in the append-only store.

According to embodiments, the framework further comprises interface methods implemented by one or more classes of the framework. Hence, an external object executing a change operation will implicitly call and induce execution of some program code specified in the framework, e.g., code for creating delta objects and/or for creating and committing an integrated transaction. According to embodiments, the framework is also configured to determine whether or not an integrated transaction has successfully completed or not and whether the integrated transaction should terminate with a commit or a roll back event.

A "streaming application" as used herein is software configured to store data in the form of one or more streams to a streaming database, whereby the streaming application supports continuous database queries operating on the data stream(s). According to preferred embodiments, a streaming application is configured to allow other applications to exploit a parallel storing of data on many different physical data stores. Often, the bottleneck of data storing tasks is disc access performance, not CPU or memory capacity. Hence, a software application that allows parallel write (and read) operations to many separate physical data stores which are managed in the form of a single logical "append-only store" may have the advantage of a particularly high performance. A streaming application may enable these applications to use multiple computational units, such as the floating-point unit on a graphics processing unit or field-programmable gate arrays (FPGAs), without explicitly managing allocation, synchronization, or communication among those units. According to embodiments of the invention, the stream of data is a stream of delta objects received from the framework that has created the delta objects.

Streaming applications according to embodiments of the invention are configured to provide optimal local on-chip memory reuse in order to minimize the loss in bandwidth, accredited to external memory interaction when processing the data stream. A streaming application can use uniform streaming, where one kernel function is applied to all elements in the stream. Since the kernel and stream abstractions expose data dependencies, compiler tools can fully automate and optimize on-chip management tasks According to embodiments, the framework is implemented as a steaming application and/or is programmed such that it makes use of a separate streaming application for storing the delta objects and the RS objects in the at least one append-only store.

According to embodiments, the framework and/or the streaming application used by the framework for storing the delta objects is adapted to using programming language features—e.g., Java, Scala or Go—to get an optimal throughput of the processed data stream. For example, a compiler of the programming language used for writing the framework and the application program is used for optimizing the memory access and the kernel functions.

The streaming application can be, for example, Apache Kafka. Apache Kafka is an open-source stream-processing software platform developed by LinkedIn and donated to the Apache Software Foundation, written in Scala and Java. Apache Kafka is a unified, high-throughput, low-latency platform for handling real-time data feeds. Its storage layer is essentially a "massively scalable pub/sub message queue designed as a distributed transaction log, making it highly valuable for enterprise infrastructures to process streaming data. Additionally, Kafka connects to external systems (for data import/export) via Kafka Connect and provides Kafka Streams, a Java stream processing library. Apache Kafka allows users to subscribe to it and publish data to any number of real-time applications.

According to embodiments, the streaming application is configured to store data objects, e.g., key-value messages, that come from arbitrarily many processes called producers. The data can be partitioned by the streaming application into different "partitions" within different "topics". Within a partition, the data object in the stream are strictly ordered by their offsets (the position of a message within a partition), and indexed and stored together with a timestamp. Other processes called "consumers" can read data objects from partitions. For stream processing, a streaming application can offer an API (e.g., the Streams API in the case of Kafka) that allows writing Java applications (e.g., the framework) that consume data from the streaming application and write results back to the streaming application. For example, the framework that creates the delta objects may act as a producer that provides a stream of delta objects to the streaming application and that in addition acts as a consumer that receives a sequence of delta objects obtained by the streaming application sequentially scanning and traversing the append-only store, e.g. for the purposes of using the read delta objects to perform a computational task, e.g. perform a data analysis, generate a report, generate a complete or partial data export and/or reconstructing the state of the application program.

A "stream" or "data stream" as used herein represents an unbounded, continuously updating data set, where unbounded means "of unknown or of unlimited size". According to some embodiments, a stream consists of one or more stream partitions, wherein a stream partition is an ordered, replayable, and fault-tolerant sequence of immutable data records (e.g., delta objects), where a data record is defined as a key-value pair. For example, Apache Kafka can be used for receiving one or more streams of delta objects from the framework and store the one or more streams in one or more append-only stores managed by Apache Kafka.

According to some embodiments, the framework or the streaming application used by the framework for storing the delta objects comprises a "windowing function". A "windowing function" as used herein is a type of function supported by some streaming application which allow grouping of data records ("events"), e.g., delta objects, sharing a particular key for stateful operations such as aggregations or joins into so-called windows. Windows are tracked per record key. According to embodiments, the streaming application is configured to use a windowing function on the record key "transaction-ID" and/or "external object ID" in order to group the delta objects based on their transactional context and/or based on the external object whose change triggered the creation of the delta object and storing the delta objects in a group-wise order. A window function implements a timeline that contains event data and enables a streaming application or another application to perform various operations selectively against the events within that window.

According to embodiments, the framework and/or a streaming application used by the framework for storing the delta objects is a queuing system. A "queuing system" or "message queuing system" as used herein is a software program configured to enable receiving a high frequency of messages in parallel. Preferably, a queuing system according to embodiments of the invention is in addition adapted to store batches of messages (e.g., delta objects) of a queue in multiple different physical data stores (e.g., append-only stores) in parallel, whereby each message and/or message batch of the queue has an unequivocal message identifier allowing the reconstruction of the original sequence of messages and/or message badges of the queue from the multiple different physical data stores. Preferably, a queuing system is adapted to register a plurality of subscribers to pull a message, or a batch of messages, from the queue. Each delta object may represent a message stored to the queue. A queue managing system preferably is configured for supporting transactions when pushing a message to the queue, thereby ensuring that the desired action (e.g., the storing of a delta object in the queue) is guaranteed.

An "interface method" as used herein is a definition of a method that can be implemented by a class and by an instance of this class. The interface method is not specified within the code of the interface class but is rather specified within the code of a class implementing the interface. For example, all or at least some of the methods and functions of the framework that are accessible by the application program can be implemented as interface classes, whereby the interface methods are implemented by classes of the framework that are inaccessible by the application program directly. The interface method provides a definition of the signature of a set of methods without specifying their complete implementation. An interface method may be contained in an interface class that may in addition define types that can be used to declare the type of variables or parameters and return values of methods. For example, the interface methods can be provided as part of a library (e.g., a Java class library) to the developer of the application program at design time of the application program. Providing the interface methods via a library to the developer of the application program may enable the developer to implement the application program such that an object model specified explicitly or implicitly in the library is used as basis for defining at least some of the application-borne external objects.

The embodiments and examples described herein are to be understood as illustrative examples of the invention. Further embodiments of the invention are envisaged. Although the invention has been described by way of example to a specific combination and distribution of software programs and computer systems, it is to be understood that any feature described in relation to any one embodiment may be used alone, or in combination with other features described, and may also be used in combination with one or more features of any other of the embodiments, or any combination of any other of the embodiments as long as these features are not mutually exclusive.

Accordingly, some embodiments of the present application are directed to a computer system. Other embodiments of the present application include a corresponding computer-implemented method and software programs to perform any of the method embodiment steps and operations summarized above and disclosed in detail below.

As will be appreciated by one skilled in the art, aspects of the present invention may be embodied as an apparatus, method, computer program or computer program product. Furthermore, aspects of the present invention may take the form of a computer program product embodied in one or more computer readable medium(s) having computer executable code embodied thereon. A computer program comprises the computer executable code or "program instructions". Any combination of one or more computer readable medium(s) may be utilized.

Any software program described herein can be implemented as a single software application or as a distributed multi-module software application. The software program or programs described herein may be carried by one or more carriers. A carrier may be a signal, a communications channel, a non-transitory medium, or a computer readable medium amongst other examples. A computer readable medium may be: a tape; a disc for example a CD or DVD; a hard disc; an electronic memory; or any other suitable data storage medium. The electronic memory may be a ROM, a RAM, Flash memory or any other suitable electronic memory device whether volatile or non-volatile.

Each of the different features, techniques, configurations, etc. discussed herein can be executed independently or in combination and via a single software process on in a combination of processes, such as in client/server configuration.

It is to be understood that the computer system and/or the computer-implemented method embodiments described herein can be implemented strictly as a software program or application, as software and hardware, or as hardware alone such as within a processor, or within an operating system or a within a software application.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope of the following claims and equivalents thereto. Therefore, the specification and drawings are to be regarded in an illustrative rather than a restrictive sense.

BRIEF DESCRIPTION OF THE DRAWINGS

In the following embodiments of the invention are explained in greater detail, by way of example only, making reference to the drawings in which:

FIG. 10 illustrates the data content of delta objects of various types;

DETAILED DESCRIPTION

Figure 1:
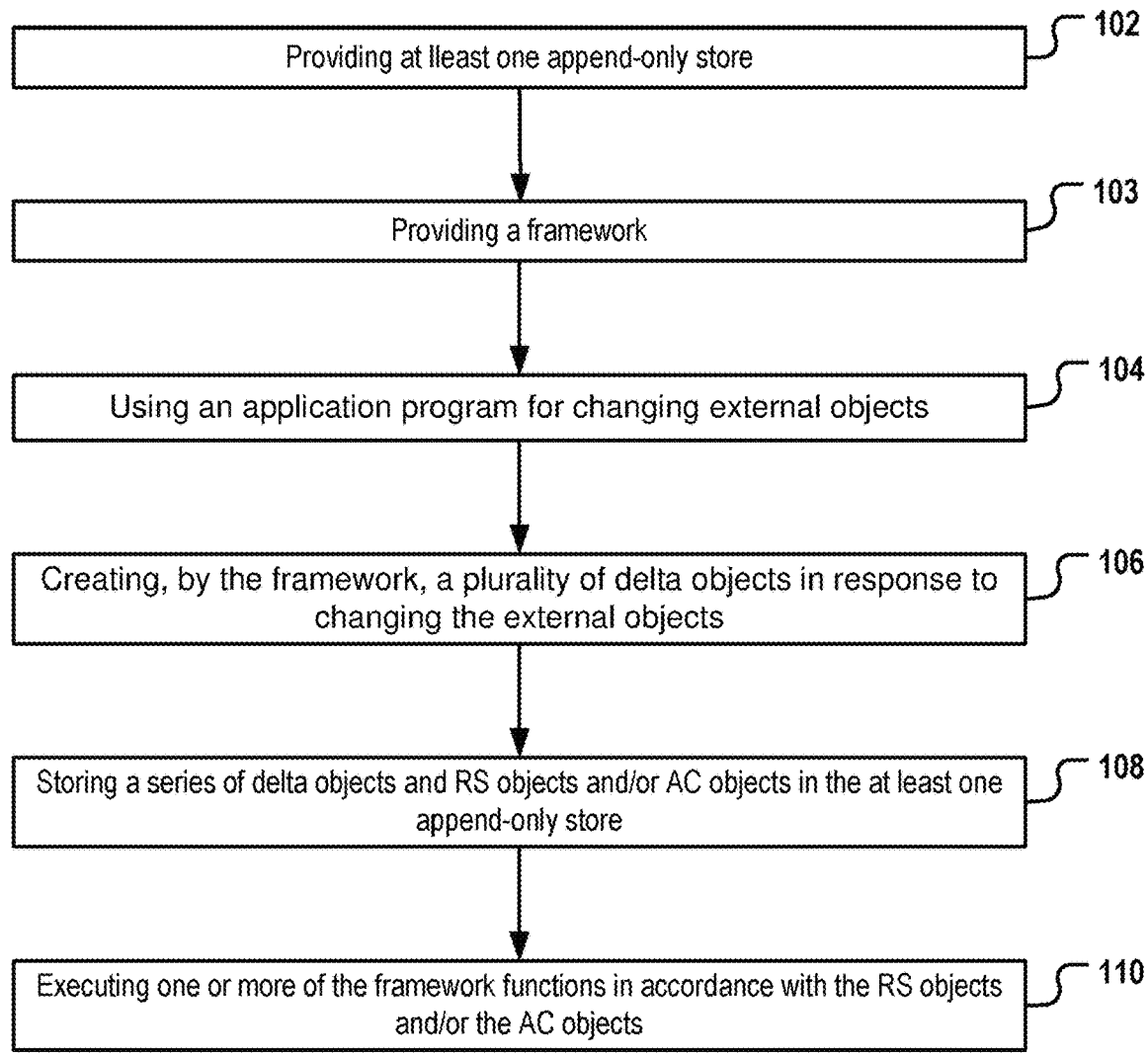
FIG. 1 is a flowchart of a method for data processing control using RS objects and/or AC objects.
Figure 2:
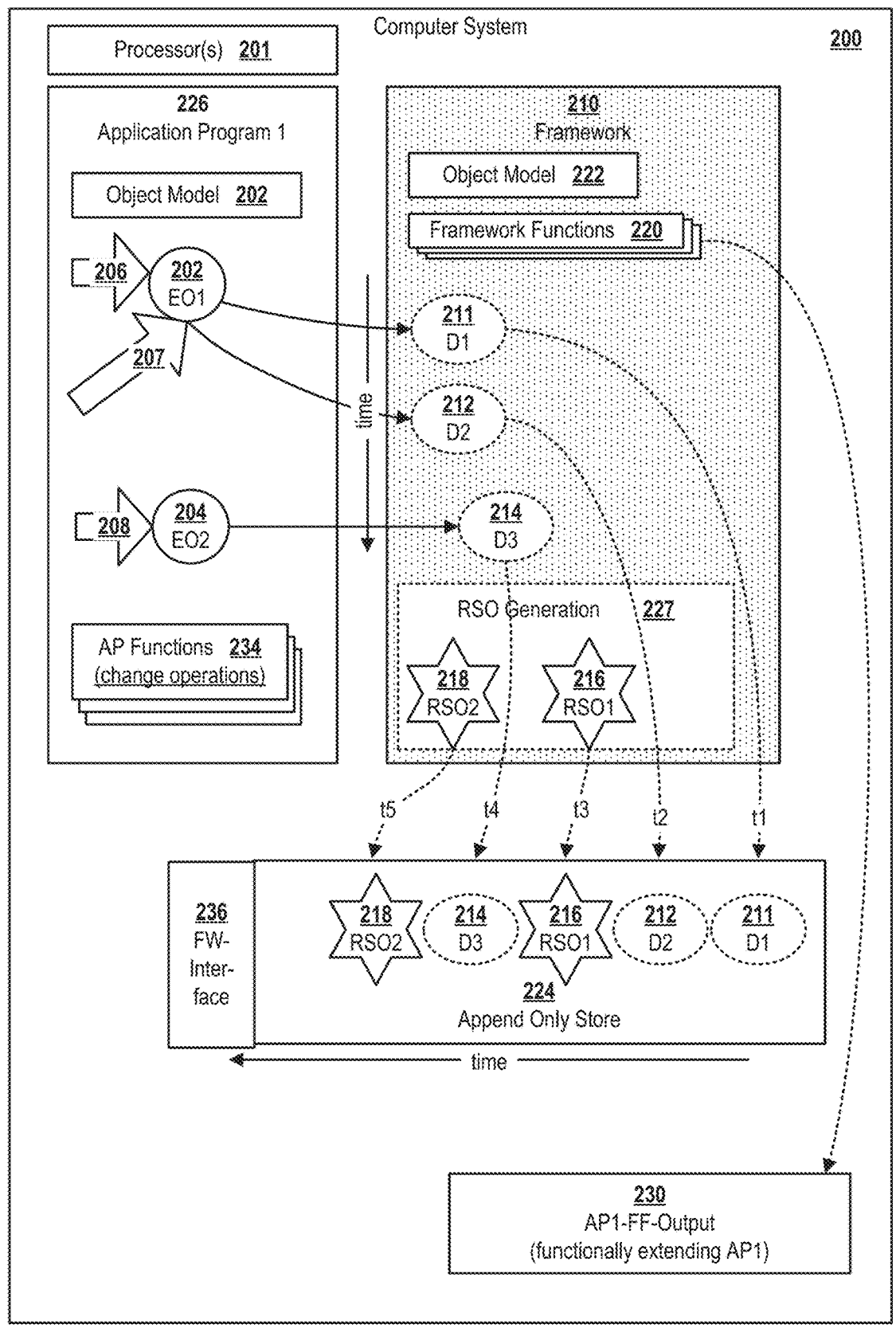
FIG. 2 is a block diagram of a computer system configured for ensuring that the output of an application program complies with requirements.

FIG. 1 is a flowchart of a method for data processing control which comprises ensuring requirement compliance by an application program by means of RS objects and/or which comprises exerting access control by means of AC objects. FIG. 2 is a block diagram of a computer system 200 configured for ensuring that the output 230 of an application program 226 complies with a set of requirements which can flexibly adjusted and extended at any time and which may take effect on attributes of external objects having been changed at an arbitrary time interval in the past. The system

200 of some embodiments also provides access control in respect to which user can access attribute change information of specific attributes of specific framework-born or application-born external objects.

In the following, the method of claim 1 will be described by making reference to the system depicted in FIG. 2. However, the method of claim 1 can also be executed in computer systems according to other embodiments, e.g., computer system 300 depicted in FIG. 3. The method may be particularly useful in a context where a large number of requirements have to be imposed on a large amount of data where only limited memory resources are available.

In the following, an embodiment used in the context of controlling an industrial production process is described. However, embodiments of the invention may likewise be used for a plurality of different use case scenarios such as internet of things applications, smart home applications, supporting doctors in the diagnosis and treatment of patients, controlling financial transactions, controlling data confidentiality in a complex organization, etc.

For example, the system 200 may be used for controlling the production of injection-molded parts such as dowels, sealing caps or housings. Various containers and machines used for performing an automated injection-molding process may comprise sensors for the weight, the temperature, viscosity and other parameters of the polymer mass and its components before they are mixed together. Different types of injection-molded products may have different requirements in terms of product quality (stability, homogeneity, bubble-freeness, color, etc.), and even in case the same mold is used for producing the same product for many different buyers, different buyers may have different requirements in terms of product quality. Hence, in case the same molds and the same production pipeline is used for generating a large number of products for different buyers having different quality requirements, the requirements in respect to the control of the production process and threshold parameters may have to be changed frequently depending on the order situation. Hence, the ability to flexibly modify the requirements in respect to the production process and product parameters is key for being able to flexibly serve different customers with different quality requirements. For example, if a high quality and optical homogeneity of the product is required, the threshold for the maximum number of acceptable bubbles may be lower than for the same type of products having standard quality requirements. Furthermore, different polymers may have a different viscosity or hardening time, so the same number of bubbles in the complete polymer mass may have a higher impact on the optical properties of the surface of the injection-molded product in dependence of the type of polymer used, because some polymers may ease the migration of the bubbles to the surface before the polymer mass has hardened. So, the requirements and thresholds may vary depend on several parameters like the polymer material used which may also change frequently. The requirements like for example, a maximum number of bubbles per $cm^3$ polymer mass are stored in the form of data objects referred herein as "RS objects". In case this threshold is exceeded during the production of an injection-molding product, it may be desired that an alarm message is generated by a production process monitoring application. The output should be forwarded to a production control application program which automatically takes appropriate actions to modify the production process. This alarm message should be output and/or should cause the production control application to take appropriate action only in case it is really necessary: a given number of bubbles may be acceptable for some types of materials, customers and/or desired product quality levels but not for others. Due to the fact that materials, customers and required quality levels may change frequently and in an unforeseeable manner, specifying these requirements on how and when to generate the alarm message output in the source code of the production monitoring program would prohibit flexible modification of requirements, because the source code would have to be recompiled each time a requirement is slightly modified and/or each time the production of products for a customer with different quality requirements is started. Embodiments of the invention provide for a solution of this problem.

In a first step 102, at least one append-only store 224, 322 is provided. For example, the at least one append-only store can be a streaming database maintained by a streaming application such as Apache Kafka. Preferably, multiple append-only stores are provided, preferably located on different storage devices for enabling parallel access to the different append-only stores.

Next in step 103, a framework 210 is provided. The framework can be a software program comprising an object model 222 and a set of framework functions 220. The framework further comprises a module for generating and managing RS objects comprising the requirements in respect to various product or process parameters and thresholds. The module can be implemented in the form of one or more of the framework functions 222. The computer system 200 can be a single computer hosting the framework and the at least one append-only store and in addition one or more application programs which are interoperable with the framework. More preferentially, the computer system 200 is a distributed computer system comprising multiple sub-systems which are connected with each other via a network connection, e.g., an Intranet connection or an internet connection. In this case, the framework, the at least one append-only store and the application program 226 can be hosted on different sub-systems. The object model 222 defines the structure, attributes and/or relations of data objects referred herein as "external objects". For example, the framework can be implemented in Java and the external objects can be Java class instances, whereby the class structure, the attributes and methods of the classes is defined by the object model. For example, the framework can comprise a set of pre-defined classes and interfaces which implicitly specify an object model. The object model can be shared with other software programs by providing these classes and interfaces in the form of a software library.

Next in step 104, the method comprises using an application program 226 for performing change operations 206, 208 on application-born external objects 202, 204, 304 at runtime of the application program. For example, the application program can be a program for monitoring the production process of a sequence of injection-molding products of a given quality level. Each application-born external object is a data object instantiated within the application program 226. The application-born external objects may represent various sensors, machines, machine components, containers, educts, and products of the manufacturing process and optionally further entities such as suppliers, customers, cost computation objects or product quality indicating objects. The interaction of these external objects and the change of the attribute values represents and/or traces product processing workflow steps monitored by the application program 226. The change operations 206, 208 comprise creating, modifying and/or deleting one or more of the application-born external objects in the application program.

For example, transferring the polymer mass from one container into another container may correspond to changing the value of the "status" attribute of an extended object representing this other container from "empty" to "full".

The application program is configured to notify the framework of any one of the change operations. For example, the developer of the application program may have used a library comprising classes and interfaces of the framework and may use the library at design time of the application program for defining the classes used as templates for instantiating the application-born EOS. This may have the further beneficial effect that the application program shares an object model with the framework. The use of the library for programming the application program may allow to program the class of the EO representing the other container such that it implements an interface class provided by the framework. The modification of its "status" attribute of the "container" EO class instance is automatically communicated to the framework without requiring the programmer to explicitly implement the propagation of this change operation from the application program to the framework. Hence, by making use of the classes and interfaces provided by and shared with the framework, e.g., via a software library, the development of an application program that is interoperable with the framework and that communicates EO changes automatically to the framework may greatly be facilitated.

In response to any one of the change operations 206, 208, the framework 210 automatically creates in step 106 a delta object 216, 218, 310. Each delta object is indicative of a change of an attribute of at least one of the application-born external objects caused by the change operation. For example, a delta object is created in response to changing the "status" attribute of an application-born EO representing the other container from "empty" to "full".

Next in step 108, the framework sequentially stores a sequence of data objects in the at least one append-only store. The sequence of data objects comprises a mixture of delta objects 211, 212, 214, 310, 312, 404, 406 and RS objects 216, 218, 314, 316, 318, 320. The sequence of the mixture of objects corresponds to the chronological sequence of creating the delta objects and RS objects. In some embodiments supporting integrated transactions, the framework is configured to a) sort the data objects in accordance with the chronological order of commit ready signals of each of the integrated transactions and b) sort the data objects created within the context of a given integrated transaction in accordance with the chronological order of their creation. Each RS object is a data object specifying a requirement in respect to how attribute information of one or more of the application-born external objects comprised in the delta objects must be processed and output by the framework. The creation of the RS objects is preferably independent from the creation of the delta objects. For example, while the creation of the delta objects is triggered by a change operation performed on application-born EOs and optionally also by a change operation performed on framework-born EOs, the creation of an RS object may be performed in response to a request of a local or remote client or in response to an action of a user via a GUI for creating or modifying an existing RS object.

FIG. 2 illustrates that the framework may use an interface 236 of the application program for storing the sequence of RS objects 218, 216 and delta objects 214, 212, 211 in the at least one append-only store. Preferably, the append-only store is configured to prohibit access to its data to all software program except for the framework 210 and optionally software programs used by the framework for storing data objects. For example, the framework may use streaming applications for storing the data objects in the append-only store. In this case, also the streaming application can be allowed to access the append-only store. Thereby, the append-only store and the whole computer system 200 may ensure that only data which complies to the requirements in the RS objects is persisted in the append-only store and/or may ensure that only data output derived from data in the append-only store which complies to the requirements in the RS objects is returned.

The framework comprises a set of framework-functions 220. One or more of the framework functions are functional extensions of the application program and are configured to process, upon being called, attribute information comprised in one or more of the delta objects in accordance with the requirements stored in the RS objects. For example, a first one of the framework functions may analyze each delta object that has been created by the framework for determining if the delta object comprises confidential data which should not be stored in the append-only store at all.

For example, one of the RS objects may specify that the name of the customer having ordered a set of injection-mold products should not be stored at all or should be stored only in pseudonymized or encrypted form. One of the framework functions is configured to analyze each delta object upon being created in order to determine if this delta object comprises sensitive customer-related data which needs to be removed or pseudonymized or otherwise protected before it is stored in the append-only store. If so, the framework function may perform the necessary data processing steps for modifying the delta object before it is stored.

A further one of the framework functions may be called by the framework whenever a delta object for a particular type of ED is created. For example, one of the framework functions may be responsible for storing the temperature measured in the mold during the injection mold process in a particular unit preferred by the customer for whom the injection molding product and a corresponding production protocol is to be provided. For example, if the customer who has ordered the currently manufactured products is a US company, the measured temperature may have to be specified in Fahrenheit ° F. If the customer is a German company, the temperature may have to be specified in Celsius ° C. The requirement in respect to the temperature unit that is valid for the currently produced goods may be specified in one of the RS objects which may be modified whenever the preferred temperature unit of the currently served customer changes. The further framework function evaluates this "temperature unit requirement" RS object before it stores delta objects being indicative of a temperature change in the append-only store.

It should be noted that the above-mentioned framework function is an example for a framework function which is called in response to the creation of a delta object to ensure requirement compliance of the delta object before it is stored. In addition, or alternatively, the framework functions can comprise one or more framework functions which are called in response to a request by a user or a client for obtaining an output, whereby the output is the result of analyzing one or more of the delta objects in the at least one append-only store. For example, the framework may comprise an interface for receiving a request from a client to generate a report being indicative of several parameter values measured during the production of a particular product. In response to this request, the framework may be configured to call a framework function which firstly analyzes the RS objects in the append-only store in order to determine the temperature unit to be used for generating a production report for the requesting client. If the RS objects indicate that the client requires the temperature to be provided in Fahrenheit, the framework function will normalize all temperature values derived from the relevant delta objects into Fahrenheit. If the RS objects indicate that the client requires the temperature to be provided in Celsius, the framework function will normalize all temperature values derived from the relevant delta objects into Celsius.

As the "normal" production monitoring workflow is implemented in the application program, the task of ensuring that data resulting from this monitoring workflow is stored and processed for reporting purposes by framework functions which take into account requirements specified in the form of RS objects, embodiments of the invention may allow to flexibly change the requirements simply by storing additional RS objects in the append-only store which overrule existing requirements. In case it should be necessary to modify also some program functions which evaluate the requirements in the RS objects, it is sufficient to modify framework functions which may be used by multiple different applications. For example, the normalization of the temperature unit may be used not only by an application program for monitoring the production of injection molding products, but also by an application program for monitoring the production of polymer extrusion products. Hence, embodiments of the system may support modifying and extending requirements in a much more flexible manner.

In addition to or instead of the creation and storing of the RS objects, the framework can be configured for creating and storing AC objects. For example, some AC objects may specify that only a particular user or user group shall be allowed to access change information of a particular attribute of a particular external object. Thereby, additional access constraints may apply such as restrictions in respect to the time period during which the attribute change occurred, in respect to the time when the user is allowed to access the attribute change information, and the like. The access constraints are also stored in the AC objects. According to some embodiments, the framework is configured such that it considers the access control data specified in later-stored AC objects to overrule access control data stored in earlier-stored ("older") AC objects. Hence, after having traversed the at least one append-only store once, the framework knows the youngest AC objects relevant for the respective delta object(s) and can control the access by one or more users accordingly. Access control may imply that the framework generates a particular type of report for different users differently. For example, some AC objects may specify that some users with higher access privileges receive a report comprising more (sensitive) attribute change information than other users.

Next in step 110, the framework executes one or more of the framework-functions for returning an output. The output can be returned to a user and/or to a client application or client system. For example, the client application can be a software program used for controlling the production process in dependence on some process parameter values and/or alerts specified in the output. The client application program can also be an archive application used for storing manufacturing protocols of ordered goods. The output 230 is computed by the framework as a function of the attribute information in the delta objects, whereby during the computing of the output, the framework function having computed the output took into account the requirements specified in the RS objects.

The output 230 can be considered as a functionally extended output of the application program 226, because the output is derived from the delta objects and hence from data that is generated as a result of executing the application program 226. The output is a functionally extended output, because the data in the output is not identical to the data generated in the application program. Rather, the data in the output has been modified by framework functions which are functional extensions of the application program because these functions process application data provided in the form of delta objects in a way that the output complies to some requirements such as one or more desired measurement parameter units, alerts thrown in dependence on currently valid thresholds, and requirements to pseudonymize or otherwise hide some attribute values.

According to some embodiments, the framework functions consist of or comprise access control functions which are configured to analyze the access control data specified in the AC objects and are configured to grant or deny one or more users access to attribute change information in the delta objects in accordance with the AC objects. The access control may comprise generating one or more reports whose content depends on the user receiving the report and/or the access control data in the AC objects.

Figure 3:
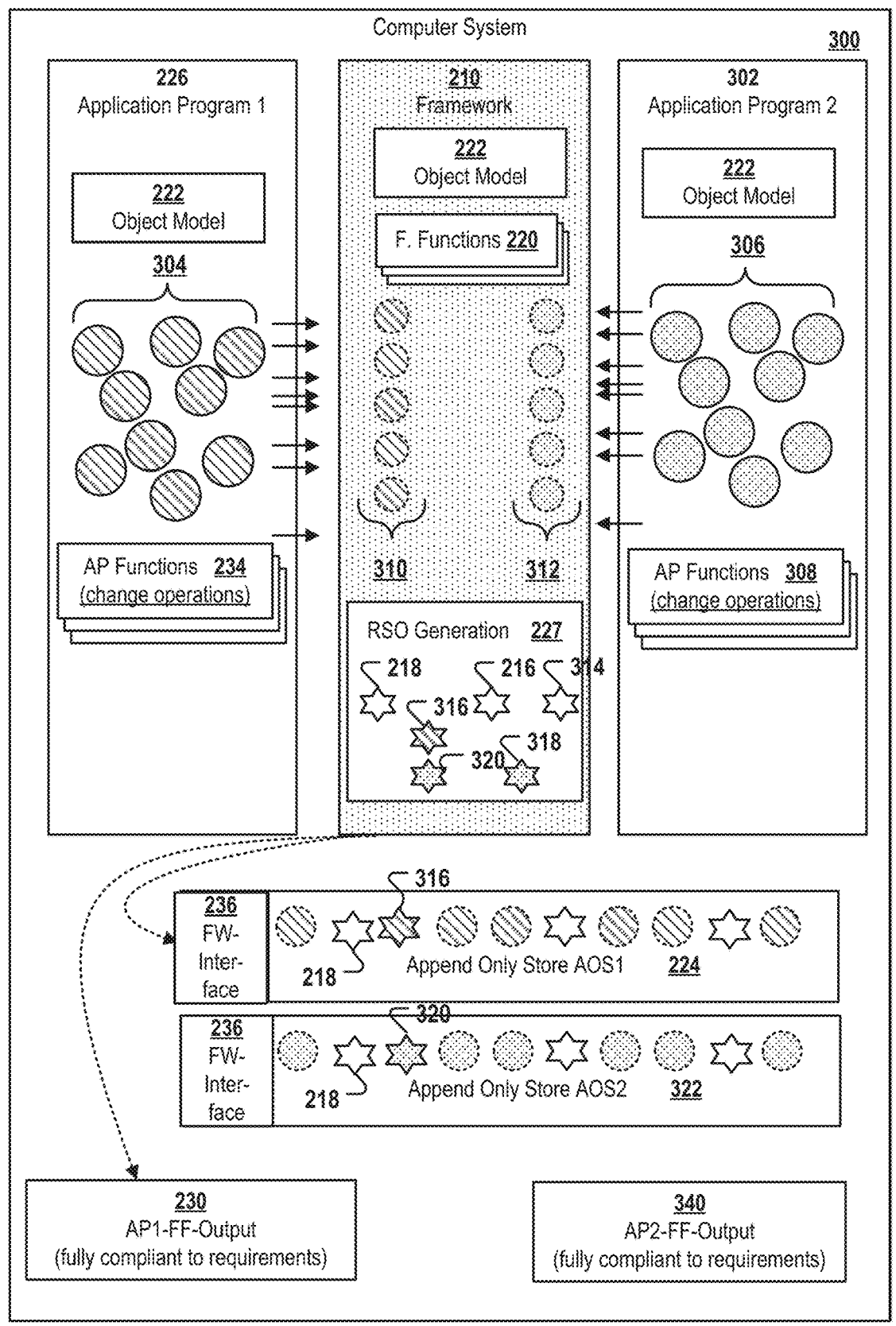
FIG. 3 is a block diagram of a computer system configured for ensuring that the output of multiple application programs complies with requirements.

FIG. 3 is a block diagram of a computer system 300 configured for implementing data processing control. For example, system 300 can be configured for ensuring that the output of multiple application programs complies with requirements. The system 300 comprises a further application program 302 sharing the same object model 222 or at least parts of this object model 222 with the framework 210 and the application program 226. For example, the application program 226 can be a program for monitoring the production of injection molding products and the application program 302 can be a program for monitoring the production of extrusion product. Both programs may benefit from using a software library comprising external object templates (e.g., Java class files) to represent entities such as polymers, machines, machine parts, sensors, educts, products and the like.

During the normal operation of the application program 226, a plurality of application-born external objects 304 are instantiated, modified and deleted within the application program 226. The software functions 234 which create, modify and/or delete the objects 304 are data object change operations which are automatically communicated to the framework 210. Preferably, the automated propagation of external object changes is implemented implicitly in the source code of the application program 226 by making use of object interdependencies and features of the programming language such as inheritance and/or event listeners and by making use of class templates provided in the form of a software library. Hence, the developer of the application program 226 does not have to implement the propagation of the changes to the application-born external objects 304 to the framework explicitly. In response to being notified of a change to an application-born external object 304, the framework creates a delta object 310 being indicative of the attribute or attribute value that was changed and being indicative of context information such as the external object whose attribute was changed, an identifier of the application program whose external object was changed, the integrated transaction within which the change occurred, the previous attribute value and/or the new attribute value.

During the normal operation of the application program 302, a plurality of application-born external objects 306 are instantiated, modified and deleted within the application program 302. The software functions 308 which create, modify and/or delete the objects 306 are data object change operations which are automatically communicated to the framework 210. Preferably, the automated propagation of external object changes is implemented implicitly in the source code of the application program 302 by the developer of the application program 302 making use of object interdependencies and features of the programming language such as inheritance and/or event listeners and by making use of class templates provided in the form of a software library. Hence, the developer of the application program 302 does not have to implement the propagation of the changes to the application-born external objects 306 to the framework explicitly. In response to being notified of a change to an application-born external object 306, the framework creates a delta object 312 being indicative of the attribute or attribute value that was changed and being indicative of context information such as the external object whose attribute was changed, an identifier of the application program whose external object was changed, the integrated transaction within which the change occurred, the previous attribute value and/or the new attribute value.

the framework 210 can comprise a module and/or interface 227 for creating and/or modifying RS objects 218, 216, 314, 316, 318, 320 respectively specifying one or more requirements and requirement context information such as the type of external object and/or the attribute affected by the requirement, a maximum or minimum threshold value to be used as a criterion within the requirement, an indication of a time period during which the requirement is valid, an indication of one or more clients for which a requirement is valid, an indication of one or more types of output, e.g. a report-ID, for which a requirement is valid, etc.

The framework is configured to sequentially store a mixture of data objects comprising data objects 310, 312 and RS objects in one or more append-only stores 224, 322.

Depending on the embodiment, different schemes for storing the RS objects in the append-only stores can be used.

According to some embodiments (not shown in FIG. 3), all RS objects are stored in each of the append-only stores. This means that for each of the append-only stores used by the framework for storing delta objects for the one or more application programs, a respective copy of each of the RS objects is created.

According to other embodiments, the framework 210 is configured to analyze each created RS object before it is stored for determining if the requirement specified in the RS object is relevant or potentially relevant for the data stored in any one of the append-only stores. The RS object or RS object copy is then stored selectively to those append-only stores which comprise data that is required to comply to the requirement specified in this RS object. For example, if an append-only store is used for specifically storing delta objects of an individual external object, and if an RS object comprises requirements which do not apply to the type of external object this individual external object belongs to a, there is no need to store this RS object in the append-only store. For example, if the individual external object represents a "polymer container having container-ID 57657" and if the requirement relates to the requirement to encrypt the name of the customer, there is no need to store a customer-specific privacy requirement in the append-only store used for storing data objects of a polymer container.

According to still other embodiments, some RS objects comprises requirements which apply to one or more external objects of two or more different application programs, whereby delta objects of different application programs are stored in different append-only stores 224, 322. In the example depicted in FIG. 3, RS object 218, 216 and 314 apply to data objects of both the application program 226 and of application program 302. Therefore, these RS objects are stored both in the at least one append-only store 224 used for storing delta objects of application program 226 and in the at least one append-only store 322 used for storing delta objects 312 of the application program 302. RS object 316 is relevant only for delta objects of application program 226, therefore it is stored selectively into the append-only store 224. RS object 320 is relevant only for delta objects of application program 302, therefore it is stored selectively into the append-only store 322.

The framework 210 can comprise one or more first framework functions for generating a requirement compliant output 230 from the delta objects stored in the at least one append-only store 224. The framework can further comprise one or more second framework functions for generating a requirement compliant output 340 from the delta objects stored in the at least one append-only store 322. The first and second framework functions can be different framework functions are identical framework functions or can be a mixture thereof. This means that it is possible to define some framework functions for providing an application-specific output (e.g., a report or analysis reside) and/or some further framework functions which are reporting and/or analysis functions applicable to the data of two or more different application programs.

Figure 4A:
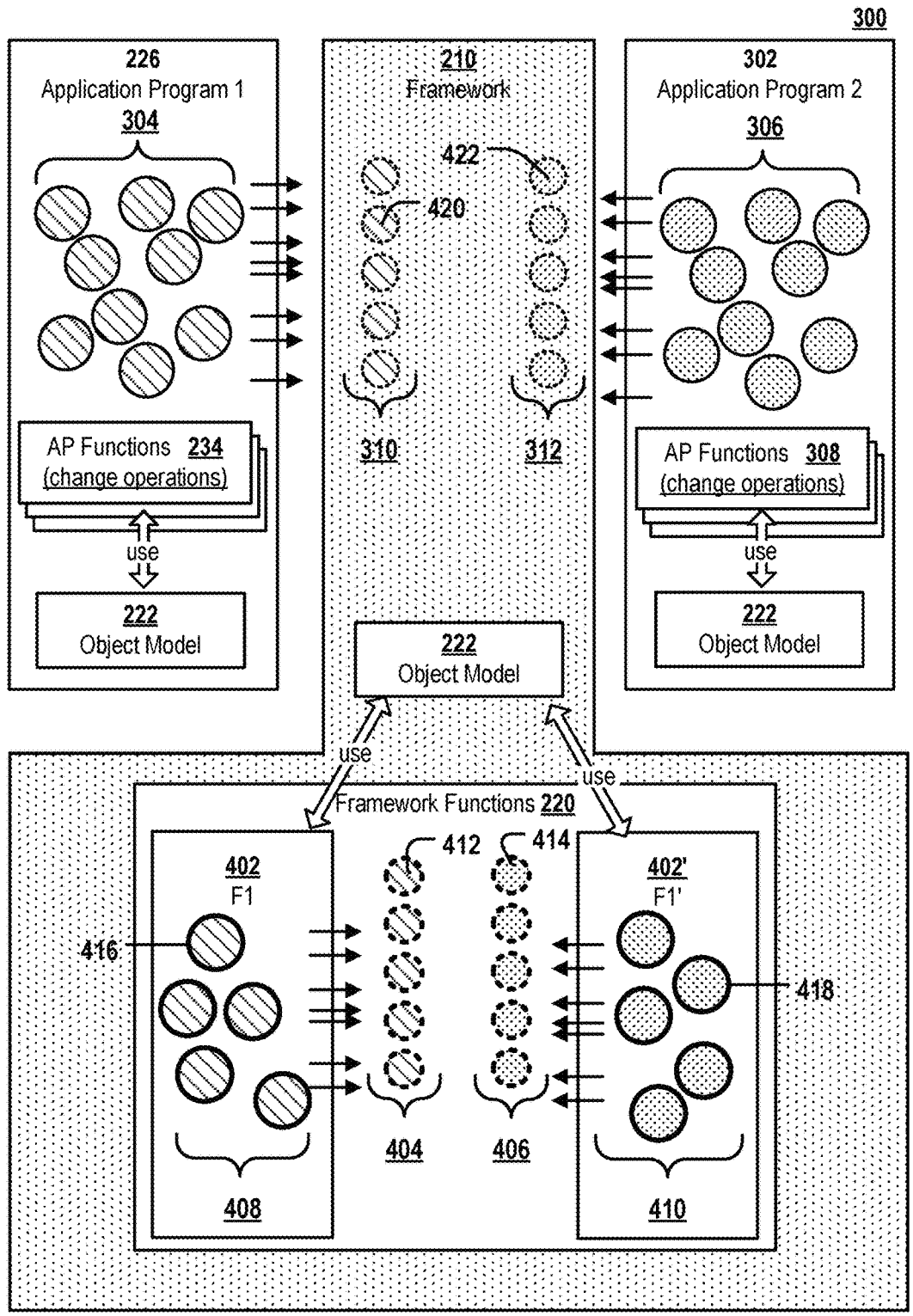
FIG. 4 is a block diagram showing components of a computer system configured for providing data process control in greater details.
Figure 4B:

FIGS. 4A and 4B in combination show a block diagram showing components of a computer system 300 configured for implementing data process control. For example, the system 300 can be configured for ensuring requirement compliance and/or access control, whereby some components of the system depicted in FIG. 3 are depicted in FIGS. 4A and B in greater detail.

As already explained in respect to FIG. 3, the execution of change operations 234, 308 on application-born external objects 304, 306 automatically triggers the creation of delta objects 310, 312 in the framework which are indicative of the induced external object change. Thereby, at least some of the application-born external objects of the two or more different application programs comply to a shared object model 222.

According to preferred embodiments, also one or more of the framework functions 220 executed by the framework on the delta objects before and/or after they are stored in the append-only store for generating a requirement-compliant output, make use of the shared object model 222 for creating, modifying and/or deleting framework-born external objects during their execution.

For example, a first framework function 402 can be executed in order to compute a requirement compliant output for the first application program 226. During its execution, the first framework function 402 creates, modifies and/or deletes one or more framework-born external objects 408. Anyone of these change operations performed on one of the framework-based external objects 402 automatically triggers the creation of a delta object 404 being indicative of the change induced by this change operation. The delta objects 404 created in response to changes on framework-born external objects 408 are treated by the framework in the same way as the delta objects 310 created by the framework in response to a data change operation performed on application-born external objects 304 and are persisted to the at least one append-only store.

A second framework function 402' can be executed in order to compute a requirement compliant output for the second application program 302. During its execution, the second framework function 402' creates, modifies and/or deletes one or more framework-born external objects 410. Anyone of these change operations performed on one of the framework-based external objects 410 automatically triggers the creation of a delta object 406 being indicative of the change induced by this change operation. The delta objects 406 created in response to changes on framework-born external objects 410 are treated by the framework in the same way as the delta objects 312 created by the framework in response to a data change operation performed on application-born external objects 306 and are persisted to the at least one append-only store.

The first and the second framework functions can be different instances of the same framework function or can be different framework functions.

Sharing the object model 222 between the framework and two or more application programs and creating delta objects during the execution of the one or more framework functions in the same manner as during the execution of the application program-internal functions may have the advantage that the resulting delta objects do not reveal whether they have been created within the framework or within the application program. Hence, any analysis of the delta objects stored in the at least one append-only store is not affected by the question if a particular data change operation on an external object complying to the shared data model was performed within an application program or within the framework. Hence, one or more application programs can be functionality extended in a complex manner simply by supplementing the framework with additional framework functions. Supplementing the framework will potentially extend the function of a plurality of application programs without the need to recompile any of the application programs and without affecting existing analytical framework functions, because the structure of the delta objects stored in the at least one append-only store is not affected by this functional extension as long as the shared data model is not changed.

According to some embodiments, module 227 is configured to create and store AC objects in addition or as an alternative to the RS objects.

Figure 4C:
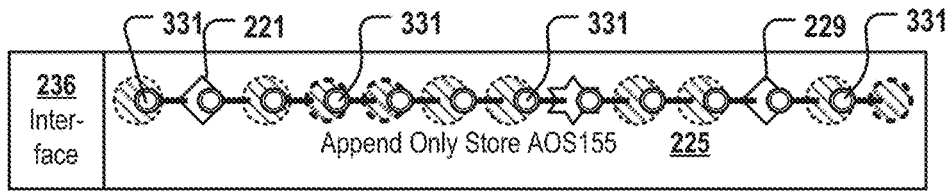

FIG. 4C shows a further one 225 of the append-only stores which comprises also some AC objects 221, 229. The delta objects, RS objects and AC objects are interlinked via a cryptographic hash 331 and hence form a blockchain. According to some embodiments, the at least one append-only store comprises m different append-only stores respectively being used for storing delta objects—RS objects and AC objects derived from or relevant for only a single one of the application-based or framework based external objects, e.g., a particular natural or legal person, a particular machine or any other object.

According to some embodiments, each one of the blocks is encrypted, preferably with a cryptographic key having been created by the framework specifically for a single one of the application-based or framework based external objects, e.g., for a particular natural or legal person, for a particular machine or for any other object. So the payload data as well as access control data and requirement-compliance control data are protected as a single coherent unit of data both against manipulation and against unintended disclosure.

Figure 5:
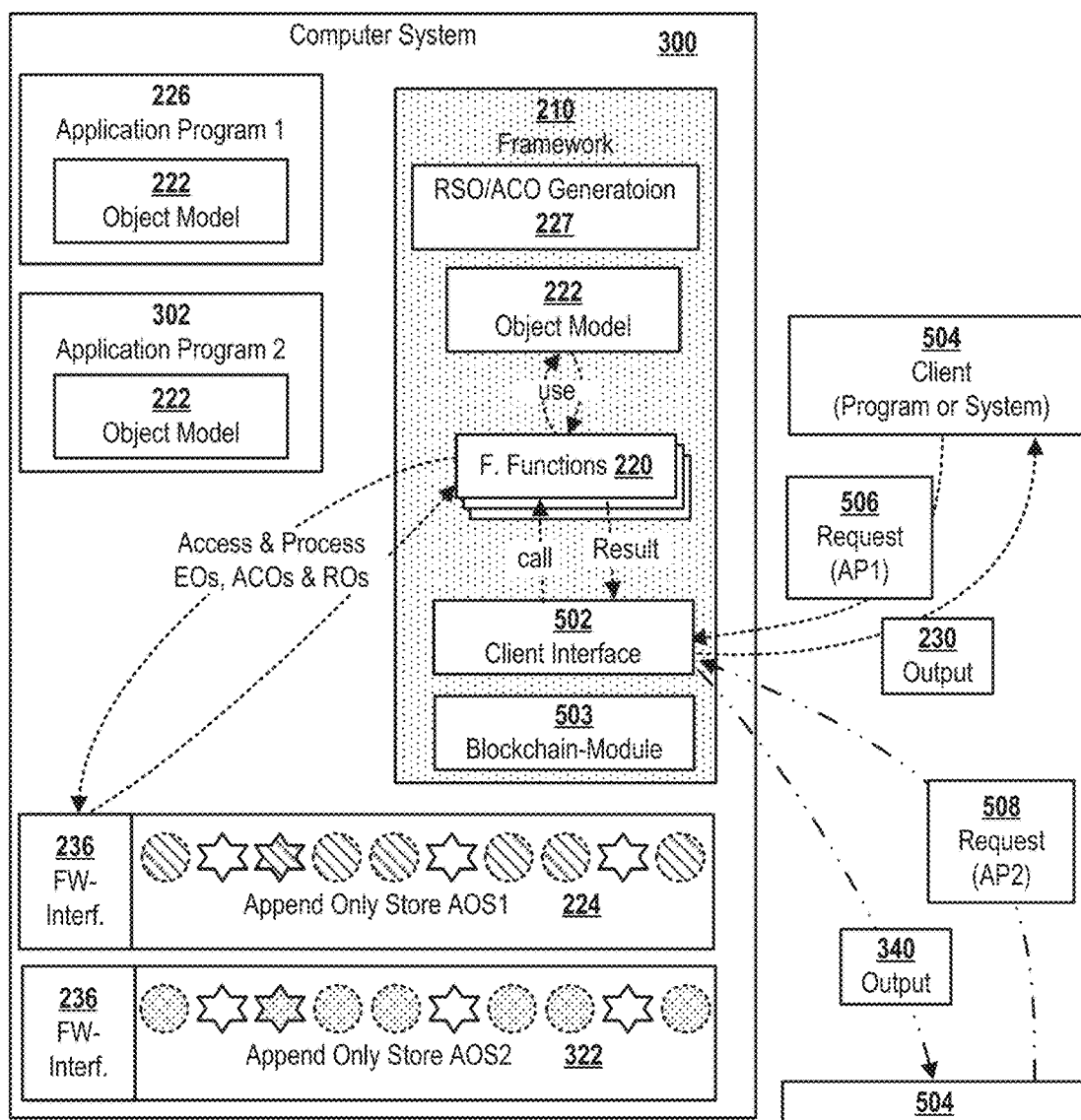
FIG. 5 is a block diagram of a computer system coupled to multiple clients.

FIG. 5 is a block diagram of a computer system 300 according to a further embodiment of the invention. The system 300 comprises a framework that is communicatively coupled to a plurality of clients 504, e.g., remote client application programs and/or remote client devices.

According to preferred embodiments, the application programs 226, 302 are respectively configured not to persist any internally created or processed data directly. Preferably, the application programs 226, 302 also do not have any interface allowing a client to directly interact with and retrieve data from the application program 226, 302. Rather, the framework acts as the only means and communication channel of the application programs 226, 302 for persisting and outputting data. Furthermore, preferably each of the at least one append-only stores 224, 322 is configured to prohibit any application from accessing its data content except for the framework 210 and optionally except for accessory programs such as streaming applications which may be used by the framework for storing the delta objects and RS objects in the append-only store. Hence, the framework 210 acts as the only data persistence layer for the application programs and in addition acts as the only data access layer for the one or more clients 504 requiring data output of the application programs.

The framework comprises a client interface 502 configured for receiving data requests from one or more clients locally or via a network.

For example, a client 504 can send a first request 506 for obtaining a pseudonymized, aggregated production protocol for a set of injection molding products for a particular customer to the interface. The framework is configured to identify one or more application programs having produced the relevant data, to identify one or more of the append-only stores comprising the relevant data in the form of delta objects, and to identify one or more RS objects specifying requirements which apply to the request of the client 504. The framework is configured to process the delta objects and RS objects having been identified to be of relevance for the client 504 and to compute an output that complies with all requirements which have to be considered in respect to the client 504 and/or in respect to other technical, organizational and/or legal circumstances. This output 230 is returned to the client 504.

Analogously, the above-mentioned or another client 504 can send a second request 508 for obtaining a pseudomized, aggregated production protocol for a set of extrusion products for a particular customer to the interface 502. The framework is configured to identify one or more application programs having produced the relevant data, to identify one or more of the append-only stores comprising the relevant data in the form of delta objects, and to identify one or more RS objects specifying requirements which apply to the second request of the client. The framework is configured to process the delta objects and RS objects having been identified to be of relevance for the client's second request and to compute an output that complies with all requirements which have to be considered in respect to the client's second request and/or in respect to other technical, organizational and/or legal circumstances. This output 340 is returned to the client 504.

For example, the identification of the relevant append-only stores, delta data objects and RS objects can be performed by one or more of the framework functions 220 required in response to receiving a request 506, 508.

As the framework is configured to ensure, before storing the delta objects in the at least one append-only store and/or before returning an output computed from the stored delta objects, that the data objects to be stored and/or the output to be returned complies to all requirements which are of relevance in the context of a current data request 506, 508, the system architecture according to embodiments of the invention may ensure that all application programs integrated by the framework always return (indirectly via the at least one append-only store and the framework acting as data access layer) fully requirement-compliant reports and other forms of output to any requesting client. Nevertheless, the system can be flexibly adapted to new requirements and customized for different clients and use case scenarios.

According to some embodiments, the computer system comprises a blockchain module 503 which is configured to store the sequence of delta objects, RS objects and/or AS objects in each of the one or more append-only stores in the form of a blockchain. Optionally, the module 503 encrypts each block to be stored in one of the append-only stores with a cryptographic key which is preferably particular to the one of the external object whose data is to be stored in this one append-only store. The framework is configured to perform an integrity check of the block chain before the framework grants access to attribute change information comprised therein.

Figure 6:
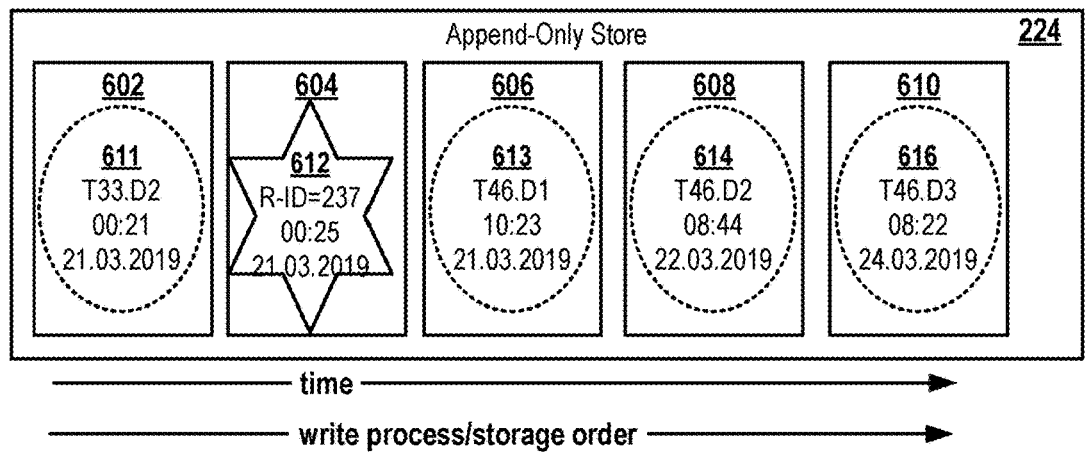
FIG. 6 illustrates the data content of a append-only store.

FIG. 6 illustrates the data content of a append-only store 224. The append-only store can be part of a single physical data storage device comprising a plurality of data storage areas 602-610 respectively used for storing a delta object 611, 613-616 or a RS object 612. The sequence of data objects 611-616 is stored on the append-only store 224 such that the chronological order of physical write operations corresponds to and is reflected by the sequence of adjacent storage areas 602-610 to which the data objects 611-616 are written. The sequence is maintained by the append-only store. For example, the framework may use existing streaming programs such as Apache Kafka for storing delta objects and RS objects in a streaming database maintained by the streaming program. This means that the physical storage location of a particular data object does not change over time e.g., as a result of a storage optimization, defragmentation and/or swapping operation performed by the operating system or another program. For example, the data objects 611, 612 belong to a first integrated transaction T33 while data objects 613-616 belong to a second integrated transaction T46. Delta object 611 has the oldest timestamp of all data objects of transaction T33, namely Mar. 21, 2019, 00:21. Transaction T33 is ready for commit before transaction T46, therefore the data objects 611, 612 are written to the append-only store prior to the data objects 613-616 of transaction T46 although the timestamp of delta object 613 is older than timestamp of RS object 612. The chronological order of physically storing the data objects in the append-only store in the embodiment depicted in FIG. 6 is represented by the time arrow below, meaning that the more to the left of the time arrow, the earlier the data object is written to the append-only store.

Storing delta objects and RS objects in adjacent physical storage areas in accordance with the order of write operations may be advantageous, because the read/write head of the one or more physical storage devices constituting the append-only store 224 can sequentially traverse and read the data objects either in the original order of the data object writing process (here: from left to right) or in reverse order (here: from right to left) very quickly, because the read/write head does not have to "jump" to distant storage locations as indicated by pointers or other types of links.

For example, according to embodiments, a sequence of data objects (e.g., delta objects and RS objects) is stored in the append-only store such that subsequent data records are written in adjacent storage areas and such that the chronological sequence of writing the data records is reflected in the sequence of adjacent storage areas comprising the respective data objects. Hence, it is ensured that even after a long time and after various storage management routines that may be performed by the operating system, the order of data objects as originally stored in the append-only store is maintained. Examples for append-only stores are volatile and/or non-volatile data stores managed by various streaming applications and/or queuing systems such as LogDevice, Apache Ignite, Hazelcast, Apache Geode, Infinispan, ehcashe, Terracotta, and Apache Kafka.

Figure 7:
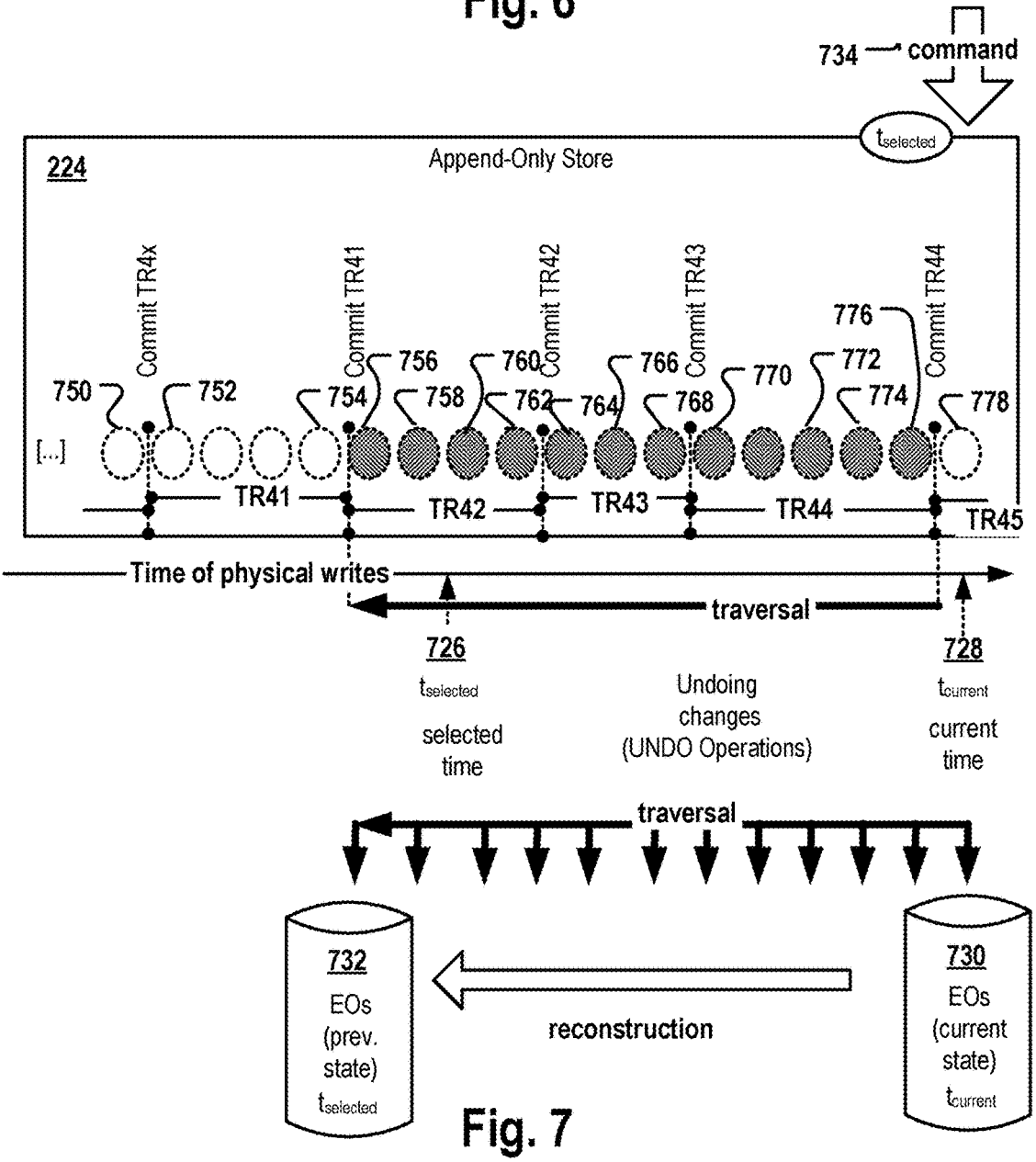
FIG. 7 illustrates a process of reconstructing the state of the application program based on UNDO operations derived from the delta objects.

FIG. 7 illustrates a process of reconstructing the state of the application program based a first reconstruction approach that comprises generating UNDO operations derived from the delta objects. Reconstructing the original or a modified state of the application program or some of its application-born external objects is only one example for the computational task of generating an output based on application program data, whereby the output has to comply with one or more (frequently changing) requirements. For example, the task to be solved by the process illustrated in FIG. 7 can be the task of generating an output 732 in the form of a set of application-born external objects whose composition, interrelatedness and attribute values reflect the state of the application-born external objects at the selected time, whereby the output 732 needs to comply to a plurality of requirements stored in the form of RS objects in the append-only store which indicate some external object IDs and attributes which need to be hidden in the output 732 in order to comply to data protection requirements. For example, the hiding can be performed by pseudonymization, encryption or anonymization of individual attribute values or external objects in the output 732.

For example, the framework can receive a request for obtaining a pseudonymized version of patient data stored in the append-only store, whereby the pseudonymized version of the patient data should reflect the state of the patient data at an arbitrarily selected time referred herein as "selected time". For example, a user or a client can send a command or a request 734 that is indicative of a selected time 726 in the past. The receiving of the selected time 726 can trigger the process of computing an output which needs to comply with all currently valid requirements before the output is returned to the user or the client. The time when the selected time is received and/or when the reconstruction process starts is referred to as "current time" 728.

In the example depicted in FIG. 7, the reconstruction of a pseudonymized version of the external objects of the application program at the selected time (i.e., the computation of a requirement-compliant output based on data of the application program stored in the append-only store) is performed in at least two steps:

In a first step, the framework traverses the append-only store for reading and evaluating all requirements specified in the RS objects contained in the append-only store. It is possible that not all requirements apply to the task of reconstructing a pseudonymized version of the EOs state at a selected time and/or that a complex RS object analysis must be performed in order to resolve requirement conflicts and overlaps of different RS object. At the end of this process, the framework knows which requirements have to be taken into account when performing the above-mentioned computational task.

In the next step, the framework traverses the data objects in the append-only store a second time starting from a current version of the external objects (EOs) at time 728. For example, each delta objects may comprise an object type identifier enabling the framework to identify instantiate an external object based on the object type identifier and the object model 222. The delta objects comprise new attribute values of EOs after a change occurred, so the framework can easily reconstruct the attribute values of the EOs at the current time 728 by traversing the delta objects in the append-only store and assign the attribute values to the attributes of the instantiated EOs until all attributes have assigned a value. When the framework parses the delta objects for extracting and assigning attribute values to respective EO attributes, the framework checks whether the currently processed attribute and/or EO type is required to be hidden. In this case, the framework generates a modified attribute value which complies to this requirement and assigns the modified attribute value to the corresponding attribute of the currently processed EQ. For example, a person's name can be replaced by a pseudonym or can be encrypted.

The append-only store 224 comprises a plurality of delta objects 750-778. The earlier the delta objects have been stored in the append-only store, the further to the left they appear in the box 224. The later the delta objects have been stored in the append-only store, the further to the right they appear in the box 224. The transaction boundaries are indicated by vertical dotted lines with ends bounded by black circles. The order of physical storing operations which store the delta objects in storage 224 is done according to the chronology of commit-ready events of the individual transactions TR41-TR45. For example, all delta objects created within transaction TR41 are first written to the append-only store 224, and then, all delta objects 456-462 that were created within transaction TR42 are written to the append-only store 224, and then all delta objects 464-468 that were created within transaction TR43 are written to the append-only store 224 and so on. The number of delta objects per transaction can vary. It is also possible that each delta object corresponds to its own transaction. The borders of the transactions can be explicitly stored, for example in the form of special "begin transaction objects" and "commit transaction objects", which contain an ID of the respective started or committed transaction. Alternatively, or additionally, it is also possible that the borders of the transactions are implicitly stored, for example in the form of transaction IDs, which are contained in each of the delta objects (and optionally also within each of the RS objects) and which denote the transaction within which the delta object was created.

The framework is configured to identify the one 756 of the delta objects in the append-only store belonging to the most recently committed integrated transaction TR44 and that in addition is the most recently stored delta object of all delta objects 770-776 within the said integrated transaction TR44. Delta objects having already been stored in the append-only store but having been created in a not-yet committed integrated transaction are not traversed but rather ignored as it is currently not known whether or not the transaction will successfully commit or whether the delta object will be deleted in case the transaction fails.

For example, each delta object can comprise an ID of the integrated transaction within which it was created and persisted. All delta objects belonging to the same transaction are stored in adjacent storage areas in the append-only store. So, the question when a particular transaction committed and a new one begun can be quickly and automatically determined by sequentially scanning and processing the delta objects in the append-only store. When the transaction-ID of a currently processed delta object differs from the transaction-ID of the previously processed delta object, a transaction border was passed where one transaction committed. It should be noted that the timestamps of the delta objects are strictly chronological only within the border of a transaction. This is because according to preferred embodiments, the delta objects are stored as transaction-based delta object batches, whereby the delta object batches are ordered in accordance with the chronological order of events when an integrated transaction becomes ready for commit (the completion of the storing of the delta objects can then represent the actual commit event of this integrated transaction). Hence, the chronological order of time stamps of delta objects in the append-only store derived from many different transactions may not necessarily be identical with the chronological order of timestamps of the totality of created delta objects.

Then, starting with the identified delta object 776, the framework sequentially traverses the delta objects in the append-only store until a downstream-termination delta object 756 is reached. The downstream-termination delta object is the one of the delta objects that belongs to the one TR42 of the integrated transactions having committed first after the selected time 426 and that was first stored in the append-only store after the selected time, the traversing including the downstream-termination delta object. During the traversal, the framework parses the traversed delta objects for extracting the attribute values of previous EOs and for computing a result that is to be output. For example, according to the depicted embodiment, the output to be generated can be the totality of EOs reflecting their state at the selected time. This can be obtained by extracting UNDO operations from the delta objects and by immediately applying these UNDO operations on EOs representing a more recent state, beginning with the state when transaction TR44 committed. Thereby, the framework is able to re-establish the attribute values in original or modified form in a copy of the respective EO for computing a requirement-compliant output.

According to embodiments, each traversed delta object comprises an indication, e.g., an identifier, of the one of the external objects of the application that was changed and whose change is represented by this delta object, and comprises of one or more attributes which were amended by this change. For each of the these one or more attributes, the attribute value before the change event and after the change event is specified in the delta object.

In case the change operation reflected by the delta object changed a class used as template for instantiating data objects in the application program rather than an already instantiated external object, the delta object according to embodiments of the invention comprises a class-ID of the changed class and indicates the structure of the class before and after the change such that the state of the changed aspect of the class before and after the change can be derived from the delta object.

According to the embodiment depicted in FIG. 7, the framework is configured to parse each delta object and to create one or more "UNDO operations" that are respectively configured to undo the changes reflected by the parsed delta objects. The UNDO operations in some cases will not specify a completely accurate UNDO operation if this would result in the generation of a reconstructed EO which does not comply with one or more of the requirements identified in the first step. For example, in case the name of a person changed (e.g., as a result of a wedding), and in case outputting of person names must be prevented in order to ensure data privacy, the UNDO operation will not reconstruct the original name of the person before the wedding but rather will reconstruct a pseudonymized version of this name.

During the sequential traversal of the delta objects in the append-only store 224, a stream of UNDO operations is created and automatically applied on the current copy 730 of EOs of the application program in their current state. Thereby, a modified and requirement compliant version 732 of some or all of the EOs is created in a very fast, and memory-saving manner, as the delta objects can be processed and loaded into memory sequentially. There is no need to load the totality of data created during and as a consequence of the execution of the application program into memory at once in order to parse it. Rather, a two-step approach is performed by the framework comprising firstly identifying relevant requirements specified in the RS objects in a first append-only store traversal and then traversing the append-only store a second time, thereby sequentially processing the delta objects such that an output is created which complies with these requirements identified in the first sequential scan.

This may significantly increase the speed of computing a requirement-compliant output 732 and at the same time consumes only a very small amount of memory, because the loading of large files into memory and the resulting swapping operations are avoided. The modified, requirement compliant copy of some or all of the EOs is returned as output 732 to the client having submitted the command 734, whereby the output represents the state of the EOs at the selected time 726 and is free of any data required to be kept secret.

The described approach for generating requirement-compliant output based on the data of an application program may be advantageous as this approach is not only highly flexible in respect to the number and type of requirements for the output but is also much faster and less memory-consuming than many existing approaches for generating an output based on data of an application program. This is because thanks to the way the data is stored in the append-only store, the processing of the application program data can be performed in a strictly sequential and transaction-save manner. The UNDO operations can be extracted and executed immediately on the current EO copy 732 while sequentially processing delta objects which are stored in a sequence of adjacent physical storage areas in a transactional context that ensures data consistency. There is no need that a read-write head of a physical data storage device jumps to different, spaced apart storage regions in order to collect all information needed for computing the output 732.

It should be further noted that the described way of reconstructing the state of EOs at a selected time in modified or unmodified form according to embodiments does not only ensure requirement compliance, but also minimum memory consumption and transactional consistency.

For example, the traversal of the append-only store by the read/write head from right to left would comprise reading and parsing delta object 776 first and creating a first UNDO operation, then reading and parsing delta object 774 and creating a second UNDO operation and then reading and parsing delta object 772 and creating a third UNDO operation and so on until delta object 770 is reached. The UNDO operations created for the delta objects of TR44 are bundled into a first UNDO transaction and executed together on data, e.g., an OLTP database, representing the current state of a set of EOs. The first UNDO transaction is performed by the framework in accordance with the ACID principles. Then, the delta objects of transaction TR43 are parsed for creating three UNDO operations to be bundled into a second UNDO transaction.

An "UNDO operation" as used herein is a command or function created based on EO change information stored in a delta object and that, if applied on any data entity (e.g., a data object or class or database record) representing the EO whose changes are reflected in this delta object, revokes these changes in the data entity. The data 730 used as basis for applying the UNDO operations can be, for example, the EOs of an application program copy reflecting the application program state at the current time. Alternatively, the data 730 can be a OLTP database comprising tables with data records representing the application program state at the current time. Likewise, the data 732 resulting from the application of the UNDO operations can be a copy of the application program or an OLTP database reflecting the state of the application program at the selected time.

For example, the framework can be configured to create and execute an UNDO command as follows:
  reading all delta objects in sequence related to a particular integrated transaction (trx0-1) whose changes are to be undone from the append-only store
  opening a reconstruction transaction on the data basis 730;
  for each of the read delta objects of this particular, already "persisted" integrated transaction:
    extracting the object Id from the delta object,
    retrieving the one of the data records (e.g., an XML document, a JSON document, a table or a table line) in the data basis 730 which comprises the extracted object id
    identifying the type of delta object (changeProperty-DeltaObject, addAssociationObjectDeltaObject etc.) of the retrieved delta object;
  committing and closing this reconstruction transaction; as a consequence, the data basis 730 has the exact state of (trx0-1); and
  repeating the above-mentioned steps for all delta objects created and stored within the integrated transaction (trx0-2) until the begin timestamp of (trx0-x) is smaller or equal the selected time.

Since the delta objects and RS objects (which do not correspond to a REDO or UNDO operation) are stored strictly sequentially in the storage areas and their position does not change during the storage period, the read/write head can very quickly read out and immediately process all information required for the original or requirement-compliant reconstruction (also referred to as "restoring") of the state of the application program by performing a sequential scanning of the physical storage medium.

Embodiments of the invention may allow traversing and processing data changes stored in 5000 integrated transactions within only one second on a computer system having standard hardware equipment. This is because the reconstruction is based on a sequential scanning of adjacent physical storage areas and the immediate application of information obtained by linearly scanning of one or more storage devices. According to preferred embodiments, data obtained in the scanning process is already organized in the form of transactions whose "borders" (begin and commit events) correspond to integrated transactions having been used for applying and persisting delta object changes originally. For example, the "borders" of an integrated transaction can be derived from the transaction-IDs of the traversed delta objects. Hence, the UNDO/REDO operations obtained during the scanning process can immediately performed on the respective data basis in a transaction-based manner, thereby ensuring that the state of the data basis is reconstructed in a consistent manner in accordance with the ACID criteria.

Figure 8:
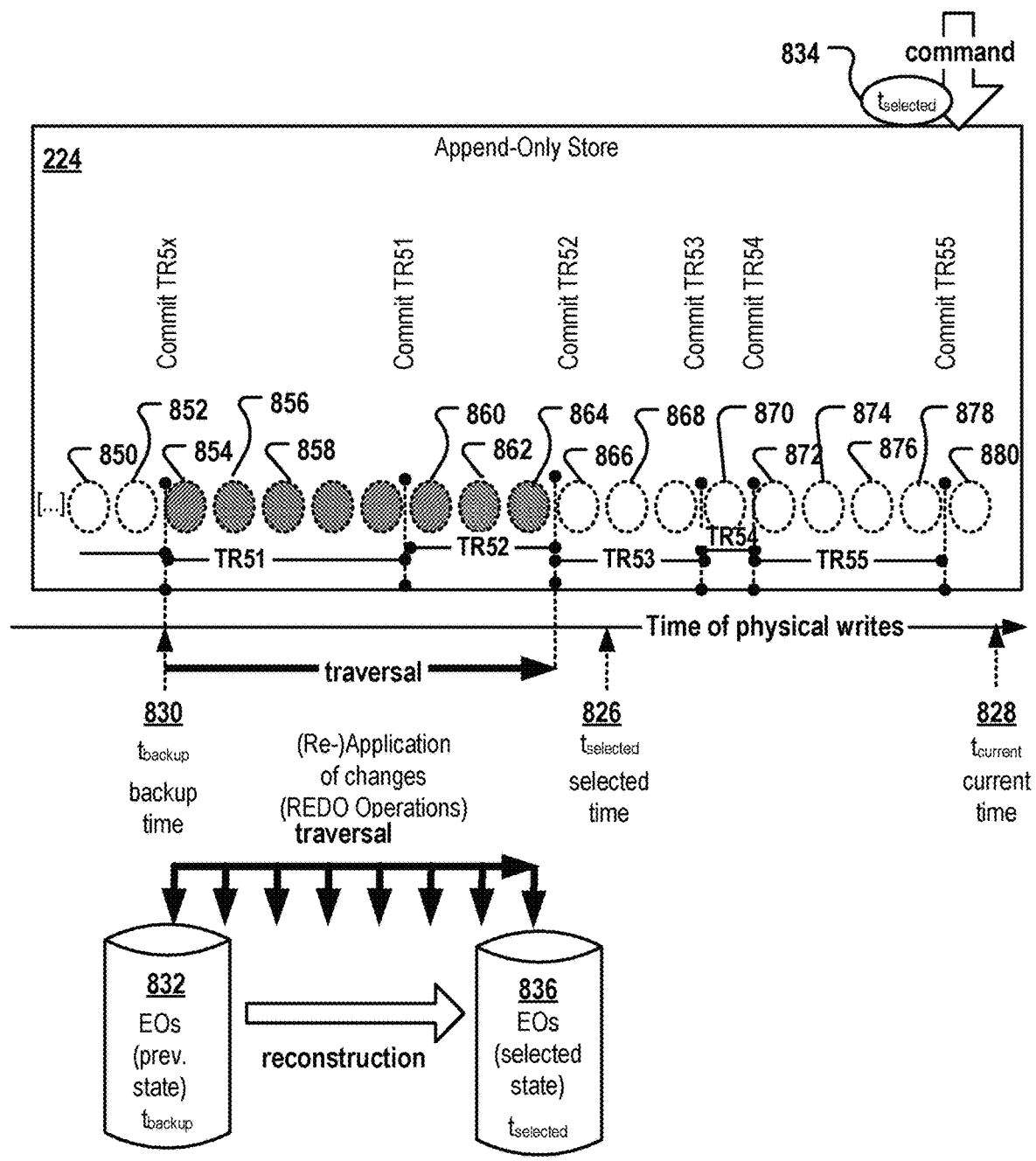
FIG. 8 illustrates a process of reconstructing the state of the application program based on REDO operations derived from the delta objects.

FIG. 8 illustrates a process of reconstructing the state of the application program based on REDO operations derived from the delta objects 850-880. The process is analogous to the process depicted in FIG. 7. The difference is that the traversal starts with the oldest stored delta object 850. During the delta object traversal, REDO operations representing the changes indicated in the traversed delta objects are created and immediately applied on data 832 reflecting the original (or a previous) state of the EOs of the application program. The data 832 can be, for example, a copy of the application program or an OLTP database representing the state at a previous time (which may be referred to as backup time). By applying the REDO operations on the data 832 until the selected time 826 is reached, the state of the EOs at the selected time can be reconstructed, whereby the state and the attribute values associated with this state may be modified in order to comply to requirements specified in the RS objects.

A "REDO operation" as used herein is a command or function created based on external object change information stored in a delta object and that, if applied on any data entity (e.g., a data object or class or database record) representing the EO whose changes are reflected in this delta object, re-applies these changes on the data entity.

Figure 9:
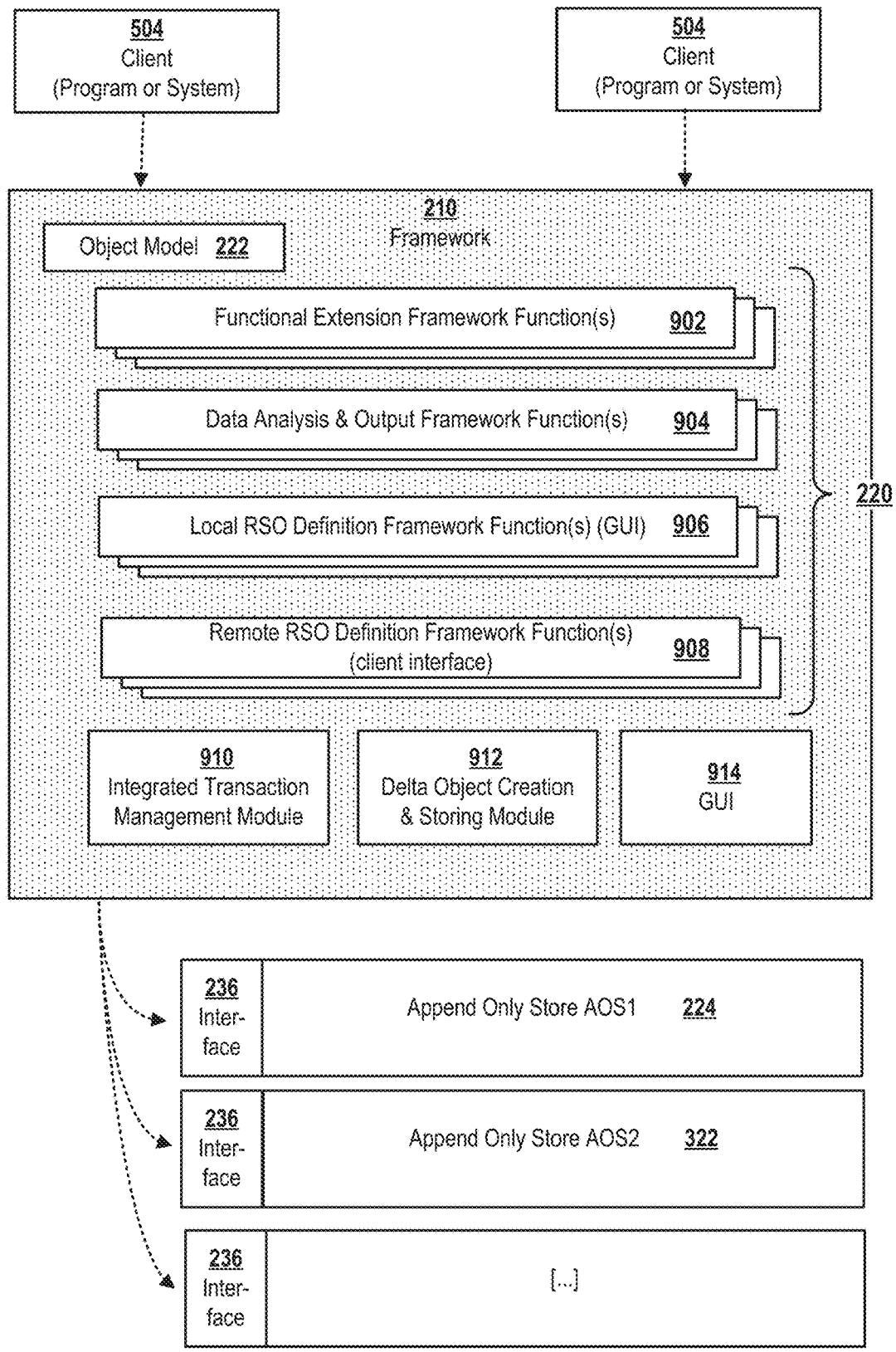
FIG. 9 illustrates various sub-modules and functions of the framework.

FIG. 9 illustrates various sub-modules and functions of the framework according to an embodiment of the invention.

The framework can comprise an interface for receiving requests from one or more clients in respect to reports, analysis results or other forms of output computed based on application data from one or more different applications. None of the clients can access the append having only store's or anyone of the application programs directly.

The framework shares an object model 222 with the one or more application programs having created the data to be analyzed and returned. The framework further comprises a plurality of framework functions 220.

For example, the framework functions can comprise framework functions 902 which are functional extensions of the business logic of one or more of the application programs. For example, the framework functions 902 can be configured to perform tasks such as value normalization, value calibration, data aggregation, reporting, unit conversion, currency conversion, generation of technical or security alerts, logging, encryption, information hiding, pseudonymizing, etc. At least some of the framework functions 902 are configured to compute an output, e.g., one or more normalized values, calibrated values, an aggregation result, an alert, a report, log file, an encrypted or pseudonymized report or analysis result or the like.

In addition, or alternatively, the framework functions can comprise one or more framework functions 904 configured for performing complex analysis, e.g., complex statistical analysis. For example, the analysis may relate to the computing of a medical diagnosis, the computing of a recommended treatment option, the simulation of a complex technical system, an aggregated price, etc. At least some of the framework functions 904 are configured to compute an output, e.g., a complex analytical result.

In addition, or alternatively, the framework functions can comprise one or more framework functions 906 configured for creating and/or modifying RS objects and/or for enabling a user or client to create and/or modify existing RS objects. For example, the framework functions 906 can implement a graphical user interface (GUI) displayed on a screen of a computer system 200, 300 which enables a user to modify existing requirements and/or create new requirements via the GUI. Preferably, the GUI is configured such that a user can create or modify requirements without applying any programming skills. The framework functions 906 store the newly created or modified requirements in the form of one or more RS objects in the at least one append-only store.

In addition, or alternatively, the framework functions comprise one or more framework functions 908 configured for enabling one or more remote clients to create and/or modify one or more requirements. For example, the client interface used for receiving data requests from one or more client can in addition comprise an interface for receiving requirement requests. A requirement requests specifies one or more requirements and preferably also a requirement context (the attribute, extended object type, application program and/or time which shall comply with this requirement). In response to receiving a requirement request, the framework function 908 creates one or more RS objects and stores them in the at least one append-only store.

According to embodiments, one or more of the framework functions of one or more of the above-mentioned subgroups 902, 904 are configured to identify, in a first step, all RS objects in the at least one append-only store which may be of relevance for a current task of storing a new delta object in the append-only store or of computing and output based on already stored delta objects. This step may comprise resolving conflicts between two or more different RS objects having been stored at different times in the append-only store.

Then, in the second step, the one or more delta objects to be stored are evaluated against all requirements identified in the first step to be of relevance and are modified, if necessary, such that they comply with the relevant requirements. Likewise, in case the current task is to compute an output (e.g., automatically or in response to a client's data requests), all data objects which are to be used as data basis for computing the output are evaluated against all requirements identified in the first step to be of relevance and are modified, if necessary, such that the computed output complies with the relevant requirements.

In addition, according to embodiments of the invention, the framework comprises a module 910 for managing integrated transactions, a module 912 for creating and storing delta objects, and/or a GUI 914 enabling a user to create and/or modify RS objects.

FIG. 10 illustrates the data content of delta objects of five different types 1002-1010 of delta objects according to an embodiment of the invention.

The framework used for creating the delta objects comprises a set of predefined templates for each of a plurality of supported types of delta objects. For example, a template can be a combination of a Java interface method and a Java class file that implements this interface method and that can be used for creating delta objects which comprise the property values defined for this template. In the example embodiment depicted in FIG. 10, the framework comprises a template for the "createObjectDeltaObject" delta object type 1002, a template for the "deleteObjectDeltaObject" delta object type 1004, a template for the "changePropertyDeltaObject" delta object type 1006, a template for the "addObjectAssociationDeltaObject" delta object type 1008, and a template for the "removeObjectAssociationDeltaObject" delta object type 1010.

According to embodiments, any creation of a new external object in the application program 226 triggers the creation of a new delta object of type 1002 by the framework.

Each delta object of type 1002 comprises an indication of its type ("createObjectDeltaObject") that may also reflect the type of change operation performed in the application program that triggered the creation of this delta object. In addition, each delta object of type 1002 comprises a timestamp being indicative of the time of creating the new external object in the application program, a transaction-ID being indicative of the integrated transaction within which the change operation occurred and within which the delta object was created, an object-type being indicative of the type of external object that was created (e.g. "customer") and a unique identifier (object-ID) of the new external object that was created (here: a new instance of the class "customer").

Each delta object of type 1004 comprises an indication of its type ("deleteObjectDeltaObject") that also reflects the type of change operation performed in the application program that triggered the creation of this delta object. Each delta object of type 1004 comprises the information described already for delta object type 1002, i.e., a timestamp, a transaction-ID, the object-type and an object-ID. In addition, each delta object of type 1004 comprises a list of properties and associations and respective data values ("list of P&A") representing the latest state of this data object and its associations at the time when it was deleted.

Each delta object of type 1006 comprises an indication of its type ("changePropertyDeltaObject") that reflects the type of change operation performed in the application program that triggered the creation of this delta object. Each delta object of type 1006 comprises the information described already for delta object type 1002, i.e., a timestamp, a transaction-ID, the object-type and an object-ID. In addition, each delta object of type 1006 comprises an identifier of the property whose change triggered the creation of this delta object and comprises the new value that was assigned to this property upon this change.

Each delta object of type 1008 comprises an indication of its type ("addObjectAssociationDeltaObject") that reflects the type of change operation performed in the application program that triggered the creation of this delta object (here: the adding of an association between two external objects to one of the two external objects). Each delta object of type 1008 comprises the information described already for delta object type 1002, i.e., a timestamp, a transaction-ID, the object-type and an object-ID in respect to the data object to whom the association was assigned. In addition, each delta object of type 1008 comprises an identifier or name of the association that was added to the data object and an identifier of the other data object that was linked to the above-mentioned data object by adding the association.

According to embodiments, a data object in an association of a particular association type (IndexedAssociation) has a certain position in the list of associated objects—e.g., at position 5. This is expressed by the "AddedObjectIdPosition". Additional association types and their changes can also be stored as delta objects.

Each delta object of type 1010 comprises an indication of its type ("removeObjectFromAssociationDeltaObject") that reflects the type of change operation performed in the application program that triggered the creation of this delta object (here: the removing of a data object from an association between two data objects). Each delta object of type 1010 comprises the information described already for delta object type 1002, i.e., a timestamp, a transaction-ID, the object-type and an object-ID in respect to the data object from which the association was removed. In addition, each delta object of type 1010 comprises an identifier or name of the association that was removed and an identifier of the other data object that was linked to the above-mentioned data object by the removed association.

Other embodiments of the invention may support less or additional delta object types or support delta object types with a slightly different data content and comprise a corresponding set of templates. In any case, each template should specify the information that is required for enabling a program that reads and parses the delta objects (e.g., the framework 210) to create UNDO or REDO operations which re-execute or undo the data object changes specified in the delta objects. For example, in some embodiments, a changePropertyDeltaObject instance may comprise the property value of the data object before the change operation took effect in addition to the new property values.

According to some embodiments, the set of delta object types supported by the framework in addition comprises delta object types for creating a new class, for deleting an existing class and/or for modifying the structure of an existing class, e.g., adding a new property to an existing class and/or for removing a property of an existing class.

For example, a delta object of the type "changeObjectDeltaObject" can be created in response to a command "customer.name( ).set("test");" performed by a data object of the application program. The execution of the method "set("test")" induces a call of an abstract interface method "changeObjectDeltaObject" 1006 provided by the framework. The interface method for creating a new delta object of type 1006 can be, for example:

```
public interface createChangePropertyDeltaObject {
    Property<date> timestamp( );
    Property<date> transaction-ID( );
    Property<String> object-type( );
    Property<String> object-ID( );
    Property<String> property-ID( );
    Property<String> newPropertyValue( );
}
```

The interface method createChangePropertyDeltaObject may be called automatically whenever an external object in the application program sets a data value of another external object. The interface method may be implemented by one or more classes provided by the framework (not shown).

Figure 11:
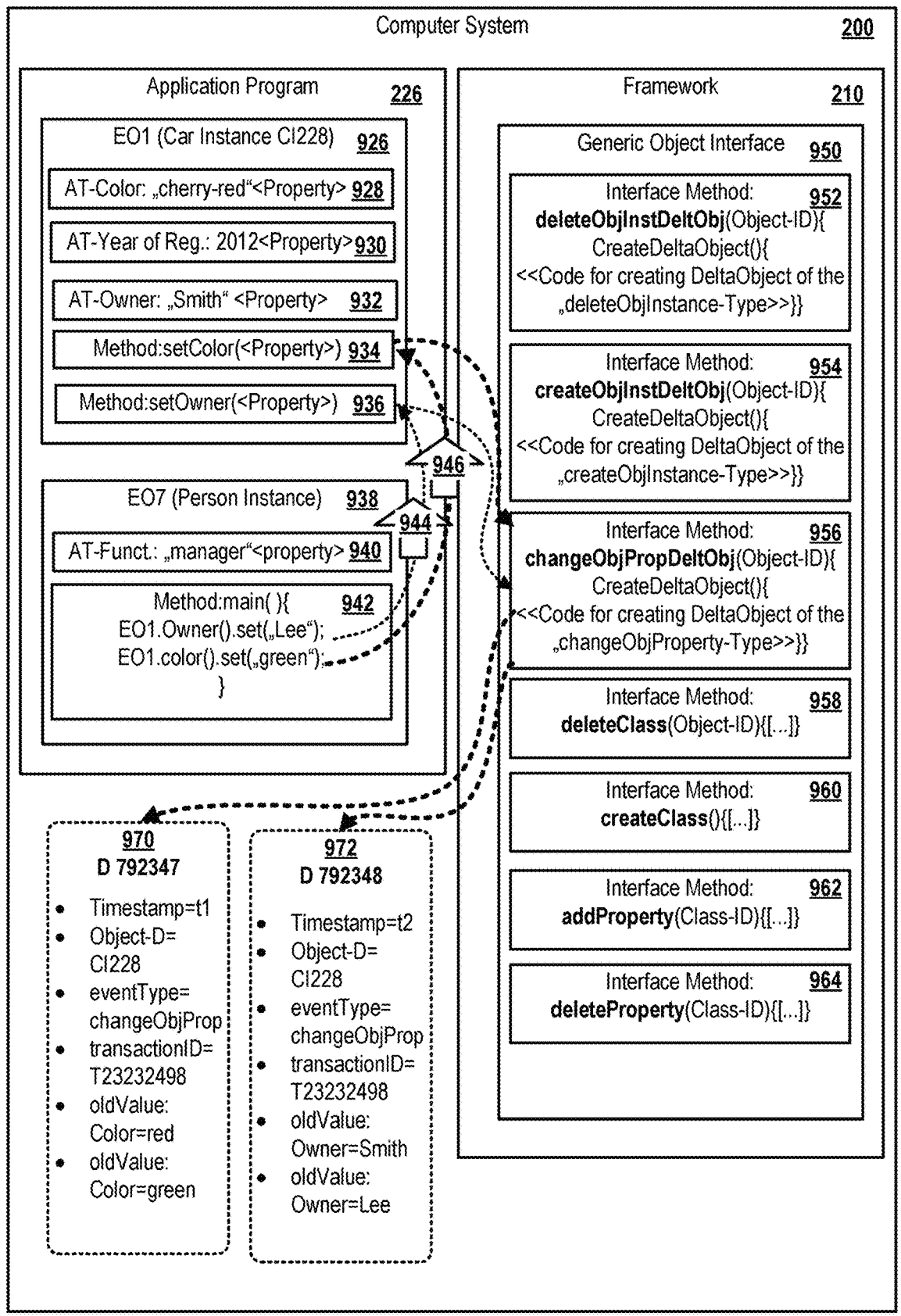
FIG. 11 illustrates the creation of delta objects in a framework.

FIG. 11 illustrates the creation of delta objects by the framework 210 as implemented in some embodiments of the invention.

The attributes of the external objects in the application program 226 are not implemented in the form of primitive data types such as String, Integer, Float, Boolean etc. but rather in the form of a generic data object and a respective class (referred to in the following as "Property") that is functionally linked to the framework 210. For example, the framework can comprise the class "Property" and may be used as a class library during the development and programming of the application program 226. Hence, according to embodiments, all properties of all data objects of the application program 226 are instances of the class "Property" or inherit some features and/or functions provided by an abstract class "Property", whereby the "Property" class is provided by the framework 210.

This feature may be highly advantageous as any property change within the application program 226 is automatically communicated to the framework 210 that is in charge of instantiating a new delta object instance based on the respective type of change operation and that is in charge of specifying in this new delta object which property of the external object was modified and the new property value (at least for all change operation types involved with modifying the type and or value of a property (also referred to as "attribute") of an external object. As any new property is an instance of the PROPERTY class provided by the framework, the framework inherently "knows" when a property value of an external object is changed in the application program.

These features free the programmer of the burden to make sure that every external object change in the application program is correctly propagated and persisted in the append-only store, because any property change operation is necessarily and fully automatically associated with creating a new instance of the Property class in the framework and hence automatically triggers data processing routines in the framework that are associated with the creation of a respective delta object in the framework.

Moreover, these features free the programmer of the burden of making sure that any relevant external object changes are explicitly covered in reporting routines because the delta objects that are automatically created by the framework in response to any change operation that involves the creation of a new Property class instance implicitly represents the most fine-granular change log one could think of. The append-only store can be used as an automatically generated complete log or report that can be evaluated by analytical programs developed in respect to any analytical question that may be of interest for an operator of the application program.

The programmer is also largely freed of the burden to consider many technical, organizational and/or legal requirements which may change frequently as the task of keeping the delta objects and/or any output returned to clients based on the delta objects in compliance with a large and varying set of requirements is delegated to the framework and the framework functions.

In summary, the framework may offer the great advantage that a programmer who uses this framework when creating an application program does not have to worry about and does not have to write explicit routines or modules to ensure that all changes to data objects and/or associations and/or classes within the application program at runtime are fully persisted and/or are fully compliant with a plurality of current or future requirements. The programmer only has to make sure that the operations that cause the changes in the external objects, associations and/or classes in the application program use classes and/or interfaces provided by the framework, so that the framework is automatically notified of any change to an external object, external object association or class in the application program and hence can automatically create respective delta objects and persist them in the append-only store in a requirement-compliant manner. This greatly facilitates and accelerates the development of application programs and increases the quality and reliability of the program and of the way the application program is persisted, because the persistence of changes in the application program is inherently and fully automatically implemented simply by making use of the respective classes and functionalities provided by the framework. The task of ensuring that any program output adheres to a large number of frequently changing requirements is also delegated to the framework and the framework functions.

In other words, the use of a framework 210 according to embodiments of the invention provides for an industrialization and automation of large parts of the software development process, whereby the quality, reliability, requirement compliance and completeness of persisting and reporting the state of an application program is greatly facilitated.

In the following, a concrete example will be described to illustrate how the framework 210 can be used by a programmer at design time of the application program 226 for automatically propagating external object or class changes occurring at runtime of the application program 226 in the application program 226 to the framework 210.

State of the Art Approach Property Change

A state-of-the-art approach of modifying an object property ("attribute") of a Java class instance of the class "ExampleClassic" would be implemented as follows:

```
public class ExampleClassic {
    private String firstName;
    private String lastName;
    public String getFirstName( ) {
        return firstName;
    }
    public void setFirstName(String firstName) {
        this.firstName = firstName;
    }
    public String getLastName( ) {
        return lastName;
    }
    public void setLastName(String lastName) {
        this.lastName = lastName;
    }
}
```

In the example given above, the creation of a new ExampleClassic instance and the access to one of its attributes (properties) (here: the first name) is performed by the following method calls:
ExampleClassic exampleClassicInstance=new ExampleClassic( )
exampleClassicInstance.setFirstName("Peter");
Framework-Based Property Change Approach To the contrary, according to embodiments of the invention, the modification of an object property of a Java class instance of the class "ExampleNew" would be implemented based on a generic Property class instance rather than a primitive property String value as follows:

```
public interface ExampleNeu {
    Property<String> firstName( );
    Property<String> lastName( );
}
```

In the example given above, the ExampleNeu interface and a class implementing the ExampleClassic instance can be comprised in and be provided by the application program while the class Property is provided by the framework.

According to embodiments, the Property class provided by the framework comprises a "set" method that is called whenever a new Instance of this Property is created and assigned to a Property instance in the application program. The call to this "set" method of a Property class instance triggers the creation of a delta object.

According to embodiments, the functionality that any change operation which respectively creates, modifies and/or deletes one of the external objects in the application program automatically triggers the creation of a delta object by the framework is implemented such that the external objects of the application programs (or at least the ones of the external objects implementing the Serializable or being otherwise marked as "transient") comprise attributes (also referred to as "variables" or "properties") in the form of class instances of at least one class provided by the framework. This at least one class provided by the framework is referred to e.g., as "Property" class. The Property class provided by the framework comprises a "set" method that is called whenever a new Instance of this Property is created and assigned to a Property instance in the application program. The call to this "set" method of a Property class instance causes the framework to create a delta object.

According to embodiments, at least one of the properties of at least one of the external objects indicates an association (also referred to as "relationship") between two external objects. By representing external object associations in the form of external object properties, embodiments of the invention may allow persisting external object associations and external object association changes in the form of delta objects.

According to embodiments, the "set" method of the Property class of the framework is signed with a signature key of a certification authority. The digital signature is associated with a certificate of a certification authority. The signing of the set method may allow verifying the method's integrity and ensure that the code has not been changed or corrupted since it was signed. This may help users and other software to determine whether the framework can be trusted.

Access to one of its attributes (properties) (here: the first name) of any external object being an instance of the ExampleNew implementing class can be performed e.g., by the following method calls:

ExampleNew exampleNewInstance=uow.create(ExampleNeu.class);
exampleNeuInstance.firstNameu.set("Peter");

Thereby, uow is an ojbect provided by the framework that is in charge of creating and managing an individual integrated transaction. The call to the setter method of the Property (here: firstNameu.set("Peter")) in the application program fully automatically triggers the creation of a delta object of the type changeObjectDeltaObject in the framework.

Representing a class attribute as an instance of the generic "Property" class provided by framework has the following advantages:
- the source code is much more compact
- Because the properties (attributes) of the external objects implement the class "Property", and all method calls for changing the properties run via the class "Property" of the framework 210, every change of a property value can be recognized very easily and fully automatically by the framework and used to create a delta object; In the classical model, the attribute is directly manipulated with the setter method, without another program/framework being able to interfere in this process (without time-consuming "tricks"). By implementing the object properties as instances of the generic "Property" class of the framework, this technical difficulty is avoided;
- the properties and especially the dynamic behavior of the properties can be easily extended at any time—e.g., by test methods like "notNull" or complex test protocols or by complex evaluation routines for reporting purposes, without having to change the source code of the application program. It is sufficient to extend the source code of the framework by corresponding functions. Thus, a highly complex software can be supplemented during operation by checks and reporting functions on a fine-granular level, namely the attribute level, without a source code change or recompilation being necessary. A change in a single class or a few classes in the framework is sufficient, and this change immediately has global validity for all application programs developed on the basis of the framework.

In the example depicted in FIG. 11, the application program 226 at runtime comprises external object 926, an instance of the car class whose attribute values 928, 930, 932 indicate that the color of this car is cherry-red, the year of registration is 2012 and that the car is owned by a person named "Smith". The attributes of this car instance can be modified by other external objects, e.g., external object 938 being an instance of the "person" class and representing a person having the function of a fleet manager (attribute 940), by executing the following methods calls specified in source code 942: EO1.setOwner("Lee"); and EO1.setColor ("green").

The framework comprises, for each of a plurality of predefined data change events, a respective template class (e.g.: an interface class) and/or an interface method for creating delta objects. For example, the framework can comprise one or more generic interface classes 950 respectively comprising one or more generic interface methods 952-964 for creating new external objects 926, modifying a property of an existing external object, deleting an existing external object, deleting a class at runtime of the application program, creating a class at runtime of the application program and modifying the structure of a class at runtime of the application program.

When the external object 938 executes the method call EO1.setOwner("Lee"), a new Instance of the class "Property" provided by the framework is created. The call to the "setOwner" function provides information on the calling EO7 938, the time of the call, the new value of the property ("Lee") and the property to be changed ("owner") to the framework. The framework does not only create a new instance of the "Property" class that is needed by the application program to change the owner-property of EO1, the framework also creates a new instance of a changeProperty class or creates a new class instance making use of an abstract changeProperty interface 956 provided by the framework. This new class instance is filled with context information on the property change (which property is changed, the time of change, the external object having caused the change, the new property value, etc.) and used as a new delta object 972.

External object 938 may in addition call the method EO1.setColor("green"). This call triggers the creation of a Property instance for the new color "green" and the creation of a new delta object 970 in the framework.

According to embodiments, one or more of the external objects of the application program are text-based external objects. A text-based external object as used herein is an external object defined in a text-based format such as XML or JSON and which does not represent a class instance of a class written in an object-oriented language. For example, the application program can be Java and many of the external objects whose changes are persisted by the framework can be Java class instances. Some of the external objects are XML text objects or JSON text objects. In order to persist the text-based external object, the following approach can be followed:

```
ExampleNew exampleNewInstance = uow.create({<text-object><object-id>82328368</
object-id ><car-name>Tesla383</car-name><year-of-reg>2018</year-of-reg></text-
object>});
```

Hence, although preferably all external objects of the application program are instances of classes written in an object-oriented programming language, some embodiments of the invention may also be implemented based on a non-object-oriented programming language and/or on external objects provided in the form of text-based objects.

Figure 12A:
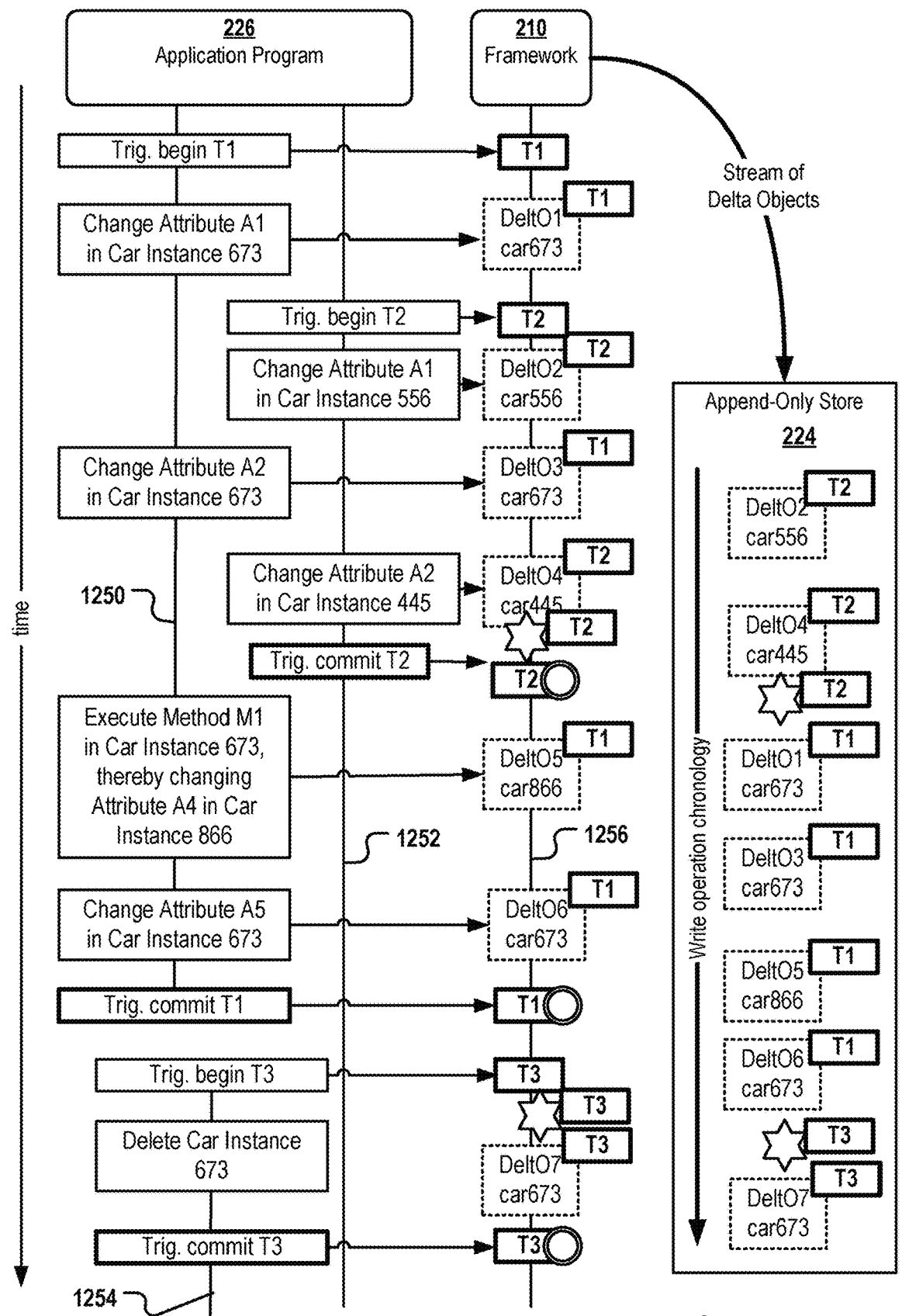
FIG. 12A illustrates the transaction-based storing of delta objects and RS objects in a single append-only store.

FIG. 12A illustrates the management of integrated transactions by the framework 120 in interoperation with the application program 226. In the embodiment depicted in FIG. 12A, delta objects and RS objects are stored in a single append-only store.

In the embodiment depicted in FIG. 12A, integrated transactions are generated, managed and closed after a commit event by the framework, whereby operations executed within the application program serve as triggers for beginning and/or terminating an integrated transaction. The delta objects created within the integrated transactions are stored in a single append-only store in accordance with the chronological order of commit-ready events of the integrated transactions within which they have been created and in accordance with their respective timestamps.

For example, the framework 210 can implement a function being able to receive one or more method calls as argument. Each call to this function by an external object of the application program triggers the creation of an integrated transaction whose existence is bound to the execution of the called function. The method calls provided as arguments are change operations (e.g., the creation of a new external object, the modification of a property of an existing external object, the deletion of an existing external object, the creation of a class, the deletion of a class, the modification of a class).

This may be advantageous as the transactional context of the integrated transaction created by the framework upon a call to this function is automatically closed (with a commit or undo action) when the function returns. Hence, it is not possible that a programmer forgets to explicitly close an integrated transaction. Furthermore, as the one or more change operation performed within this integrated transaction are provided as argument of the function, it is implicitly ensured that each of the change operations is executed within an integrated transaction. Provided the programmer of the application program specifies any change to a data object or class exclusively as an argument of the said function, it is ensured that no change operation can be executed outside of an integrated transaction. This may ensure transactional consistency for every single change operation as well as complete persistence of any change in the append-only store. The programmer is not required to explicitly open or close a transactional context or to explicitly assign change operations to a particular integrated transaction. Providing the change operations as an argument to the function of the interface is all that is required.

For example, the function that is adapted to receive the one or more change operations as arguments can be a function of a functional interface. In Java, this function can be a so-called Lambda function, whereby each call of a Lambda function is carried out within a respective integrated transaction.

The application program or a data object contained therein can call a lambda function of the framework for the first time and thus trigger the generation of a first integrated transaction T1 by the framework. After the transactional context T1 has been opened, the A1 attribute of external object car 673 is changed in the application program, and later the A2 attribute of the same external object is changed. Then, a further attribute A4 in the external object car 866 is changed and finally attribute A5 of external object car 673 is changed. The changes made to external objects within the transactional context of T1 within the application program are represented in FIG. 12A by a first line 1250. Closing the call of the lambda function within the application program represents a trigger event that triggers a commit event for the integrated transaction T1, represented by the concentric double circle, within the framework.

The application program may in addition can call another lambda function of the framework, thereby triggering the generation of a second integrated transaction T2 whose transactional context is represented by line 1252. After the transactional context T2 has been opened, the A1 attribute of external object car 556 is changed in the application program, and later the A2 attribute of external object car 445 is changed. Closing the call of the other lambda function within the application program represents a trigger event that triggers a commit event for the integrated transaction T2.

The application program may in addition can call a still further lambda function of the framework, thereby triggering the generation of a third integrated transaction T3 whose transactional context is represented by line 1254. After the transactional context T3 has been opened, external object car 673 is deleted in the application program, and the still further lambda function is closed, thereby triggering a commit event for the integrated transaction T3.

According to embodiments, the framework can manage a variety of different integrated transactions for the same application program simultaneously. It is possible to start one integrated transaction while another is not yet finished. The framework ensures that there are no conflicts and that two transactions do not manipulate the same external object at the same time. A transaction is committed by the framework only if all delta objects created within this transaction are successfully stored in the append-only store (not shown here).

The events shown on line 1256 are listed in the chronological order of the corresponding data object changes and the time stamps of the respectively created delta objects. Each change of a data object corresponds to an external object change event EV, which in turn triggers the creation of a delta object, which in turn contains an identifier of the integrated transaction within which the delta object was created. However, the sequence of the creation of the delta objects in the framework does not necessarily correspond to the chronological sequence of the physical storage of the delta objects in the append-only store. Rather, the framework is configured to perform the storing of the delta objects according to the order of their commit-ready events, so that the time stamps of the delta objects stored in the append-only store 224 are strictly chronologically ordered only within a certain transnational context. This is shown in append-only store 224: since the commit-ready-event of transaction T2 occurs earlier than that of transaction T1, the corresponding delta objects EV2 and EV4 of transaction T2 are also stored before the delta objects EV1, EV3, EV5, EV6 of transaction T1, although the transactional context of T1 begins earlier than that of T2. The chronological order of the expected commit events is derivable from and determined by the source code of the application program, in which the individual lambda functions are called in one or more different threads, whereby within a thread the opening of a new transactional context is only possible after the completion of an open lambda function call.

According to embodiments, the RS objects are created within the context of one of the integrated transactions and are stored in the at least one append-only store at a position within the delta objects that corresponds to the time of creating the RS object and delta objects. For example, an RS object is created in the framework within transaction T2 after the creation of delta object for car 445. Hence, the RS object is stored in the append-only store together with the delta objects created within transaction T2 and after the delta object DeltO4car445 was stored. Likewise, an RS object is created in the framework within transaction T3 prior to the creation of delta object DeltO7car673. Hence, this RS object is stored in the append-only store together with the delta objects created within transaction T3 and before the delta object DeltO7car673 was stored.

Figure 12B:
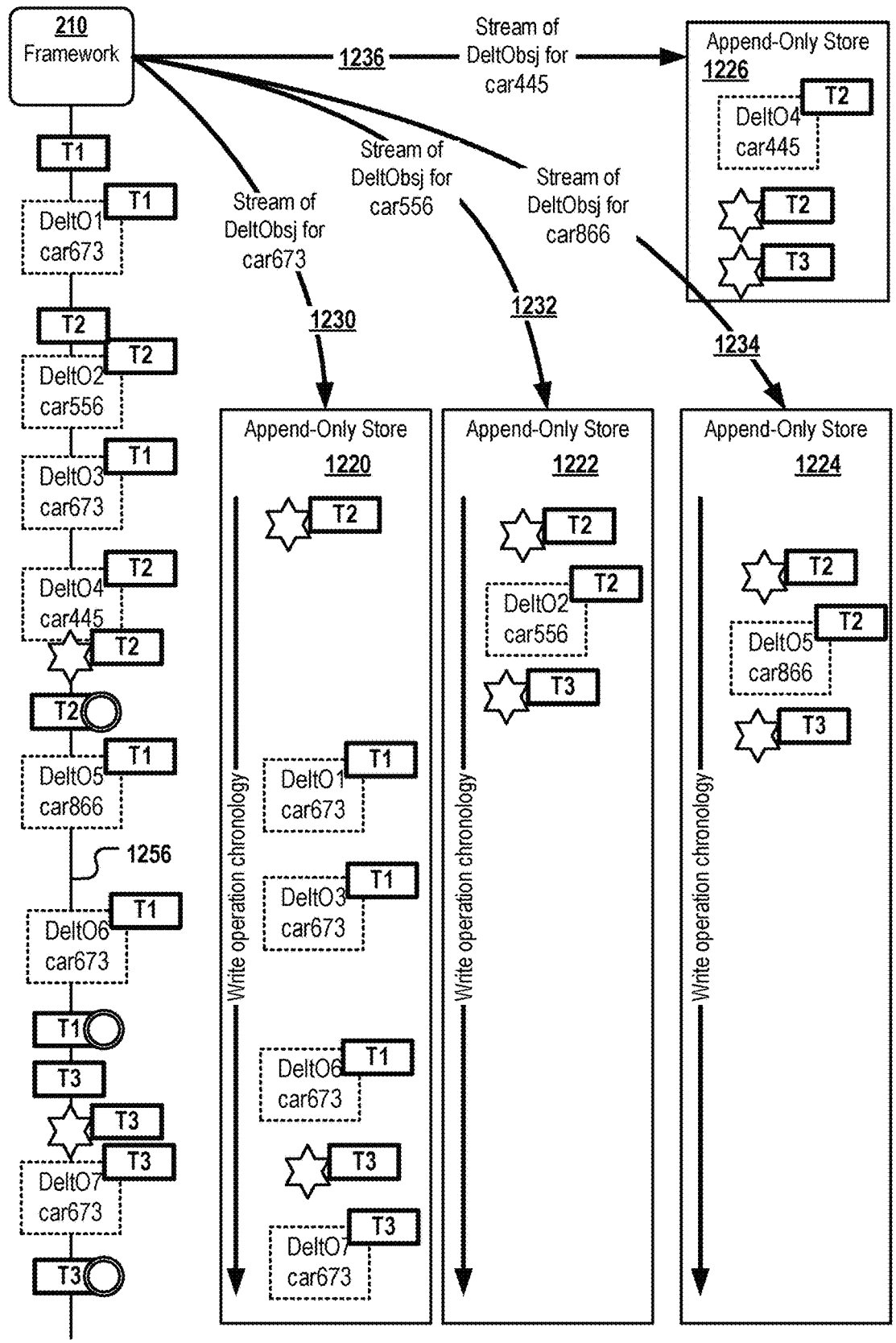
FIG. 12B illustrates the transaction-based storing of delta objects and RS objects in multiple data-object specific append-only stores.

FIG. 12B illustrates the transaction-based storing of delta objects and RS objects in multiple data-object specific append-only stores according to a further embodiment. The delta objects created within the integrated transactions are stored in multi append-only stores 1220, 1222, 1224, 1226. Each of the external objects of the application program corresponds to a respective one of the append-only stores. All changes performed in the application program on one of the external objects are stored in the form of a stream of delta objects in the one of the append-only stores assigned to the respective external object. For example, all external object changes of external object "car673" are stored by the framework as a stream 1230 of delta objects in append-only store 1220. All external object changes of external object "car556" are stored by the framework as a stream 1232 of delta objects in append-only store 1222. All external object changes of external object "car866" are stored by the framework as a stream 1234 of delta objects in append-only store 1224. All external object changes of external object "car4456" are stored by the framework as a stream 1236 of delta objects in append-only store 1226. The framework is configured to cache and distribute the newly created delta objects over the different streams and append-only stores such that the delta objects being descriptive of changes of a particular external object are selectively stored in a particular one of the multiple append-only stores. Thereby, each external object can be, for example, an instance of a class used as template for creating the external object or can be the class itself. The external objects of the application program can comprise class instances and individual classes, wherein a class can be e.g., a class file in accordance with the Java programming language.

In the depicted embodiments, some of the RS objects created in the framework are relevant for all types of external objects and hence are stored in the form of a respective RS object copy in each of the append-only stores.

For example, a copy of the RS object created in integrated transaction T3 is stored in each of the append-only stores. In addition, a copy of the RS object created in integrated transaction T2 is stored in each of the append-only stores at a corresponding position. In addition, some RS objects can be determined to be relevant only for delta objects relating to changes of a particular external object (not shown). In this case, the framework may store the RS object selectively in the one of the append-only stores which is to receive the delta objects of this particular external object.

As can be inferred from a comparison of FIGS. 12A and 12B, the same sequence of external object changes and transactions can be stored in one or more append-only stores according to different delta object distribution schemas. In both schemas, the transactional context is preserved, e.g., in the form of transaction-IDs comprised in the delta objects. The embodiment depicted in FIG. 12B is preferred due to improved scalability. Depending on the embodiment, the framework may store the delta objects in the one or more append-only stores directly or via an additional program, e.g., a streaming application such as Apache Kafka.

According to some embodiments, the application program 226 is written in the object-oriented programming language Java and the framework 210 comprises a plurality of interface methods in the form of Java lambda functions (also referred to as "lambda expressions").

Lambda functions have been added in Java 8. Lambda functions basically express instances of functional interfaces (an interface with a single abstract method is called functional interface. An example is java.lang.Runnable). Lambda expressions implement the only abstract function and therefore implement functional interfaces. Lambda functions enable to treat functionality as a method argument, or code as data. They can be created without belonging to any class. A lambda function can be passed around as if it was an object and executed on demand. Lambda expressions basically express instances of functional interfaces (An interface with a single abstract method, an example is java.lang.Runnable). Lambda expressions implement the only abstract function and therefore implement functional interfaces.

However, other embodiments of the invention may be implemented using other programming languages. A skilled programmer is able to implement the examples and embodiments described herein based on the programming language Java also in other programming languages, in particular in other object-oriented programming languages.

The call "("add_data", (uow)→{"—a so-called lambda function in Java—opens a transaction context of an integrated transaction. The call can be made by a data object of the application program but the called lambda function itself is provided preferably as part of the framework 210. The term "uow" here represents a name of an individual integrated transaction to receive the data, in this case "unit of work". The name and/or ID of the transaction may in some embodiment be provided as an argument of the method call.

With the method call "uow.create(Customer.class);" a customer object is created in the integrated transaction uow.

The expression "customer.name( ).set("test");" sets the property name of the customer to "test" and a Property object is created internally in the framework. This Property object has a 'set' method which comprises the new name "test" and comprises an identifier of the integrated transaction uow or is otherwise assigned to the integrated transaction uow.

When the lambda function is left (terminates), the integrated transaction uow is automatically closed and committed by the framework—and in case of an error all changes are discarded.

The lambda function (which provides the uow transaction context) is implemented by the framework 210. When the uow transaction is closed/ready for commit, an abstract driver interface for the append-only store is called by the framework and a delta-sub-transaction is opened. Within the context of the delta-sub-transaction, the stream of delta objects created in the integrated transaction uow is transferred to and saved in the append-only store. If the storing in the append-only store was successful, the delta-sub-transaction commits. Optionally, the framework may open further sub-transactions, e.g., for storing the delta objects in addition to a further data store, e.g., an OLTP data store or a backup append-only store. If all the said updates are performed successfully, the sub-transaction(s) commit and close.

If all sub-transactions of the integrated transaction defined by the lambda function commit successfully, an OK is returned to the application, the integrated transaction commits and the changes in the application program become visible to other external objects in the application program. If an error occurs, the framework triggers a rollback in the application, the append-only store and all further data stores used e.g., by a further sub-transaction for storing further copies of the delta objects. However, if an error occurs, all data that led to a termination is still available. This greatly increases traceability in the event of an error.

In the source code example provided below, "repository" is the framework-service that is configured to control the creation, maintenance, commit and rollback of the integrated transactions and all sub-transactions. The name "uow"/ "UnitOfWork" is an identifier of a particular integrated transaction.

```
public void testProxyUnitOfWork( ) throws Exception {
    repository.unitOfWork("add_data", (uow) -> {
        Customer customer = uow.create(Customer.class);
        assertNotNull(customer);
        customer.name( ).set("test");
        return null;
    });
}
```

With "unitOfWork.create" a new object of the class Customer is created. In addition, the framework automatically creates a delta object with type "createObject" in the background.

For example, a delta object with the attributes timestamp, class (in the example: Customer.class), and/or object-ID is created for the type "createObjectDeltaObject", e.g. an instance of the createObjectDeltaObject 1002 template depicted in FIG. 10. The command "customer.name( )set ("test");" induces the creation of a delta object of the type "changePropertyDeltaObject" comprising a timestamp, an object-ID, a property-ID and the new property value.

The command "customer.nameu.set("test");" induces the creation of a delta object of type "changePropertyDeltaObject", e.g. an instance of the changePropertyDeltaObject 1006 template depicted in FIG. 10.

```
public void newUnitOfWorkInterface( ) throws Exception {
//begin of first Integrated transaction
    Object result = repository.unitOfWork("add_data", (uow) -> {
        TypedIdentity<Customer> customer1Identity = null;
        Customer customer1 = uow.create(Customer.class);
        customer1.name( ).set("Donald");
        customer1Identity = customer1.id( ).get( );
        // lets go shopping..
        ShoppingCart cart1 = uow.create(ShoppingCart.class);
        ShoppingItem item1 = uow.create(ShoppingItem.class);
        item1.amount( ).set(1);
        item1.name( ).set("Banana");
        cart1.shoppingItems( ).add(item1);
        customer1.shoppingCart( ).set(cart1);
        return customer1Identity;
    });
//end first integrated transaction
//begin second integrated transaction
    repository.unitOfWork("read-data", (uow) -> {
        @SuppressWarnings("unchecked")
        Optional<Customer> optionalCustomer =
            uow.get((TypedIdentity<Customer>) result);
        Customer customer = optionalCustomer.get( );
        assertTrue(customer.shoppingCart( ).isPresent( ));
        assertEquals(1,
customer.shoppingCart( ).get( ).shoppingItems( ).count( ));
        assertEquals(new Integer(1),
customer.shoppingCart( ).get( ).shoppingItems( ).get(0).amount( ).get( ));
        assertEquals("Banana",
customer.shoppingCart( ).get( ).shoppingItems( ).get(0).name( ).get( ));
        return customer;
    });
//end second Integrated transaction
}
```

LIST OF REFERENCE NUMERALS

101-110 steps
200 computer system
201 processor(s)
202 application-born external object
204 application-born external object
206 change operation
207 change operation
208 change operation
210 framework
211 delta object
212 delta object
214 delta object
216 RS object
218 RS object
220 framework functions
221 AC object
222 object model
224 append-only store
226 application program AP1
227 RS object generator
229 AC object
230 requirement compliant output of AP1
234 application program functions
236 framework interface
300 computer system
302 application program AP2
304 application-born external objects of AP1
306 application-born external objects of AP2
308 application program functions of AP2
310 delta objects for change operations in AP1
312 delta objects for change operations in AP2
314 RS object
316 RS object
318 RS object
320 RS object
331 cryptographic hash
340 requirement compliant output of AP2
402 framework function
404 delta objects for change operations in the framework
406 delta objects for change operations in the framework
408 framework-born external objects
410 framework-born external objects
412 delta object 414 delta object
416 framework-born external object
418 framework-born external object
502 client interface
503 blockchain module
504 client
506 request for data of AP1
508 request for data of AP2
602-610 adjacent storage areas in append-only store
611 delta object
612 RS object
613-616 delta objects
726 selected time
728 current time
730 external objects having current state
732 external objects having reconstructed, previous state
734 command with selected time
750-778 delta objects
902-908 framework functions
910 module for managing integrated transactions
912 module for creating and storing delta objects
914 GUI
916 module for reconstructing external object state
1002-1010 delta objects of different types
926 data object "EO1"
928-930 attribute values of EO1
934-936 methods of EO1
938 data object E07
940 attribute value of B07
942 method of E07
944 change operation
946 change operation
950 collection of interface methods
952-964 interface methods implemented by the methods of the EOs
970 delta object
972 delta object
1250-1254 lines respectively representing a transactional context
1256 line representing timestamps of data change events
1220-1226 append-only stores
1230-1236 streams of delta objects

The invention claimed is:

1. A computer-implemented method for data processing control, the method comprising:
providing at least one append-only store;
providing a framework;
using an application program which is not a database management program for performing change operations on application-born external objects at runtime of the application program, each application-born external object being a data object instantiated within the application program, the change operations comprising creating, modifying and/or deleting one or more of the application-born external objects in the application program, the application program being configured to notify the framework of any one of the change operations;
in response to any one of the change operations, automatically creating a delta object being indicative of a change of an attribute of at least one of the application-born external objects caused by the change operation, wherein the delta object is created by the framework;
sequentially storing, by the framework, a sequence of data objects in the at least one append-only store, the sequence of data objects comprising a mixture of the delta objects and of Requirement specification (RS) objects, each RS object being a data object specifying a requirement in respect to how attribute information of one or more of the application-born external objects comprised in the delta objects must be processed and output by the framework, wherein the framework comprises a set of framework-functions, wherein one or more of the framework functions are a functional extensions of the application program and are configured to process, upon being called, attribute information comprised in one or more of the delta objects in accordance with the requirements stored in the RS objects;
executing one or more of the framework-functions for returning an output computed as a function of the attribute information in the delta objects which complies to the requirements specified in the RS objects,
wherein the sequence of data objects comprises a mixture of the delta objects, the RS objects and of access control objects-AC objects, each AC object being a data object specifying which user is to be allowed or denied by the framework to access the delta objects comprising change information of a particular one of the application-born external objects, the method further comprising
receiving, by the framework, a request of a user to access attribute information of at least one of the application-born external objects; and
in response to receiving the request, traversing, by the framework, the at least one append-only store for processing AC objects comprising access control data in respect to the at least one application-born external object; and
granting or denying, by the framework, the user access to attribute information comprised in the delta objects of the at least one application-born external object in dependence on the access control data in the processed AC objects; or
outputting, by the framework, a report selectively comprising attribute information comprised in the delta objects of the at least one application-born external object which can be disclosed, according to the access control data in the processed AC objects, to the user.

2. The computer-implemented method of claim 1, wherein the storing of the data objects by the framework comprises:
identifying, by the framework, for each of the delta objects to be stored, the one of the application-born external objects whose attribute change information is comprised in the delta object; and/or
identifying, by the framework, for each of the RS objects to be stored, the one of the application-born external objects whose attribute information processing is controlled by this RS object; and/or
identifying, by the framework, for each of the one or more AC objects to be stored, the one of the application-born external objects whose attribute information access is controlled by this AC object;
identifying, by the framework, selectively for the identified application-born external object, the one out of a plurality of cryptographic encryption keys which is specifically assigned to this application-born external object;
using the identified encryption key to encrypt the identified delta object, RS object and/or AC object, wherein the delta object, RS object and/or AC object is stored in the at least one append-only store in encrypted form.

3. The computer-implemented method of claim 1, wherein the framework is a software program intraoperatively coupled with the application program, the method further comprising:
  upon the instantiation of a new one of the application-born external objects in the application program, sending, by the application program, a notification of the new application-born external object to the framework, the notification comprising an object-ID of the application-born external object;
  in response to receiving the notification, automatically creating a symmetric or asymmetric cryptographic key pair by the framework, the key pair being specific to the application-born external object whose object-ID is indicated in the notification; and
  storing, by the framework, the cryptographic key pair in association with the object-ID of the application-born external object, wherein the storing is preferably performed such that the framework but no other software program or user can access the keys for decrypting the data objects in the at least one append-only store.

4. The computer-implemented method of claim 1, wherein the framework is configured to store the sequence of data objects as at least one blockchain, whereby each of the delta objects, each of the RS objects and/or each of the AC objects represents one block, wherein the method further comprises:
  checking, by the framework, upon accessing any one of the blocks in the append-only store, whether a cryptographic hash of this block is comprised in the subsequent block in the blockchain;
  if the cryptographic hash is comprised in the subsequent block, processing the accessed block; and
  otherwise outputting an alert and/or terminating the processing of the accessed block.

5. The method of claim 1, wherein the at least one append-only store is a plurality of append-only stores, each of the plurality of the append-only store representing a respective one of the application-born and/or framework-born external objects, the framework being configured for using each of the append-only stores for storing the delta objects, RS-objects and/or AC-objects comprising attribute change information, attribute processing information and/or attribute access information in respect to the one external objects selectively in the one of the plurality of append-only stores representing said external object.

6. The method of claim 5, wherein the framework is configured to store the sequence of data objects comprised in each of the multiple append-only stores as a respective block chain.

7. The computer-implemented method of claim 1,
  wherein the framework and the application program share an object model that defines types of external objects and attributes of the external object types;
  wherein the object model defines how the external objects relate to one another, each external object being a data object instantiated outside of the at least one append-only store, the external objects comprising the application-born external objects and framework-born external objects, each framework-born external object being a data object instantiated in the framework;
  wherein the executing of the one or more of the framework-functions comprises using the object model by one or more of the framework functions for creating, modifying and/or deleting framework-born external objects in the framework.

8. The computer-implemented method of claim 1,
  a. wherein the framework is instantiated on a computer system comprising a main memory;
  b. wherein the executing of the one or more of the framework-functions comprising sequentially scanning the at least one append-only store at least a first time for processing the RS objects and/or for processing AC objects, and sequentially scanning the at least one append-only store at least a second time for processing the delta objects, thereby taking into account the requirements specified in RS objects processed in the first sequential scan and/or the access permissions or constraints comprised in the AC objects,
  c. wherein the size of the totality of the delta objects, RS objects and/or AC objects in the at least one append-only store exceeds the size of the main memory.

9. The computer-implemented method of claim 1,
  wherein the application program is free of program functions for storing application-born external objects or data returned by functions of the application-born external objects in a non-volatile storage medium; and/or
  wherein the framework acts as the only interface of the application program for storing application-born external object data in a non-volatile storage medium, wherein the framework solely uses the at least one append-only store for storing application-born external object data in the form of delta objects; and/or
  wherein the framework acts as the only interface of the application program for returning an output to a client; and/or
  wherein the at least one append-only store is configured to exclusively allow the framework to read data from and/or to write data to the at least one append-only store.

10. The computer-implemented method of claim 1, further comprising:
  receiving, by the framework, a requirement specification from a client; and
  in response to the receiving of the requirement specification, creating, by the framework, one of the RS objects, the created RS object specifying the received requirement.

11. The computer-implemented method of claim 1, the executing of the one or more framework functions comprising:
  receiving, by the framework, a request for obtaining a particular type of output from a client;
  in response to the receiving of the request, traversing, by the framework, the at least one append-only store a first time, thereby selectively processing the RS objects stored in the traversed at least one append-only store for extracting requirement specifications associated with the requested type of output;
  traversing, by the framework, the at least one append-only store a second time, thereby extracting attribute information from one or more of the delta objects stored in the traversed at least one append-only store and processing the extracted attribute information in accordance with the extracted requirement specifications for computing the output compliant to the extracted requirement specifications; and
  returning the output to the client.

12. The computer-implemented method of claim 1, wherein the at least one append-only store is a plurality of append-only stores, the method further comprising:

creating, by the framework, for each of the application-born external objects and/or for each of the framework-born external objects, a respective data stream;

assigning, by the framework, to each of the data streams a respective one of the append-only stores.

13. The computer-implemented method of claim 12, wherein the sequentially storing of the sequence of data objects in the multiple append-only stores comprises:

adding every delta object created in response to a change operation performed on one of the external objects selectively to the data stream created for this external object; and perform the storing of the delta objects such that all delta objects being indicative of a change of a particular one of the external objects are stored selectively in the one of the append-only stores assigned to the data stream assigned to this particular external object.

14. The computer-implemented method of claim 12, wherein the method is performed on a computer system comprising multiple processing units and wherein the method comprises automatically assigning the data streams to different ones of the processing units for processing the data streams in parallel; and/or wherein each of the multiple append-only stores is comprised in a respective physical storage device and wherein the storing of the data streams in the multiple append-only stores is performed in parallel.

15. The computer-implemented method of claim 1, further comprising:

using a further application program for performing further change operations on further application-born external objects at runtime of the further application program, each further application-born external object being a data object instantiated within the further application, the further change operations comprising creating, modifying and/or deleting one or more of the further application-born external objects in the further application program, the further application program being configured to notify the framework of any one of the further change operations;

in response to any one of the further change operations, automatically creating a further delta object being indicative of a change of an attribute of at least one of the further application-born external objects caused by the further change operation, wherein the further delta object is created by the framework;

sequentially storing, by the framework, a sequence of further data objects in the at least one append-only store, the sequence of further data objects comprising a mixture of further delta objects and further RS objects and/or further AC objects, each further RS object being a data object specifying a requirement in respect to how attribute information of one or more of the further application-born external objects comprised in the delta objects must be processed and output by the framework, each further AC object being a data object specifying access control constraints or privileges in respect to attribute information of one or more of the further application-born external objects comprised in the delta objects, wherein the set of framework-functions comprises at least one framework function being a functional extension of the further application program and being configured to process, upon being called, attribute information comprised in one or more of the further delta objects in accordance with the requirements stored in the further RS objects;

executing the at least one framework-function being a functional extension of the further application program for returning a further output, the further output being computed as a function of the attribute information in the delta objects, the output complying to the requirements specified in the further RS objects and/or the output being returned to one or more users in accordance with the access control constraints and/or privileges of the AC objects.

16. The computer-implemented method of claim 1, wherein the plurality of change operations and the creation and storing of the delta objects are performed within integrated transactions, each integrated transaction covering:

one or more of the plurality of change operations; and at least the creation and storing of the delta objects triggered by the said one or more change operations, wherein one or more of the integrated transactions respectively cover at least the creation and storing of one or more of the delta objects and the creation and storing of one or more of the RS objects and/or of the AC objects.

17. A computer-system comprising:

at least one append-only store;

a framework being intraoperatively coupled to at least one application program which is not a database management program, wherein the application program is configured for performing change operations on application-born external objects at runtime of the application program, each application-born external object being a data object instantiated within the application program, the change operations comprising creating, modifying and/or deleting one or more of the application-born external objects in the application program, the application program being configured to notify the framework of any one of the change operations; and a processor configured to use the framework for in response to any one of the change operations, automatically creating a delta object being indicative of a change of an attribute of at least one of the application-born external objects caused by the change operation;

sequentially storing a sequence of data objects in the at least one append-only store, the sequence of data objects stored in the at least one append-only store comprising a mixture of delta objects and RS, Requirement specification, (RS) objects, each RS object being a data object specifying a requirement in respect to how attribute information of one or more of the application-born external objects comprised in the delta objects must be processed and output by the framework, wherein the framework comprises a set of framework-functions, wherein one or more of the framework functions are a-functional extensions of the application program and are configured to process, upon being called, attribute information comprised in one or more of the delta objects in accordance with the requirements stored in the RS objects;

executing one or more of the framework-functions for returning an output computed as a function of the attribute information in the delta objects which complies to the requirements specified in the RS objects, wherein the sequence of data objects comprises a mixture of the delta objects, the RS objects and of access control objects-AC objects, each AC object being a data object specifying which user is to be allowed or denied by the framework to access the delta objects comprising change information of a particular one of the application-born external objects, the processor being configured to use the framework for receiving a request of a user to access attribute information of at least one of the application-born external objects; and in response to receiving the request, traversing the at least one append-only store for processing AC objects comprising access control data in respect to the at least one application-born external object; and granting or denying the user access to attribute information comprised in the delta objects of the at least one application-born external object in dependence on the access control data in the processed AC objects; or outputting a report selectively comprising attribute information comprised in the delta objects of the at least one application-born external object which can be disclosed, according to the access control data in the processed AC objects, to the user.

18. A non-transitory computer-readable medium comprising computer-executable instructions, the computer-executable instructions being configured to cause a processor executing the computer-executable instructions to perform a method comprising:

instantiating a framework, the framework being intraoperatively coupled to at least one append-only store and to at least one application program which is not a database management program, wherein the application program is configured for performing change operations on application-born external objects at runtime of the application program, each application-born external object being a data object instantiated within the application program, the change operations comprising creating, modifying and/or deleting one or more of the application-born external objects in the application program, the application program being configured to notify the framework of any one of the change operations;

using the framework for in response to any one of the change operations, automatically creating a delta object being indicative of a change of an attribute of at least one of the application-born external objects caused by the change operation;

sequentially storing a sequence of data objects in the at least one append-only store, the sequence of data objects comprising a mixture of delta objects and RS objects, each RS object being a data object specifying a requirement in respect to how attribute information of one or more of the application-born external objects comprised in the delta objects must be processed and output by the framework, wherein the framework comprises a set of framework-functions, wherein one or more of the framework functions are functional extensions of the application program and are configured to process, upon being called, attribute information comprised in one or more of the delta objects in accordance with the requirements stored in the RS objects;

executing one or more of the framework-functions for returning an output computed as a function of the attribute information in the delta objects which complies to the requirements specified in the RS, wherein the sequence of data objects comprises a mixture of the delta objects, the RS objects and of access control objects-AC objects, each AC object being a data object specifying which user is to be allowed or denied by the framework to access the delta objects comprising change information of a particular one of the application-born external objects, the method further comprising using the framework for receiving a request of a user to access attribute information of at least one of the application-born external objects; and in response to receiving the request, traversing the at least one append-only store for processing AC objects comprising access control data in respect to the at least one application-born external object; and granting or denying the user access to attribute information comprised in the delta objects of the at least one application-born external object in dependence on the access control data in the processed AC objects; or outputting a report selectively comprising attribute information comprised in the delta objects of the at least one application-born external object which can be disclosed, according to the access control data in the processed AC objects, to the user.

* * * * *